US009906810B2

(12) United States Patent
Nakamura et al.

(10) Patent No.: US 9,906,810 B2
(45) Date of Patent: *Feb. 27, 2018

(54) MOVING PICTURE DECODING DEVICE, MOVING PICTURE DECODING METHOD AND MOVING PICTURE DECODING PROGRAM

(71) Applicant: JVC KENWOOD Corporation, Yokohama-shi (JP)

(72) Inventors: Hiroya Nakamura, Yokosuka (JP); Shigeru Fukushima, Yokosuka (JP); Hideki Takehara, Yokosuka (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/583,601

(22) Filed: May 1, 2017

(65) Prior Publication Data
US 2017/0238009 A1    Aug. 17, 2017

Related U.S. Application Data

(60) Continuation of application No. 15/196,872, filed on Jun. 29, 2016, now Pat. No. 9,743,104, which is a
(Continued)

(30) Foreign Application Priority Data

Dec. 16, 2011  (JP) .................................. 2011-276456
Dec. 16, 2011  (JP) .................................. 2011-276457
(Continued)

(51) Int. Cl.
*H04N 7/12*    (2006.01)
*H04N 19/52*   (2014.01)
(Continued)

(52) U.S. Cl.
CPC ........... *H04N 19/52* (2014.11); *H04N 19/105* (2014.11); *H04N 19/119* (2014.11);
(Continued)

(58) Field of Classification Search
None
See application file for complete search history.

(56) References Cited

U.S. PATENT DOCUMENTS

2009/0177952 A1* 7/2009 Yokosato .......... H04N 21/23430
714/799
2012/0320984 A1* 12/2012 Zhou ...................... H04N 19/50
375/240.16
2013/0077691 A1* 3/2013 Zheng ................ H04N 19/105
375/240.16

FOREIGN PATENT DOCUMENTS

EP    1 406 453 A1    4/2004
JP    2004-129191 A   4/2004
(Continued)

OTHER PUBLICATIONS

Yunfei Zheng et al., "Unified Motion Vector Predictor Selection for Merge and AMVP," Joint Collaborative Team on Video Coding (JCT-VC) of ITU-T SG16 WP3 and ISO/IEC JTC1/SC29/WG11, JCTVC-E396, 5th Meeting: Geneva, Mar. 2011, pp. 1-5. [Cited in Parent].
(Continued)

*Primary Examiner* — Dakshesh Parikh
(74) *Attorney, Agent, or Firm* — Venable LLP; Michael A. Sartori; Miguel A. Lopez

(57) ABSTRACT

In inter prediction that is performed by partitioning a first block, which is obtained by partitioning each picture, into one or more second blocks, a spatial merge candidate generating unit derives a spatial merge candidate without referring to a block included in a first block that includes a second block. In case of a mode where a coding block is
(Continued)

US 9,906,810 B2

Page 2 divided by a horizontal border into prediction blocks arranged vertically, the reference index derivation unit of a time merge candidate sets reference index information of a time merge candidate to a value of reference index information of an encoded prediction block adjacent to a left edge of a prediction block subject to encoding.

3 Claims, 44 Drawing Sheets

Related U.S. Application Data division of application No. 14/298,635, filed on Jun. 6, 2014, now Pat. No. 9,674,545, which is a continuation of application No. PCT/JP2012/008016, filed on Dec. 14, 2012.

(30) Foreign Application Priority Data

| Dec. 28, 2011 | (JP) | ................................ 2011-289287 |
| Dec. 28, 2011 | (JP) | ................................ 2011-289288 |
| Dec. 14, 2012 | (JP) | ................................ 2012-273314 |
| Dec. 14, 2012 | (JP) | ................................ 2012-273315 |

(51) Int. Cl.
| H04N 19/463 | (2014.01) |
| H04N 19/105 | (2014.01) |
| H04N 19/503 | (2014.01) |
| H04N 19/159 | (2014.01) |
| H04N 19/176 | (2014.01) |
| H04N 19/119 | (2014.01) |
| H04N 19/593 | (2014.01) |

(52) U.S. Cl.
CPC ......... *H04N 19/159* (2014.11); *H04N 19/176* (2014.11); *H04N 19/463* (2014.11); *H04N 19/503* (2014.11); *H04N 19/593* (2014.11)

(56) References Cited

FOREIGN PATENT DOCUMENTS

| JP | 5561348 B2 | 7/2014 |
| JP | 2014-197863 A | 10/2014 |
| JP | 2014-197864 A | 10/2014 |
| JP | 2014-207681 A | 10/2014 |
| JP | 2014-207682 A | 10/2014 |
| JP | 2014-534758 A | 12/2014 |
| JP | 5839080 B2 | 1/2016 |
| WO | 2011/019253 A2 | 2/2011 |
| WO | 2012/116212 A1 | 8/2012 |
| WO | 2013/067938 A1 | 5/2013 |
| WO | 2013/067939 A1 | 5/2013 |

OTHER PUBLICATIONS

Yunfei Zheng et al., "Merge Candidate Selection in 2NxN, Nx2N, and NxN Mode," Joint Collaborative Team on Video Coding (JCT-VC) of ITU-T SG16 WP3 and ISO/IEC JTC1/SC29/WG11, JCTVC-F302_r2, 6th Meeting: Torino, IT Jul. 2011, pp. 1-6. [Cited in Parent].
International Search Report in PCT International Application No. PCT/JP2012/008016, dated Mar. 12, 2013. [Cited in Parent].
International Preliminary Report on Patentability and Written Opinion in PCT International Application No. PCT/JP2012/008016, dated Jun. 17, 2014. [Cited in Parent].
Notification of Reasons for Refusal in Japanese Patent Application No. 2012-273315, dated Feb. 18, 2014. [Cited Parent].

McCann et al., "Samsung's response to the Call for Proposals on Video Compression Technology," Joint Collaborative Team on Video Coding (JCT-VC) of ITU-T SG16 WP3 and ISO/IEC JTC1/SC29/WG11, JCTVC-A124, 1st meeting: Dresden, DE, Apr. 15-23, 2010, pp. 1-42. [Cited in Parent].
Lin et al., "Improved Advanced Motion Vector Prediction," Joint Collaborative Team on Video Coding (JCT-VC) of ITU-T SG16 WP3 and ISO/IEC JTC1/SC29/WG11, JCTVC-E125, 4th Meeting: Daegu, KR, Jan. 20-28, 2011, pp. 1-8. [Cited in Parent].
Kim et al., CE2: Test results of asymmetric motion partition (AMP), Joint Collaborative Team on Video Coding (JCT-VC) of ITU-T SG16 WP3 and ISO/IEC JTC1/SC29/WG11, JCTVC-F379, 6th Meeting: Torino, Jul. 14-22, 2011, pp. 1-10. [Cited in Parent].
Nakamura et al., Non-CE9: Derivation process of reference indices for temporal merging candidates, Joint Collaborative Team on Video Coding (JCT-VC) of ITU-T SG16 WP3 and ISO/IEC JTC1/SC29/WG11, JCTVC-H0199, 8th Meeting: San Jose, CA, USA, Feb. 1-10, 2012, pp. 1-10. [Cited in Parent].
Notification of Reason(s) for Refusal for Japanese Patent Application No. 2014-106929, dated Jun. 23, 2015. [Cited Parent].
Notification of Reason(s) for Refusal for Japanese Patent Application No. 2014-106930, dated Jun. 23, 2015. [Cited in Parent].
Notification of Reason(s) for Refusal for Japanese Patent Application No. 2014-106931, dated Jun. 23, 2015. [Cited Parent].
Notification of Reason(s) for Refusal for Japanese Patent Application No. 2014-106932, dated Jun. 23, 2015. [Cited Parent].
European Search Report in European Patent Application No. 12857437.3, dated Aug. 18, 2015. [Cited in Parent].
Liu et al., "Method and syntax for partial CU merge," Joint Collaborative Team on Video Coding (JCT-VC) of ITU-T SG16 WP3 and ISO/IEC JTC1/SC29/WG11 5th Meeting: Geneva, CH, Mar. 16-23, 2011, Document: JCTVC-E085.
Takehara et al., "Non-CE9: Merging candidate reordering," Joint Collaborative Team on Video Coding (JCT-VC) of ITU-T SG16 WP3 and ISO/IEC JTC1/SC29/WG11 7th Meeting: Geneva, CH, Nov. 21-30, 2011, JCTVC-G181.
Zheng et al., "Non-CE9: Simplified Merge candidate derivation," Joint Collaborative Team on Video Coding (JCT-VC) of ITU-T SG16 WP3 and ISO/IEC JTC1/SC29/WG11 7th Meeting: Geneva, CH, Nov. 21-30, 2011, Document: JCTVC-G681.
Yunfei Zheng et al., "Unified Motion Vector Predictor Selection for Merge and AMVP," Joint Collaborative Team on Video Coding (JCT-VC) of ITU-T SG16 WP3 and ISO/IEC JTC1/SC29/WG11, JCTVC-E396, 5th Meeting: Geneva, Mar. 2011, pp. 1-5. [Cited in Parent, U.S. Appl. No. 14/298,635, filed Jun. 6, 2014].
Yunfei Zheng et al., "Merge Candidate Selection in 2NxN, Nx2N, and NxN Mode," Joint Collaborative Team on Video Coding (JCT-VC) of ITU-T SG16 WP3 and ISO/IEC JTC1/SC29/WG11, JCTVC-F302_r2, 6th Meeting: Torino, IT Jul. 2011, pp. 1-6. [Cited in Parent, U.S. Appl. No. 14/298,635, filed Jun. 6, 2014].
International Search Report in PCT International Application No. PCT/JP2012/008016, dated Mar. 12, 2013. [Cited in Parent, U.S. Appl. No. 14/298,635, filed Jun. 6, 2014].
International Preliminary Report on Patentability and Written Opinion in PCT International Application No. PCT/JP2012/008016, dated Jun. 17, 2014. [Cited in Parent, U.S. Appl. No. 14/298,635, filed Jun. 6, 2014].
Aotification of Reasons for Refusal in Japanese Patent Application No. 2012-273315, dated Feb. 18, 2014. [Cited in Parent, U.S. Appl. No. 14/298,635, filed Jun. 6, 2014].
McCann et al., "Samsung's response to the Call for Proposals on Video Compression Technology," Joint Collaborative Team on Video Coding (JCT-VC) of ITU-T SG16 WP3 and ISO/IEC JTC1/SC29/WG11, JCTVC-A124, 1st meeting: Dresden, DE, Apr. 15-23, 2010, pp. 1-42. [Cited in Parent, U.S. Appl. No. 14/298,635, filed Jun. 6, 2014].
Lin et al., "Improved Advanced Motion Vector Prediction," Joint Collaborative Team on Video Coding (JCT-VC) of ITU-T SG16 WP3 and ISO/IEC JTC1/SC29/WG11, JCTVC-E125, 4th Meeting: Daegu, KR, Jan. 20-28, 2011, pp. 1-8. [Cited in Parent, U.S. Appl. No. 14/298,635, filed Jun. 6, 2014].
Kim et al., CE2: Test results of asymmetric motion partition (AMP), Joint Collaborative Team on Video Coding (JCT-VC) of ITU-T

(56) References Cited

OTHER PUBLICATIONS

SG16 WP3 and ISO/IEC JTC1/SC29/WG11, JCTVC-F379, 6th Meeting: Torino, Jul. 14-22, 2011, pp. 1-10. [Cited in Parent, U.S. Appl. No. 14/298,635, filed Jun. 6, 2014].
Nakamura et al., Non-CE9: Derivation process of reference indices for temporal merging candidates, Joint Collaborative Team on Video Coding (JCT-VC) of ITU-T SG16 WP3 and ISO/IEC JTC1/SC29/WG11, JCTVC-H0199, 8th Meeting: San Jose, CA, USA, Feb. 1-10, 2012, pp. 1-10. [Cited in Parent, U.S. Appl. No. 14/298,635, filed Jun. 6, 2014].
Notification of Reason(s) for Refusal for Japanese Patent Application No. 2014-106929, dated Jun. 23, 2015. [Cited Parent, U.S. Appl. No. 14/298,635, filed Jun. 6, 2014].
Notification of Reason(s) for Refusal for Japanese Patent Application No. 2014-106930, dated Jun. 23, 2015. [Cited Parent, U.S. Appl. No. 14/298,635, filed Jun. 6, 2014].
Notification of Reason(s) for Refusal for Japanese Patent Application No. 2014-106931, dated Jun. 23, 2015. [Cited Parent, U.S. Appl. No. 14/298,635, filed Jun. 6, 2014].
Notification of Reason(s) for Refusal for Japanese Patent Application No. 2014-106932, dated Jun. 23, 2015. [Cited Parent, U.S. Appl. No. 14/298,635, filed Jun. 6, 2014].
European Search Report in European Patent Application No. 12857437.3, dated Aug. 18, 2015. [Cited in Parent, U.S. Appl. No. 14/298,635, filed Jun. 6, 2014].

\* cited by examiner

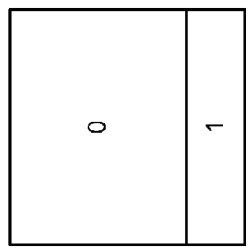
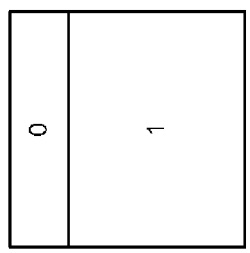
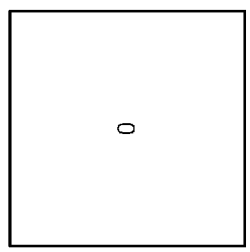
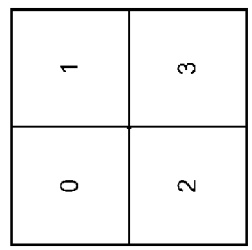
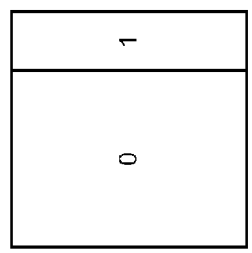
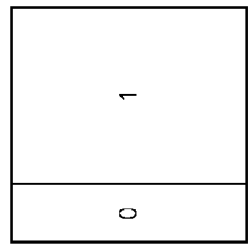
FIG.4

A PREDICTION BLOCK SUBJECT TO ENCODING/DECODING

FIG.10

```
                    SLICE HEADER
......

if (slice_type == B) {
   ......
   collocated_from_l0_flag
   ......
}
......
```

FIG.11

PREDICTION BLOCK

```
if (PredMode == MODE_INTER) {
    merge_flag [ x0 ][ y0 ]
    if( merge_flag[ x0 ][ y0 ] ) {
        merge_idx [ x0 ][ y0 ]
    } else {
        if( slice_type == B )
            inter_pred_flag[ x0 ][ y0 ]
        if( inter_pred_flag[ x0 ][ y0 ] == Pred_L0 || inter_pred_flag[ x0 ][ y0 ] == Pred_BI ) {
            if( num_ref_idx_l0_active_minus1 > 0 )
                ref_idx_l0[ x0 ][ y0 ]
            mvd_l0[ x0 ][ y0 ][ 0 ]
            mvd_l0[ x0 ][ y0 ][ 1 ]
            mvp_idx_l0[ x0 ][ y0 ]
        }
        if( inter_pred_flag[ x0 ][ y0 ] == Pred_L1 || inter_pred_flag[ x0 ][ y0 ] == Pred_BI ) {
            if( num_ref_idx_l1_active_minus1 > 0 )
                ref_idx_l1[ x0 ][ y0 ]
            mvd_l1[ x0 ][ y0 ][ 0 ]
            mvd_l1[ x0 ][ y0 ][ 1 ]
            mvp_idx_l1[ x0 ][ y0 ]
        }
        ...
    }
}
```

FIG.12

| | | SYNTAX ELEMENT OF MERGE INDEX merge_idx[x0][y0] |
|---|---|---|
| MERGE INDEX mergeIdx | 0 | 0 |
| | 1 | 10 |
| | 2 | 110 |
| | 3 | 1110 |
| | 4 | 1111 |

MOVING PICTURE DECODING DEVICE, MOVING PICTURE DECODING METHOD AND MOVING PICTURE DECODING PROGRAM

CROSS-REFERENCE TO RELATED APPLICATIONS

This application is a Continuation of U.S. patent application Ser. No. 15/196,872, filed Jun. 29, 2016, which is a Divisional of U.S. patent application Ser. No. 14/298,635, filed Jun. 6, 2014, which is a Continuation of International Application No. PCT/JP2012/008016, filed Dec. 14, 2012, which claims the benefit of Japanese Patent Application Nos. 2011-276456, filed Dec. 16, 2011, and 2011-289287 and 2011-289288, filed Dec. 28, 2011, and 2011-276457, filed Dec. 16, 2011, and 2012-273314 and 2012-273315, filed Dec. 14, 2012.

BACKGROUND OF THE INVENTION

1. Field of the Invention

The present invention generally relates to a moving picture encoding and decoding technology, and more particularly, to a moving picture encoding and decoding technology utilizing motion compensation prediction.

2. Description of the Related Art

As a typical moving picture compression-coding method, there is MPEG-4 AVC/H.264 standard. The MPEG-4 AVC/H.264 utilizes motion compensation, where a picture is partitioned into a plurality of rectangular blocks, a picture that has been already encoded or decoded is used as a reference picture, and a movement from the reference picture is predicted. A method that predicts movement by this motion compensation is referred to as inter prediction or motion compensation prediction. According to inter prediction of MPEG-4AVC/H.264, a plurality of pictures can be used as reference pictures, and a most appropriate reference picture is chosen from the plurality of reference pictures for each block so as to perform motion compensation prediction. Therefore, a reference index is assigned to each reference picture, and a reference picture is specified by the reference index. For a B picture, up to two pictures can be selected from decoded reference pictures and be used for inter prediction. Two types of prediction based respectively on these two reference pictures are distinguished as L0 prediction (list 0 prediction), which is mainly used as prediction for a previous picture, and L1 prediction (list 0 prediction), which is mainly used as prediction for a subsequent picture, respectively.

In addition, bi-prediction, which uses two types of inter prediction (i.e., L0 prediction and L1 prediction), is also defined. In case of bi-prediction, prediction for both directions is performed, inter-predicted signals of L0 prediction and L1 prediction respectively are multiplied by a weighting coefficient, an offset value is added and convolution is performed so as to generate an ultimate inter prediction picture signal. The weighting coefficient used for weighted prediction and the offset value are defined by a typical value for each reference picture of each list on a picture by picture basis, and encoded. Coding information relating to inter prediction includes: a prediction mode that differentiate among L0 prediction, L1 prediction, and bi-prediction for each block; a reference index that specifies a reference picture for each reference list of each block; and a motion vector that represents a direction of movement and an amount of movement of a block. This coding information is encoded and/or decoded.

Further, according to MPEG-4 AVC/H.264, a direct mode, where inter prediction information of a block subject to encoding or decoding is generated from inter prediction information of a decoded block, is defined. Since encoding of inter prediction information is not required, encoding efficiency is improved with the direct mode.

An explanation will be given on a time direct mode that uses a correlation of inter prediction information over time, while referring to FIG. 42. A picture, of which the reference index of L1 is registered to 0, is used as a base picture colPic. A block at a position identical to a block subject to encoding or decoding in the base picture colPic is used as a base block. If the base block is encoded by using L0 prediction, the motion vector of the base block L0 is used as a base motion vector mvCol. If the base block is not encoded by using L0 prediction but encoded by using L1 prediction, the motion vector of L1 of the base block is used as a base motion vector mvCol. A picture referred to by the base motion vector mvCol is used as a reference picture of L0 in a time direct mode, and the base picture colPic is used as a reference picture of L1 in a time direct mode.

A motion vector mvL0 of L0 and a motion vector mvL1 of L1 in a time direct mode are derived from a base motion vector mvCol by a scaling computation process.

By subtracting POC of the reference picture of L0 in a time direct mode from POC of the base picture colPic, a distance td between pictures is derived. POC is defined as a parameter that is associated with a picture subject to encoding, and a value that increases in the output order of pictures is set. A difference of POC between two pictures indicates a distance between pictures along the time axis.

$$td = POC \text{ of a base picture colPic} - POC \text{ of a reference picture of L0 in a time direct mode}$$

By subtracting POC of the reference picture of L0 in a time direct mode from POC of a picture subject to encoding or decoding, a distance tb between pictures is derived.

$$tb = POC \text{ of a picture subject to encoding or decoding} - POC \text{ of a reference picture of L0 in a time direct mode}$$

A motion vector mvL0 of L0 in a time direct mode is derived from a base motion vector mvCol by a scaling computation process.

$$mvL0 = tb/td * mvCol$$

A motion vector mvL1 of L1 is derived by subtracting the base motion vector mvCol from the motion vector mvL0 of L0 in a time direct mode.

$$mvL1 = mvL0 - mvCol$$

RELATED ART LIST

Patent Document

[Patent Document 1] Japanese Patent Application Publication No. 2004-129191.

SUMMARY OF THE INVENTION

However, in accordance with the conventional method, for a block subject to encoding and a block subject to decoding, in some cases, the degree of prediction accuracy is decreased and the encoding efficiency is not improved with a time direct mode.

In this background, the present inventors have recognized the necessity of further compression of coding information and reduction of the total amount of code in a moving picture encoding method that uses motion compensation prediction.

SUMMARY OF THE INVENTION

The present invention addresses the aforementioned issue, and a purpose thereof is to provide a moving picture encoding and decoding technology for reducing an amount of code of coding information by calculating a candidate of coding information, so as to improve the encoding efficiency.

In order to address the aforementioned issue, a moving picture encoding device is provided according to an aspect of the present invention. The device partitions a first block, which is obtained by partitioning each picture, into one or more second blocks and encodes a moving picture using inter prediction. The device includes: a first prediction information derivation unit (130) configured to derive a first inter prediction information candidate from inter prediction information of a third block in a proximity of the second block subject to encoding in a picture subject to encoding; a second prediction information derivation unit (132) configured to derive a second inter prediction information candidate from inter prediction information of a fourth block at a position identical to or in a proximity of the second block subject to encoding in a picture different from the picture subject to encoding; a candidate list construction unit configured to construct a prediction information candidate list including a prediction information candidate to which, in case that the first inter prediction information candidate is derived, the derived first inter prediction information candidate is added, and in case that the second inter prediction information candidate is derived, the derived second inter prediction information candidate is added, respectively; a selection unit (136) configured to select a candidate of inter prediction information to be used for the inter prediction of the second block subject to encoding from the one or more prediction information candidates in the prediction information candidate list, and configured to determine an index indicating inter prediction information; an encoding unit (110) configured to encode the index indicating inter prediction information to be used for the inter prediction of the second block subject to encoding. The first prediction information derivation unit (130) does not use, as the first inter prediction information candidate, coding information of a fifth block included in a block identical to the first block including the second block subject to encoding.

According to another aspect of the present invention, also a moving picture encoding device is provided. The device partitions a coding block into one or more prediction blocks in accordance with a partition mode so as to perform motion compensation prediction. The device includes: a reference index derivation unit (131) configure to derive, in a merge mode where inter prediction information defined as a time merge candidate is derived from inter prediction information of a prediction block at a position identical to or in a proximity of a prediction block subject to encoding in a encoded picture different in time from the prediction block subject to encoding and inter prediction of the prediction block subject to encoding is executed on the basis of the derived inter prediction information, reference index information of a time merge candidate as reference index information that specifies a reference picture used in the prediction block subject to encoding; and a time merge candidate generating unit (132) configured to derive inter prediction information of time merge candidate based on the derived reference index information. In case that the partition mode is a mode where the coding block is divided by a horizontal border into prediction blocks arranged vertically, the reference index derivation unit (131) sets reference index information of a time merge candidate to a value of reference index information of an encoded prediction block adjacent to a left edge of the prediction block subject to encoding and outputs the reference index information, and in case that the partition mode is a mode where the coding block is divided by a vertical border into prediction blocks arranged horizontally, the reference index derivation unit (131) sets reference index information of a time merge candidate to a value of reference index information of an encoded prediction block adjacent to an upper edge of the prediction block subject to encoding and outputs the reference index information.

According to yet another embodiment of the present invention, a moving picture encoding method is provided. The method partitions a first block, which is obtained by partitioning each picture, into one or more second blocks and encodes a moving picture using inter prediction. The method includes: deriving a first inter prediction information candidate from inter prediction information of a third block in a proximity of the second block subject to encoding in a picture subject to encoding; deriving a second inter prediction information candidate from inter prediction information of a fourth block at a position identical to or in a proximity of the second block subject to encoding in a picture different from the picture subject to encoding; constructing a prediction information candidate list including a prediction information candidate to which, in case that the first inter prediction information candidate is derived, the derived first inter prediction information candidate is added, and in case that the second inter prediction information candidate is derived, the derived second inter prediction information candidate is added, respectively; selecting a candidate of inter prediction information to be used for the inter prediction of the second block subject to encoding from the one or more prediction information candidates in the prediction information candidate list, and determining an index indicating inter prediction information; encoding the index indicating inter prediction information to be used for the inter prediction of the second block subject to encoding. The deriving of the first inter prediction information candidate does not use, as the first inter prediction information candidate, coding information of a fifth block included in a block identical to the first block including the second block subject to encoding.

According to an aspect of the present invention, a moving picture decoding device is provided. The device decodes a bitstream where first block, which is obtained by partitioning each picture, is partitioned into one or more second blocks and a moving picture is encoded by inter prediction. The device includes: a first prediction information derivation unit (230) configured to derive a first inter prediction information candidate from inter prediction information of a third block in a proximity of the second block subject to decoding in a picture subject to decoding; a second prediction information derivation unit (232) configured to derive a second inter prediction information candidate from inter prediction information of a fourth block at a position identical to or in a proximity of the second block subject to decoding in a picture different from the picture subject to decoding; a decoding unit (202) configured to decode an index indicating inter prediction information to be used for the inter prediction of the second block subject to decoding; a candidate list construction unit configured to construct a prediction information candidate list including a prediction information candidate to which, in case that the first inter prediction information candidate is derived, the derived first inter prediction information candidate is added, and in case that the second inter prediction information candidate is derived, the derived second inter prediction information candidate is added, respectively; and a selection unit (236) configured to select a candidate of inter prediction information to be used for the inter prediction of the second block subject to decoding indicated by the index from the one or more prediction information candidates in the prediction information candidate list. The first prediction information derivation unit (230) does not use, as the first inter prediction information candidate, coding information of a fifth block included in a block identical to the first block including the second block subject to decoding.

According to another aspect of the present invention, also a moving picture decoding device is provided. The device partitions a decoding block into one or more prediction blocks in accordance with a partition mode so as to perform motion compensation prediction. The device includes: a reference index derivation unit (231) configure to derive, in a merge mode where inter prediction information defined as a time merge candidate is derived from inter prediction information of a prediction block at a position identical to or in a proximity of a prediction block subject to decoding in a decoded picture different in time from the prediction block subject to decoding and inter prediction of the prediction block subject to decoding is executed from the derived inter prediction information, reference index information of a time merge candidate as reference index information that specifies a reference picture used in the prediction block subject to decoding; and a time merge candidate generating unit configured to derive inter prediction information of time merge candidate based on the derived reference index information. In case that the partition mode is a mode where the decoding block is divided by a horizontal border into prediction blocks arranged vertically, the reference index derivation unit (231) sets reference index information of a time merge candidate to a value of reference index information of an decoded prediction block adjacent to a left edge of the prediction block subject to decoding and outputs the reference index information, and in case that the partition mode is a mode where the decoding block is divided by a vertical border into prediction blocks arranged horizontally, the reference index derivation unit (231) sets reference index information of a time merge candidate to a value of reference index information of an decoded prediction block adjacent to an upper edge of the prediction block subject to decoding and outputs the reference index information.

According to yet another aspect of the invention, a moving picture decoding method is provided. The method decodes a bitstream where first block, which is obtained by partitioning each picture, is partitioned into one or more second blocks and a moving picture is encoded by inter prediction. The method includes: deriving a first inter prediction information candidate from inter prediction information of a third block in a proximity of the second block subject to decoding in a picture subject to decoding; deriving a second inter prediction information candidate from inter prediction information of a fourth block at a position identical to or in a proximity of the second block subject to decoding in a picture different from the picture subject to decoding; decoding an index indicating inter prediction information to be used for the inter prediction of the second block subject to decoding; constructing a prediction information candidate list including a prediction information candidate to which, in case that the first inter prediction information candidate is derived, the derived first inter prediction information candidate is added, and in case that the second inter prediction information candidate is derived, the derived second inter prediction information candidate is added, respectively; and selecting a candidate of inter prediction information to be used for the inter prediction of the second block subject to decoding indicated by the index from the one or more prediction information candidates in the prediction information candidate list. The deriving of the first inter prediction information candidate does not use, as the first inter prediction information candidate, coding information of a fifth block included in a block identical to the first block including the second block subject to decoding.

Optional combinations of the aforementioned constituting elements, and implementations of the invention in the form of methods, apparatuses, systems, recording mediums, computer programs, or the like may also be practiced as additional modes of the present invention.

According to the present invention, an amount of generated code of coding information to be transmitted can be reduced and an encoding efficiency can be improved.

BRIEF DESCRIPTION OF THE DRAWINGS

FIG. 4 illustrates a partition mode of a prediction block;

FIG. 10 illustrates syntax of a bitstream at a slice level regarding a merge mode;

FIG. 11 illustrates syntax of a bitstream at a prediction block level regarding a merge mode;

FIG. 12 illustrates an example of an entropy code of a syntax element of a merge index;

DETAILED DESCRIPTION OF THE INVENTION

According to the present embodiment, in relation with encoding of a moving picture, more specifically in order to increase encoding efficiency in moving picture encoding where a picture is partitioned into rectangular blocks of an arbitrary size and shape and motion compensation is performed between pictures in units of blocks, a plurality of motion vector predictors are derived from a motion vector of a block in the proximity of a block subject to encoding or from a motion vector of a block of an encoded picture, a difference vector between a motion vector of the block subject to encoding and a selected motion vector predictor is calculated, and the difference vector is encoded so as to reduce the amount of code. Alternatively, by using coding information of a block in the proximity of a block subject to encoding or a block of an encoded picture, coding information of the block subject to encoding is derived so as to reduce the amount of code. In case of decoding a moving picture, a plurality of motion vector predictors are calculated from a motion vector of a block in the proximity of a block subject to decoding or from a motion vector of a block of a decoded picture, a motion vector of the block subject to decoding is calculated from a difference vector decoded from a bitstream and from a selected motion vector predictor so as to decode the block subject to decoding. Alternatively, by using coding information of a block in the proximity of a block subject to decoding, or a block of a decoded picture, coding information of a block subject to decoding is derived.

First, definitions will be given for technologies and technical terms used in the present embodiment.

(Regarding a Tree Block and a Coding Block)

Figure 3:
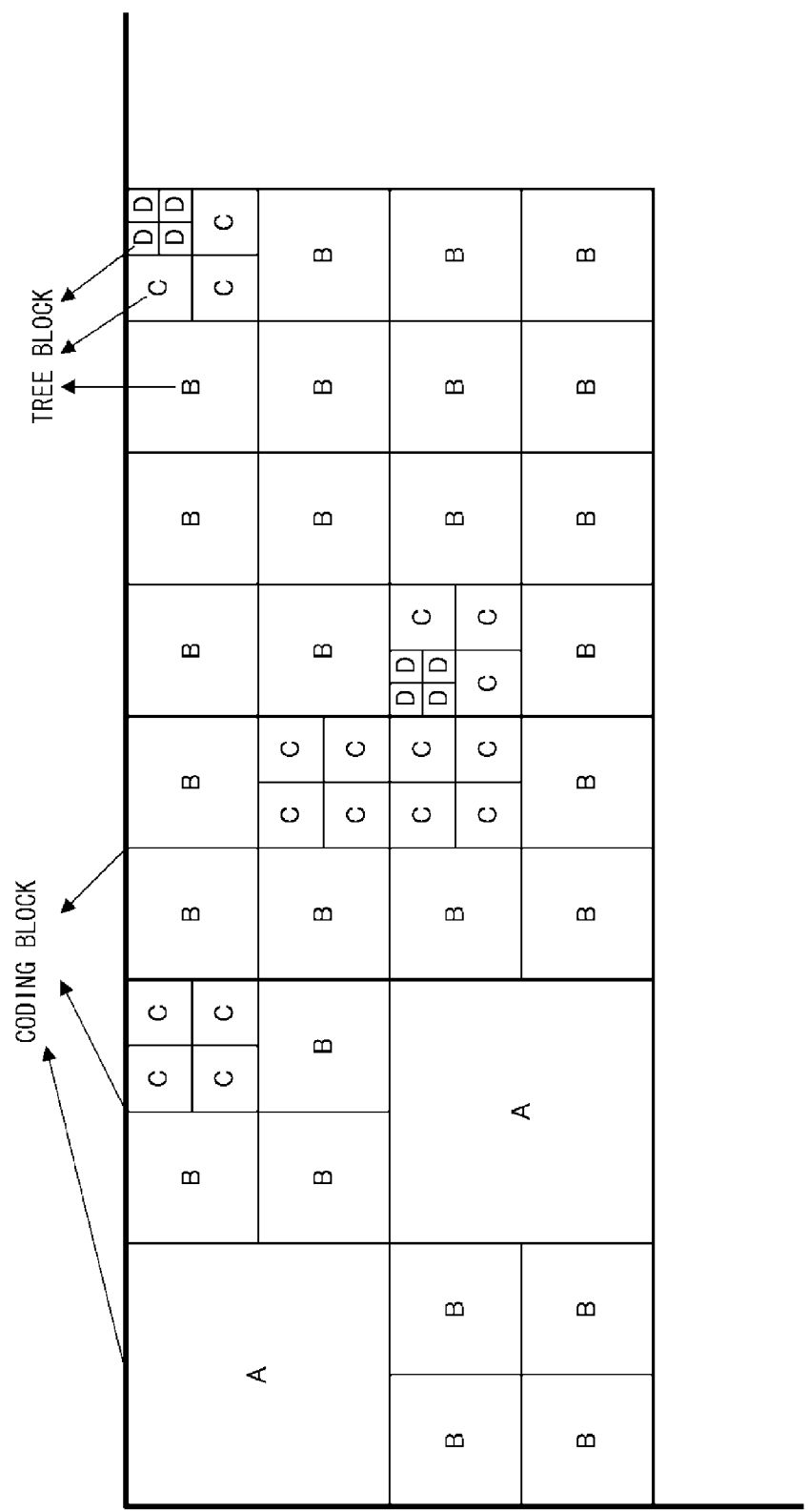
FIG. 3 illustrates a tree block and a coding block.

According to the embodiment, a picture is partitioned in units of squares having a same arbitrary size as shown in FIG. 3. This unit is defined as a tree block and used as a basic unit of managing an address for specifying a block subject to encoding or decoding (Hereinafter, "a block subject to encoding or decoding" refers to a block subject to encoding in case of encoding process, and refers to a block subject to decoding in case of decoding process, unless otherwise noted.) in a picture. A tree block comprises one brightness signal and two color-difference signals, except in case of a monochrome. The size of a tree block can be determined freely in units of powers of 2 in accordance with the size of a picture and/or a texture in the picture. In order to optimize encoding process in accordance with a texture in a picture, a tree block can be hierarchically partitioned into four blocks (divided by two both vertically and horizontally) having a smaller block size, as necessary, by dividing a brightness signal and color-difference signals in the tree block. These blocks are defined as coding blocks respectively, and used as basic units in encoding and decoding. A coding block also comprises one brightness signal and two color-difference signals, except in case of a monochrome. The maximum size of a coding block is as same as the size of a tree block. A coding block of minimum size is referred to as a minimum coding block, and the size thereof can be set freely in units of powers of 2.

In FIG. 3, a coding block A is defined by using a tree block as one coding block without partitioning the tree block. A coding block B is a coding block made by partitioning a tree block into four blocks. A coding block C is a coding block made by further partitioning a block, which is obtained by partitioning a tree block into four, into four blocks. A coding block D is a coding block made by further partitioning a block, which is obtained by partitioning a tree block into four, into four blocks twice hierarchically. The coding block D is a coding block of the minimum size.

(Regarding a Prediction Mode)

A mode is switched between intra prediction (MODE_INTRA) and inter prediction (MODE_INTER) in units of coding blocks. With the intra prediction, prediction is performed from a surrounding encoded or decoded picture signals in a picture subject to encoding or decoding (In case of encoding process, "decoded" is used for a decoded picture that has been encoded in a encoding process, a decode prediction block that has been encoded in a encoding process, a decoded picture signal that has been encoded in a encoding process, or the like, and in case of decoding process, "decoded" is used for a decoded picture, a decoded prediction block, a decoded picture signal, or the like. The same shall apply herein after unless otherwise noted.). This mode that distinguishes the intra prediction (MODE_INTRA) and the inter prediction (MODE_INTER) is defined as a prediction mode (PredMode). The prediction mode (PredMode) has, as a value, the intra prediction (MODE_INTRA) or the inter prediction (MODE_INTER), and can select a type of prediction so as to perform encoding.

(Regarding a Partition Mode, a Prediction Block, and a Prediction Unit)

In case of partitioning a picture into blocks and performing intra prediction (MODE_INTRA) and inter prediction (MODE_INTER), a coding block is partitioned as necessary so as to perform prediction in order to set a smaller unit for switching methods of intra prediction and inter prediction. This mode that distinguishes a method for partitioning a brightness signal and color-difference signals of a coding block is defined as a partition mode (PartMode). In addition, the partitioned block thereof is defined as a prediction block. As shown in FIG. 4, eight types of partition modes (PartMode) are defined in accordance with a method for partitioning a brightness signal of a coding block.

A partition mode (PartMode) where a brightness signal of a coding block is not partitioned and regarded as one prediction block as shown in FIG. 4A is defined as 2N by 2N partition (PART_2N×2N). Partition modes (PartMode) where a brightness signal of a coding block is partitioned into two prediction blocks arranged vertically as shown in FIGS. 4B, 4C, and 4D are defined as 2N by N partition (PART_2N×N), 2N by nU partition (PART_2N×nU), and 2N by nD partition (PART_2N×nD), respectively. The 2N by N partition (PART_2N×N) is a partition mode where a block is partitioned with a ratio of 1:1, vertically, the 2N by nU partition (PART_2N×nU) is a partition mode where a block is partitioned with a ratio of 1:3, vertically, and 2N by nD partition (PART_2N×nD) is a partition mode where a block is partitioned with a ratio of 3:1, vertically. Partition modes (PartMode) where a brightness signal of a coding block is partitioned into two prediction blocks arranged horizontally as shown in FIGS. 4E, 4F, and 4G are defined as N by 2N partition (PART_N×2N), nL by 2N partition (PART_nL×2N), and nR by 2N partition (PART_nR×2N), respectively. The N by 2N partition (PART_N×2N) is a partition mode where a block is partitioned with a ratio of 1:1, horizontally, the nL by 2N partition (PART_nL×2N) is a partition mode where a block is partitioned with a ratio of 1:3, horizontally, and nR by 2N partition (PART_nR×2N) is a partition mode where a block is partitioned with a ratio of 3:1, horizontally. A partition mode (PartMode) where a brightness signal of a coding block is partitioned vertically and horizontally into four blocks as shown in FIG. 4H is defined as N by N partition (PART_N×N).

For each partition mode (PartMode), a color-difference signal is also partitioned in a similar manner to that of horizontal and vertical partition ratio of a brightness signal.

In a coding block, in order to identify each prediction block, a number starting from 0 is assigned to a prediction block in the coding block in the order of encoding. This number is defined as a partition index PartIdx. A number written in each prediction block in the coding blocks shown in FIG. 4 indicates the partition index PartIdx of the prediction block. For the 2N by N partition (PART_2N×N), the 2N by nU partition (PART_2N×nU), and the 2N by nD partition (PART_2N×nD) shown in FIGS. 4B, 4C, and 4D respectively, the partition index PartIdx of an upper prediction block is set to 0 and the partition index PartIdx of a lower prediction block is set to 1. For the N by 2N partition (PART_N×2N), the nL by 2N partition (PART_nL×2N), and the nR by 2N partition (PART_nR×2N) shown in FIGS. 4E, 4F, and 4G respectively, the partition index PartIdx of a left prediction block is set to 0 and the partition index PartIdx of a right prediction block is set to 1. For the N by N partition (PART_N×N) shown in FIG. 4H, the partition index PartIdx of an upper left prediction block is set to 0, the partition index PartIdx of an upper right prediction block is set to 1, the partition index PartIdx of a lower left prediction block is set to 2, and the partition index PartIdx of a lower right prediction block is set to 3.

In case that the prediction mode (PredMode) is inter prediction (MODE_INTER), the 2N by 2N partition (PART_2N×2N), the 2N by N partition (PART_2N×N), the 2N by nU partition (PART_2N×nU), the 2N by nD partition (PART_2N×nD), the N by 2N partition (PART_N×2N), the nL by 2N partition (PART_nL×2N), and the nR by 2N partition (PART_nR×2N) are defined as a partition mode (PartMode). Only in case of the coding block D, which is the minimum coding block, the N by N partition (PART_N×N) can be defined as a partition mode (PartMode) in addition to the 2N by 2N partition (PART_2N×2N), the 2N by N partition (PART_2N×N), the 2N by nU partition (PART_2N×nU), the 2N by nD partition (PART_2N×nD), the N by 2N partition (PART_N×2N), the nL by 2N partition (PART_nL×2N), and the nR by 2N partition (PART_nR×

2N). However, it is assumed that the N by N partition (PART_N×N) is not defined as a partition mode (PartMode) according to the present embodiment.

In case that the prediction mode (PredMode) is intra prediction (MODE_INTRA), only the 2N by 2N partition (PART_2N×2N) is defined as a partition mode (PartMode) for blocks except for the coding block D, which is the minimum coding block. Only in case of the coding block D, which is the minimum coding block, the N by N partition (PART_N×N) is defined as a partition mode (PartMode) in addition to the 2N by 2N partition (PART_2N×2N). The reason why the N by N partition (PART_N×N) is not defined except for the minimum coding block, is that coding block other than the minimum coding block can be partitioned into four blocks so as to represent smaller coding blocks.

(Regarding the Position of a Tree Block, a Coding Block, a Prediction Block, and a Transformation Block)

The position of each block such as a tree block, a coding block, a prediction block, a transformation block, or the like according to the present embodiment is represented by two dimensional coordinates where the position of the top left pixel of brightness signal in a screen of brightness signals is defined as the original point, and the position of the top left pixel of brightness signal included in the area of each block is represented by two dimensional coordinates (X, Y). Regarding the directions of coordinate axes, the positive directions are the horizontally-right direction and the vertically-down direction, respectively. The unit of scale is pixel of brightness signal. The position of each block of color-difference signals is represented by coordinates of a pixel of a brightness signal included in an area of the block and the unit of scale is pixel, not only in case that a color-difference format is 4:4:4 where the picture sizes (the numbers of pixels) for brightness signals and color-difference signals are identical to each other, but also in case that the color-difference format is 4:2:0 or 4:2:2 where the picture sizes (the numbers of pixels) of brightness signals and color-difference signals are different. In this manner, not only the position of each block of color-difference signals can be identified, but also mere comparison of coordinate values clarifies a positional relationship between a block of brightness signals and a block of color-difference signals.

(Regarding an Inter Prediction Mode and a Reference List)

According to the embodiment of the invention, a plurality of decoded pictures can be used as a reference picture in inter prediction where a prediction is made on the basis of picture signals of a decoded picture. In order to identify a reference picture selected from a plurality of reference pictures, a reference index is assigned for each prediction block. For a B slice, two arbitrary reference pictures can be selected for each prediction block so as to perform inter prediction. The inter prediction modes includes L0 prediction (Pred_L0), L1 prediction (Pred_L1), and bi-prediction (Pred_BI). The reference picture is managed by L0 (reference list 0) and L1 (reference list 1), which are list structures, and a reference picture can be identified by specifying a reference index of L0 or L1. The L0 prediction (Pred_L0) is inter prediction that refers to a reference picture managed by L0, the L1 prediction (Pred_L1) is inter prediction that refers to a reference picture managed by L1, and the bi-prediction (Pred_BI) is prediction where both L0 prediction and L1 prediction are performed, and one reference picture managed by L0 and one reference picture managed by L1 are referred to. In inter prediction of a P slice, only L0 prediction can be used. In inter prediction of a B slice, L0 prediction, L1 prediction, and bi-prediction where L0 prediction and L1 prediction are averaged or added with weights, can be used. For invariables and variables to which a suffix LX is attached to output in the following processes, it is assumed that the process is performed for each of L0 and L1.

(A Merge Mode and a Merge Candidate)

A merge mode is not a mode that encode or decode inter prediction information (e.g., a prediction mode, a reference index, a motion vector, or the like) of a prediction block subject to encoding or decoding, but is a mode that performs inter prediction by deriving inter prediction information of a prediction block subject to encoding or decoding from inter prediction information of: a prediction block that is in a same picture with the prediction block subject to encoding or decoding and that is in the proximity of the prediction block subject to encoding or decoding; or a prediction block that is in a picture different in time from a picture of the prediction block subject to encoding or decoding, and that is at a position identical to or in the proximity (at a position in the proximity of) of the prediction block subject to encoding or decoding. A prediction block and the inter prediction information thereof, the prediction block being in a same picture with the prediction block subject to encoding or decoding and being in the proximity of the prediction block subject to encoding or decoding, is used as a spatial merge candidate. Inter prediction information derived from a prediction block and inter prediction information thereof, the prediction block being in an encoded or decoded picture different in time from a picture of the prediction block subject to encoding or decoding and being at a position identical to or in the proximity (at a position in the proximity) of the prediction block subject to encoding or decoding, is used as a time merge candidate. Each merge candidate is registered in a merge candidate list, and a merge candidate to be used for inter prediction is specified by a merge index.

(Regarding a Prediction Block in the Proximity)

FIGS. 5, 6, 7, and 8 illustrate: a deprivation of a spatial merge candidate; and a prediction block to be referred to when deriving a spatial merge candidate and when deriving the reference index of a time merge candidate, the prediction block being in a same picture with the prediction block subject to encoding or decoding and being in the proximity of the prediction block subject to encoding or decoding. FIG. 9 illustrates a prediction block to be referred to when deriving the reference index of a time merge candidate, the prediction block being in an encoded or decoded picture different in time from the prediction block subject to encoding or decoding and being at a position identical to or in the proximity of the prediction block subject to encoding or decoding. By referring to FIGS. 5, 6, 7, 8, and 9, an explanation will be given on a prediction block in the spatial proximity of the prediction block subject to encoding or decoding, and on a prediction block at an identical position but different in time.

Figure 5:
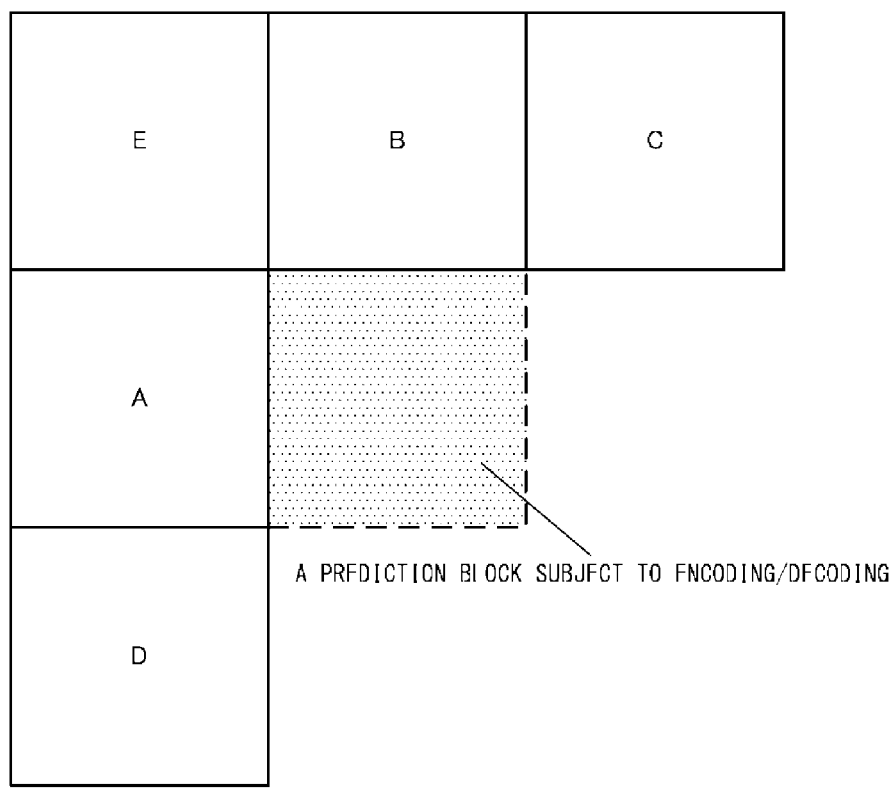
FIG. 5 illustrates a prediction block in the proximity of a prediction block subject to processing of a spatial merge candidate in a merge mode.

As shown in FIG. 5, in a same picture with the prediction block subject to encoding or decoding, a prediction block A adjacent to the left edge of the prediction block subject to encoding or decoding, a prediction block B adjacent to the upper edge thereof, a prediction block C adjacent to the upper right vertex thereof, a prediction block D adjacent to the lower left vertex thereof, and a prediction block E adjacent to the upper left vertex thereof are defined as a prediction block in the spatial proximity.

Figure 6:
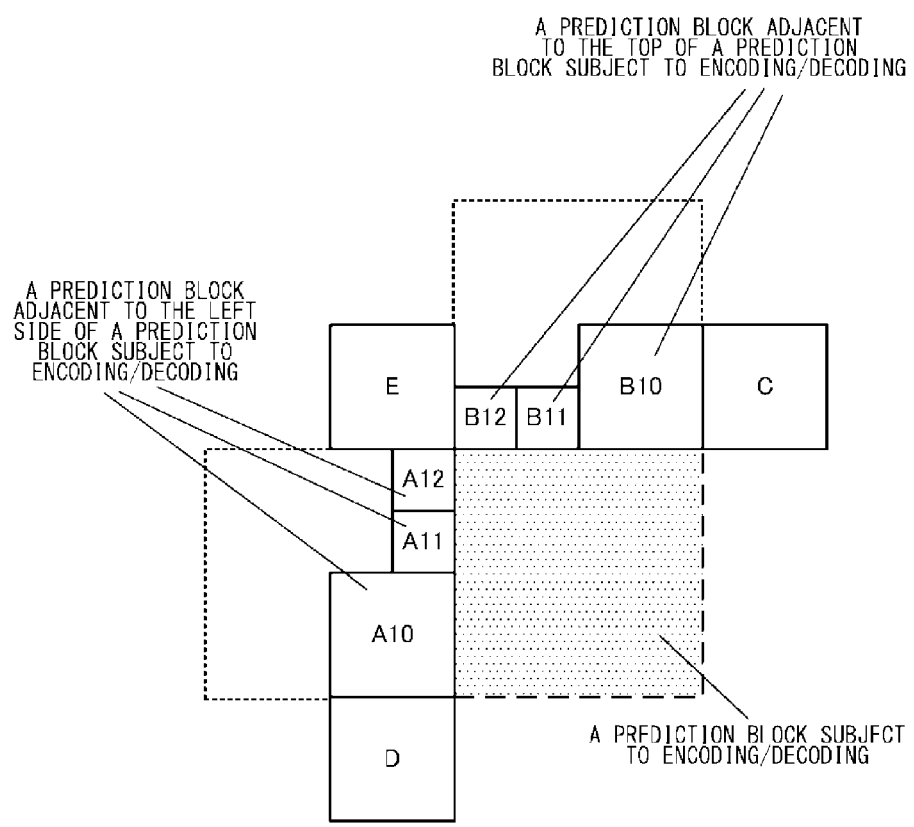
FIG. 6 illustrates a prediction block in the proximity of a prediction block subject to processing of a spatial merge candidate in a merge mode.

As shown in FIG. 6, if there are a plurality of prediction blocks, of which the sizes are smaller than the prediction block subject to encoding or decoding and which are adjacent to the left edge of the prediction block subject to encoding or decoding, a prediction block A10 at the lowest position among the plurality of prediction blocks adjacent to the left edge is defined as a prediction block A adjacent to the left edge according to the present embodiment.

In a similar manner, If there are a plurality of prediction blocks, of which the sizes are smaller than the prediction block subject to encoding or decoding and which are adjacent to the upper edge of the prediction block subject to encoding or decoding, a prediction block B10 at the right most position among the plurality of prediction blocks adjacent to the upper edge is defined as a prediction block B1 adjacent to the upper edge according to the present embodiment.

Figure 7:
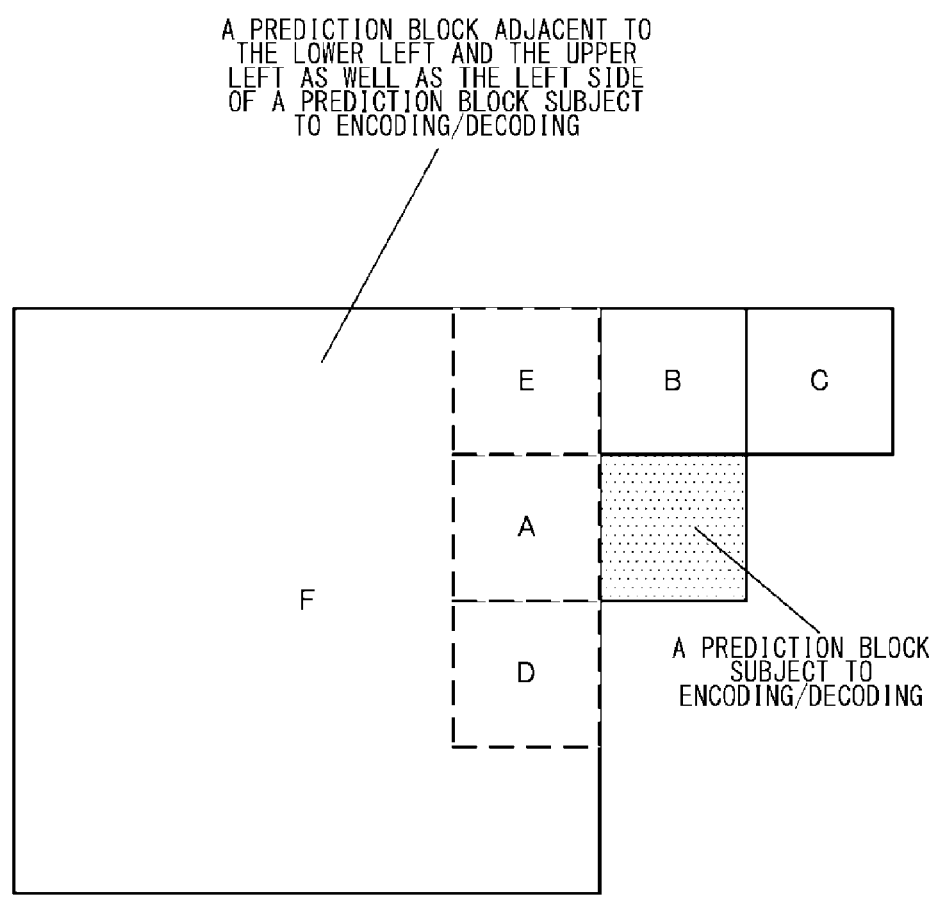
FIG. 7 illustrates a prediction block in the proximity of a prediction block subject to processing of a spatial merge candidate in a merge mode.

As shown in FIG. 7, also in case that the size of a prediction block F adjacent to the left edge of the prediction block subject to encoding or decoding is bigger than the prediction block subject to encoding or decoding, in accordance with the conditions described above, the prediction block A is defined as a prediction block A if the prediction block A is adjacent to the left edge of the prediction block subject to encoding or decoding, is defined as a prediction block D in case of being adjacent to the lower left vertex of the prediction block subject to encoding or decoding, and is defined as a prediction block E in case of being adjacent to the upper left vertex of the prediction block subject to encoding or decoding. According to the example shown in FIG. 6, a prediction block A, a prediction block E, and a prediction block E are an identical prediction block.

Figure 8:
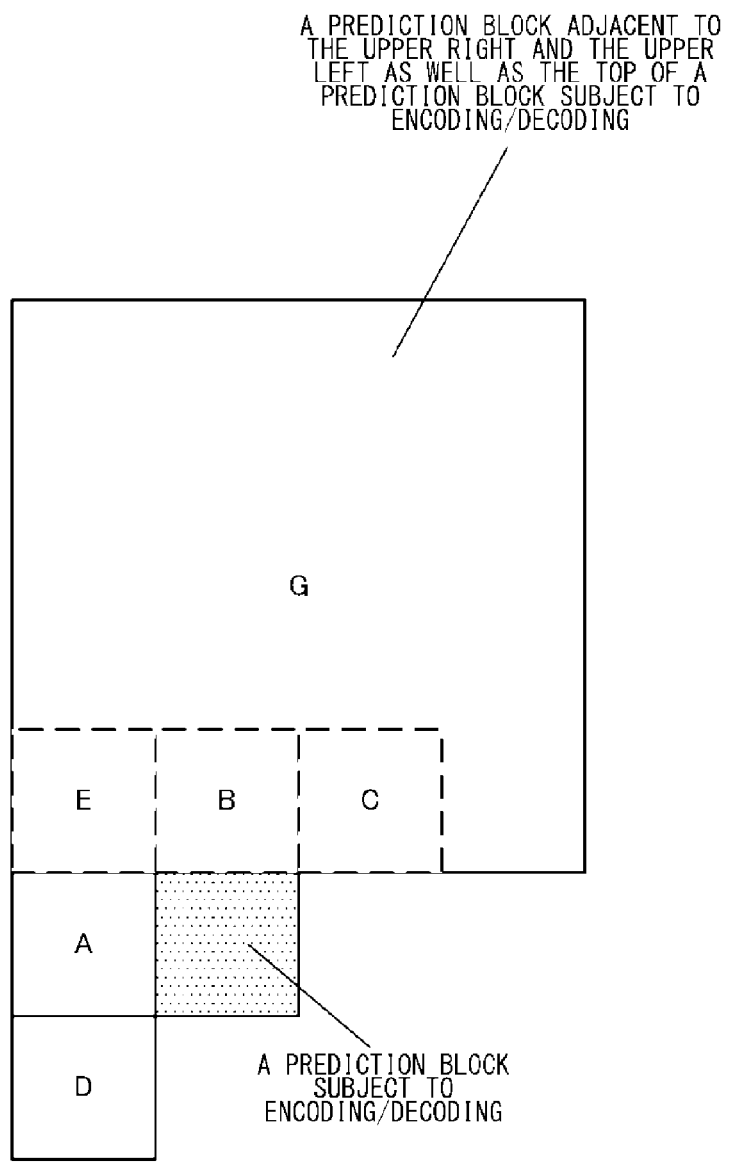
FIG. 8 illustrates a prediction block in the proximity of a prediction block subject to processing of a spatial merge candidate in a merge mode.
Figure 9:
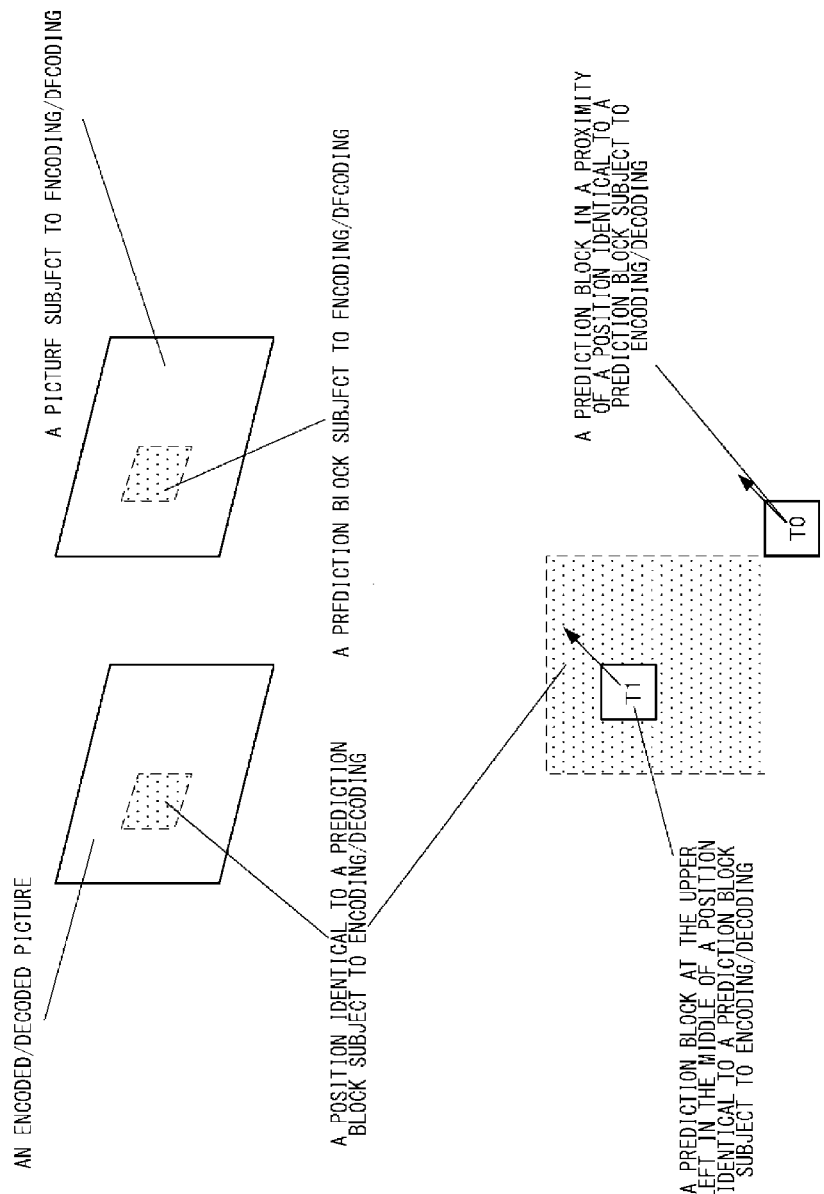
FIG. 9 illustrates a prediction block to be referred to when deriving a time merge candidate in a merge mode.

As shown in FIG. 8, also in case that the size of a prediction block G adjacent to the upper edge of the prediction block subject to encoding or decoding is bigger than the prediction block subject to encoding or decoding, in accordance with the conditions described above, the prediction block G is defined as a prediction block B if the prediction block G is adjacent to the upper edge of the prediction block subject to encoding or decoding, is defined as a prediction block C if the prediction block G is adjacent to the upper right vertex of the prediction block subject to encoding or decoding, and is defined as a prediction block E if the prediction block G is adjacent to the upper left vertex of the prediction block subject to encoding or decoding. According to the example shown in FIG. 8, a prediction block B, a prediction block C, and a prediction block E are an identical prediction block.

As shown in FIG. 9, an encoded or decoded prediction blocks T0 and T1 in a picture different in time from a picture of the prediction block subject to encoding or decoding and at a position identical to or in the proximity of the prediction block subject to encoding or decoding are defined as a prediction block at a same position different in time.

(Regarding POC)

POC is defined as a parameter that is associated with a picture subject to encoding, and a value that increases one at a time in the output order of pictures is defined as PCD. By the value of POC, whether or not pictures are identical with each other can be determined, whether a picture is previous to or subsequent to another picture in an output order can be determined, or a distance between pictures can be derived. For example, in case that POCs of two pictures have an identical value, the pictures can be determined to be an identical picture. In case that POCs of two pictures have different values, a picture with a smaller POC value is determined to be a picture that is to be output before the other picture, and a difference between POCs of two pictures represents a distance between the pictures along the time axis.

Figure 1:
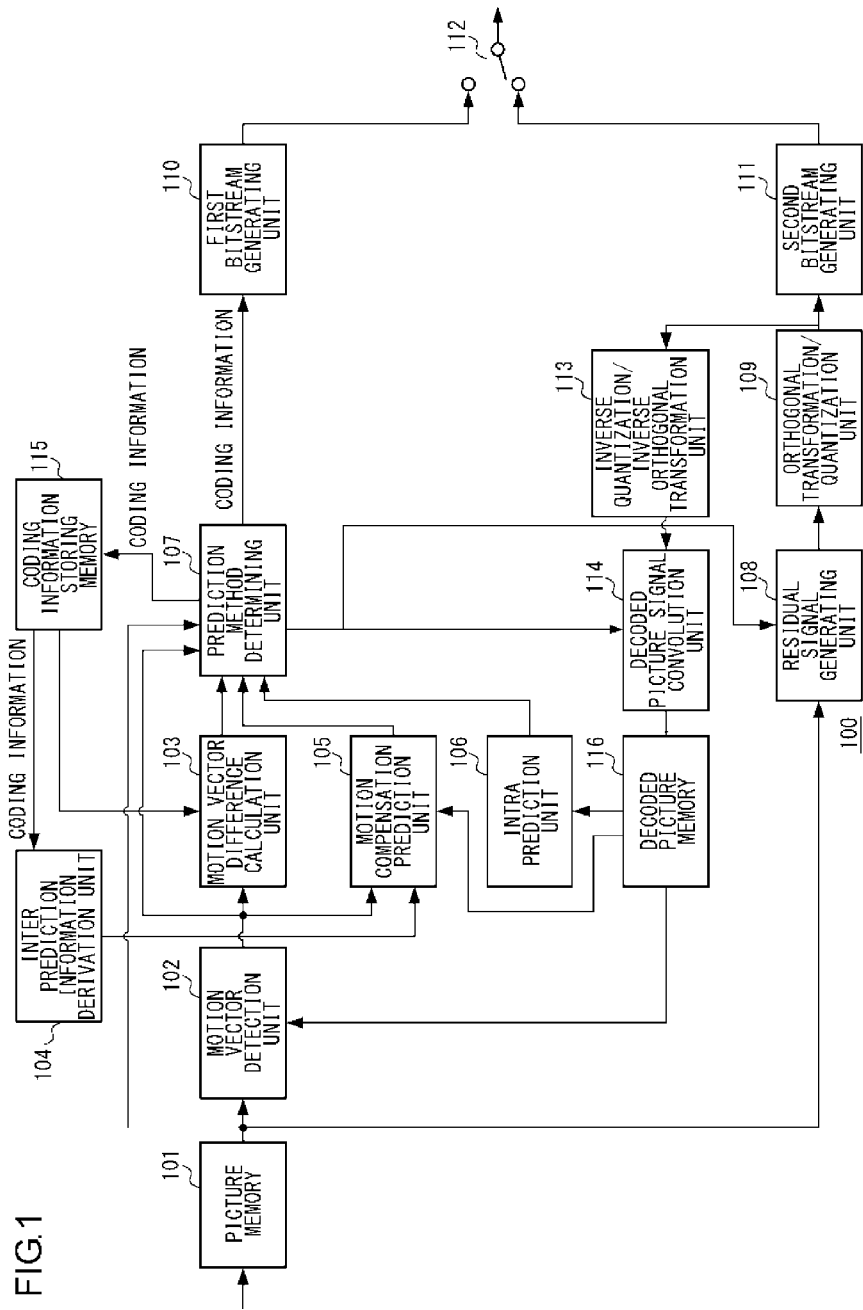
FIG. 1 is a block diagram illustrating a structure of a moving picture encoding device that executes a method for predicting a motion vector according to an embodiment.

An explanation will be given below on the embodiment of the invention while referring to figures. FIG. 1 is a block diagram showing a structure of a moving picture encoding device according to an embodiment of the invention. The moving picture encoding device according to the embodiment comprises a picture memory 101, a motion vector detection unit 102, a motion vector difference calculation unit 103, an inter prediction information derivation unit 104, a motion compensation prediction unit 105, an intra prediction unit 106, a prediction method determining unit 107, a residual signal generating unit 108, an orthogonal transformation/quantization unit 109, a first bitstream generating unit 110, a second bitstream generating unit 111, a multiplexing unit 112, an inverse quantization/inverse orthogonal transformation unit 113, a decoded picture signal convolution unit 114, a coding information storing memory 115, and a decoded picture memory 116.

The picture memory 101 temporarily stores a picture signal of a picture subject to encoding, the signal having been provided in the order of capturing and/or in the order of display time. The picture memory 101 provides the stored picture signal of a picture subject to encoding, in units of predetermined pixel blocks, to the motion vector detection unit 102, the prediction method determining unit 107, and the residual signal generating unit 108. In this process, the picture signals of pictures stored in the order of capturing and/or in the order of display time are rearranged in the order of encoding, and outputted from the picture memory 101 in units of pixel blocks.

The motion vector detection unit 102 detects motion vectors for respective prediction block size and respective prediction modes for each prediction block by block matching or the like between a picture signal provided from the picture memory 101 and a reference picture provided from the decoded picture memory 116. The motion vector detection unit 102 provides the detected motion vector to the motion compensation prediction unit 105, the motion vector difference calculation unit 103, and the prediction method determining unit 107.

By using coding information of a picture signal already encoded and stored in the coding information storing memory 115, the motion vector difference calculation unit 103 calculates a plurality of candidates of a motion vector predictor and stores the candidates in a motion vector predictor list, selects an optimal motion vector predictor from the plurality of candidates of a motion vector predictor registered in the motion vector predictor list, calculates a motion vector difference from the motion vector detected by the motion vector detection unit 102 and from the motion vector predictor, and provides the calculated motion vector difference to the prediction method determining unit 107. Further, the motion vector difference calculation unit 103 provides the prediction method determining unit 107 with a motion vector predictor index that specifies a motion vector predictor selected from the candidates of a motion vector predictor registered in the motion vector predictor list.

The inter prediction information derivation unit 104 derives a merge candidate in a merge mode. By using coding information of a prediction block having already been encoded and stored in the coding information storing memory 115, the inter prediction information derivation unit 104 derives a plurality of merge candidates and registers the candidates in a merge candidate list, which will be described below, selects an appropriate merge candidate from the plurality of merge candidates registered in the merge candidate list, provides the motion compensation prediction unit 105 with inter prediction information (e.g., flags predFlagL0

[xP][yP] and predFlagL1[xP][yP] indicating whether or not to use L0 prediction and/or L1 prediction, reference indexes refIdxL0[xP][yP] and refIdxL1[xP][yP], motion vectors mvL0[xP][yP] and mvL1[xP][yP], or the like) of each prediction block of the selected merge candidate, and provides the prediction method determining unit 107 with a merge index that specifies the selected merge candidate. xP and yP are indexes indicating the position of an upper left pixel in a prediction block in a picture. The detailed configuration and operation of the inter prediction information derivation unit 104 will be given later.

The motion compensation prediction unit 105 generates from a reference picture a prediction picture signal by inter prediction (motion compensation prediction) by using a motion vector detected by the motion vector detection unit 102 and the inter prediction information derivation unit 104, and provides the prediction picture signal to the prediction method determining unit 107. In L0 prediction and in L1 prediction, one-directional prediction is performed. In case of bi-prediction (Pred_BI), prediction for two directions are performed, respective inter-predicted signals for L0 prediction and L1 prediction are multiplied by a weighting coefficient adaptively, an offset value is added, and convolution is performed so as to generate an ultimate prediction picture signal.

The intra prediction unit 106 performs intra prediction for each intra prediction mode. The intra prediction unit 106 generates a prediction picture signal by intra prediction from a decoded picture signal stored in the decoded picture memory 211, selects an appropriate intra prediction mode from a plurality of intra prediction modes, and provides the prediction method determining unit 107 with a selected intra prediction mode and a prediction picture signal according to the selected intra prediction mode.

The prediction method determining unit 107 determines a prediction mode PredMode and a partition mode PartMode that determine inter prediction (PRED_INTER) or intra prediction (PRED_INTRA) in units of optimal coding blocks from a plurality of prediction methods, by evaluating an amount of code of coding information and a residual signal, an amount of distortion between a prediction picture signal and a picture signal or the like for respective prediction methods. In case of inter prediction (PRED_INTER), the prediction method determining unit 107 determines whether or not a mode is a merge mode in units of prediction blocks. In case that the mode is a merge mode, the prediction method determining unit 107 determines a merge index, and in case that the mode is not a merge mode, determines an inter prediction mode, a motion vector predictor index, reference indexes of L0 and L1, a motion vector difference, or the like, and provides the first bitstream generating unit 110 with coding information according to the determination.

Further, the prediction method determining unit 107 stores information indicating the determined prediction method, and coding information including a motion vector or the like according to the determined prediction method in the coding information storing memory 115. The coding information to be stored includes: a prediction mode PredMode and a partition mode PartMode of respective coding blocks; flags predFlagL0[xP][yP] and predFlagL1[xP][yP] indicating whether or not to use L0 prediction and L1 prediction of each prediction block; reference indexes refIdxL0[xP][yP] and refIdxL1[xP][yP] of L0 and L1; motion vectors mvL0[xP][yP] and mvL1[xP][yP] of L0 and L1; or the like. xP and yP are indexes indicating the position of an upper left pixel in a prediction block in a picture. In case that the prediction mode PredMode is intra prediction (MODE_INTRA), both flags, predFlagL0[xP][yP] indicating whether or not to use L0 prediction and predFlagL1[xP][yP] indicating whether or not to use L1 prediction, are 0. On the other hand, in case that the prediction mode PredMode is inter prediction (MODE_INTER) and the inter prediction mode is L0 prediction (Pred_L0), the flag predFlagL0[xP][yP] indicating whether or not to use L0 prediction is 1, and the flag predFlagL1[xP][yP] indicating whether or not to use L1 prediction is 0. In case that the inter prediction mode is L1 prediction (Pred_L1), the flag predFlagL0[xP][yP] indicating whether or not to use L0 prediction is 0, and the flag predFlagL1[xP][yP] indicating whether or not to use L1 prediction is 1. In case that the inter prediction mode is bi-prediction (Pred_BI), both flags, predFlagL0[xP][yP] indicating whether or not to use L0 prediction and predFlagL1[xP][yP] indicating whether or not to use L1 prediction, are 1. The prediction method determining unit 107 provides the residual signal generating unit 108 and the decoded picture signal convolution unit 114 with a prediction picture signal according to the determined prediction mode.

The residual signal generating unit 108 generates a residual signal by performing subtraction between a picture signal subject to encoding and a prediction picture signal, and provides the residual signal to the orthogonal transformation/quantization unit 109. The orthogonal transformation/quantization unit 109 performs orthogonal transformation and quantization on the residual signal in accordance with a quantization parameter so as to generate orthogonally-transformed and quantized residual signal and provides the orthogonally-transformed and quantized residual signal to the second bitstream generating unit 111 and to the inverse quantization/inverse orthogonal transformation unit 113. Further, the orthogonal transformation/quantization unit 109 stores the quantization parameter in the coding information storing memory 115.

the first bitstream generating unit 110 encodes coding information according to a prediction method determined for each coding block and each prediction block by the prediction method determining unit 107, in addition to information for each sequence, each picture, each slice, and each coding block. More specifically, the first bitstream generating unit 110 encodes coding information, such as, a prediction mode PredMode for each coding block, a partition mode PartMode, a flag determining whether or not a mode is a merge mode in case of inter prediction (PRED_INTER), a merge index in case of merge mode, an inter prediction mode in case that the mode is not a merge mode, a motion vector predictor index, information regarding a motion vector difference, or the like, in accordance with a prescribed syntax rule, which will be described later, so as to generate a first bitstream and provides the first bitstream to the multiplexing unit 112.

The second bitstream generating unit 111 entropy encodes the orthogonally-transformed and quantized residual signal in accordance with a prescribed syntax rule so as to generate a second bitstream and provides the second bitstream to the multiplexing unit 112. In the multiplexing unit 112, the first bitstream and the second bitstream are multiplexed in accordance with a prescribed syntax rule so as to generate a bitstream.

The inverse quantization/inverse orthogonal transformation unit 113 inverse quantizes and inverse-orthogonally transforms the orthogonally-transformed and quantized residual signal provided from the orthogonal transformation/quantization unit 109 so as to calculate a residual signal, and provide the residual signal to the decoded picture signal convolution unit 114. The decoded picture signal convolution unit 114 convolves the prediction picture signal according to the determination by the prediction method determining unit 107 and the residual signal that is inverse-quantized and inverse-orthogonally-transformed in the inverse quantization/inverse orthogonal transformation unit 113 so as to generate a decoded picture and stores the decoded picture in the decoded picture memory 116. Depending on circumstances, a filtering process that reduces distortion such as block distortion or the like caused by coding is performed on the decoded picture and the decoded picture is stored in the decoded picture memory 116, accordingly.

FIG. 1 is a block diagram showing a structure of a moving picture decoding device according to an embodiment of the invention, the moving picture decoding device corresponding to the moving picture encoding device of FIG. 1. The moving picture decoding device according to the embodiment comprises a separation unit 201, a first bitstream decoding unit 202, a second bitstream decoding unit 203, a motion vector calculation unit 204, an inter prediction information derivation unit 205, a motion compensation prediction unit 206, an intra prediction unit 207, an inverse quantization/inverse orthogonal transformation unit 208, a decoded picture signal convolution unit 209, a coding information storing memory 210, and a decoded picture memory 211.

Figure 2:
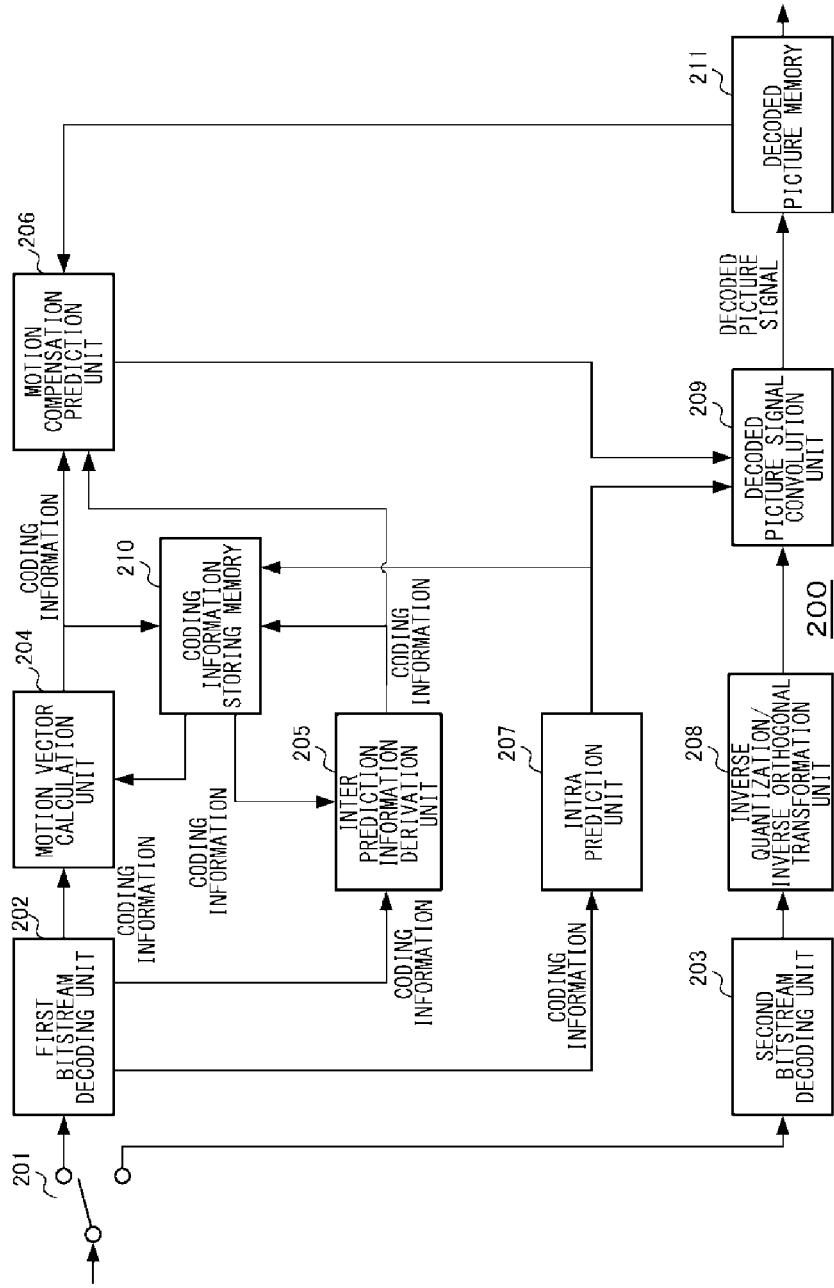
FIG. 2 is a block diagram illustrating a structure of the moving picture decoding device that executes a method for predicting a motion vector according to the embodiment.

Decoding process of the moving picture decoding device of FIG. 2 corresponds to the decoding process provided in the moving picture encoding device of FIG. 1. Therefore, respective configurations of the motion compensation prediction unit 206, the inverse quantization/inverse orthogonal transformation unit 208, the decoded picture signal convolution unit 209, the coding information storing memory 210, and the decoded picture memory 211 of FIG. 2 have a function corresponding to respective configurations of the motion compensation prediction unit 105, the inverse quantization/inverse orthogonal transformation unit 113, the decoded picture signal convolution unit 114, the coding information storing memory 115, and the decoded picture memory 116 of the moving picture encoding device of FIG. 1.

The bitstream provided to the separation unit 201 is separated in accordance with a prescribed syntax rule. The separated first bitstream is provided to the first bitstream decoding unit 202, and the second bitstream is provided to the second bitstream decoding unit 203.

The first bitstream decoding unit 202 decodes the provided bitstream and obtains information for each sequence, each picture, each slice, and each coding block, and coding information for each prediction block. More specifically, the first bitstream decoding unit 202 decodes coding information regarding, for example, a prediction mode PredMode that determines whether prediction is inter prediction (PRED_INTER) or intra prediction (PRED_INTRA) for each coding block, a partition mode PartMode, a flag determines whether or not a mode is a merge mode in case of inter prediction (PRED_INTER), a merge index in case that the mode is a merge mode, an inter prediction mode in case that the mode is not a merge mode, a motion vector predictor index, a motion vector difference, or the like, in accordance with a prescribed syntax rule, which will be described later, and provides the coding information to the motion vector calculation unit 204, the inter prediction information derivation unit 205 or the intra prediction unit 207.

The second bitstream decoding unit 203 decodes the provided bitstream so as to calculate an orthogonally-transformed and quantized residual signal and provides the orthogonally-transformed and quantized residual signal to the inverse quantization/inverse orthogonal transformation unit 208.

If the prediction mode PredMode of a prediction block subject to decoding is inter prediction (PRED_INTER) and not a merge mode, the motion vector calculation unit 204 derives, by using coding information of a picture signal already decoded and stored in the coding information storing memory 210, a plurality of candidates of a motion vector predictor and registers the candidates in a motion vector predictor list, which will be described later. The motion vector calculation unit 204 selects a motion vector predictor according to a motion vector predictor index, which is decoded in the first bitstream decoding unit 202 and provided, from the plurality of candidates of a motion vector predictor registered in the motion vector predictor list, calculates a motion vector from the difference vector decoded in the first bitstream decoding unit 202 and from the selected motion vector predictor. The motion vector calculation unit 204 provides the motion compensation prediction unit 206 with the motion vector with other coding information, and stores the motion vector and other coding information in the coding information storing memory 210. The coding information to be provided and stored in this process includes: a prediction mode PredMode; partition mode PartMode; flags predFlagL0[xP][yP] and predFlagL1[xP][yP] indicating whether or not to use L0 prediction and L1 prediction respectively; reference indexes refIdxL0[xP][yP] and refIdxL1[xP][yP] of L0 and L1; motion vectors mvL0[xP][yP] and mvL1[xP][yP] of L0 and L1; or the like. xP and yP are indexes indicating the position of an upper left pixel in a prediction block in a picture. In case that the prediction mode PredMode is inter prediction (MODE_INTER) and the inter prediction mode is L0 prediction (Pred_L0), the flag predFlagL0 indicating whether or not to use L0 prediction is 1, and the flag predFlagL1 indicating whether or not to use L1 prediction is 0. In case that the inter prediction mode is L1 prediction (Pred_L1), the flag predFlagL0 indicating whether or not to use L0 prediction is 0, and the flag predFlagL1 indicating whether or not to use L1 prediction is 1. In case that the inter prediction mode is bi-prediction (Pred_BI), a flag predFlagL0 indicating whether or not to use L0 prediction and a flag predFlagL1[xP][yP] indicating whether or not to use L1 prediction are both 1.

If the prediction mode PredMode of a prediction block subject to decoding is inter prediction (PRED_INTER) and if the mode is a merge mode, the inter prediction information derivation unit 205 derives a merge candidate. By using coding information of a prediction block having already been decoded and stored in the coding information storing memory 115, the inter prediction information derivation unit 205 derives a plurality of merge candidates and registers the candidates in a merge candidate list, which will be described later. The inter prediction information derivation unit 205 selects, from the plurality of merge candidates registered in the merge candidate list, a merge candidate corresponding to a merge index that is decoded in the first bitstream decoding unit 202 and provided. The inter prediction information derivation unit 205 provides the motion compensation prediction unit 206 with inter prediction information of the selected merge candidate such as, flags predFlagL0[xP][yP] and predFlagL1[xP][yP] indicating whether or not to use L0 prediction and L1 prediction, reference indexes refIdxL0[xP][yP] and refIdxL1[xP][yP] of L0 and L1, motion vectors mvL0[xP][yP] and mvL1[xP][yP] of L0 and L1, or the like, and stores the inter prediction information in the coding information storing memory 210. xP and yP are indexes indicating the position of an upper left pixel in a prediction block in a picture. The detail on the configuration and operation of the inter prediction information derivation unit 205 will be given later.

The motion compensation prediction unit 206 generates a prediction picture signal by inter prediction (motion compensation prediction) by using inter prediction information calculated in the motion vector calculation unit 204 or in the inter prediction information derivation unit 205 from a reference picture stored in the decoded picture memory 211, and provides the prediction picture signal to the decoded picture signal convolution unit 209. In case of bi-prediction (Pred_BI), two motion compensation prediction picture signals of L0 prediction and L1 prediction are multiplied by a weighting coefficient adaptively, and convolution is performed so as to generate an ultimate prediction picture signal.

The intra prediction unit 207 performs intra prediction when the prediction mode PredMode of a prediction block to be decoded is intra prediction (PRED_INTRA). The coding information decoded in the first bitstream decoding unit includes an intra prediction mode. Based on the intra prediction mode, a prediction picture signal is generated by intra prediction from the decoded picture signal stored in the decoded picture memory 211, and provided to the decoded picture signal convolution unit 209. Both flags, predFlagL0[xP][yP] and predFlagL1[xP][yP] indicating whether or not to use L0 prediction and L1 prediction, are set to 0 and stored in the coding information storing memory 210. xP and yP are indexes indicating the position of an upper left pixel in a prediction block in a picture.

The inverse quantization/inverse orthogonal transformation unit 208 inverse-orthogonally transforms and inverse quantizes the orthogonally-transformed and quantized residual signal, which is decoded in the first bitstream decoding unit 202, and obtains an inverse-orthogonally transformed and inverse quantized residual signal.

The decoded picture signal convolution unit 209 decodes a decoded picture signal by convolving the prediction picture signal that is inter predicted in the motion compensation prediction unit 206 or the prediction picture signal that is intra predicted in the intra prediction unit 207 and the residual signal that is inverse-orthogonally-transformed and inverse-quantized by the inverse quantization/inverse orthogonal transformation unit 208, and stores the decoded picture signal in the decoded picture memory 211. When the decoded picture is stored in the decoded picture memory 211, a filtering process that reduces distortion such as block distortion or the like caused by coding is performed on the decoded picture and the decoded picture is stored in the decoded picture memory 211, depending on circumstances.

(Regarding Syntax)

Next, an explanation will be given on syntax that is a common rule for encoding and decoding of a bitstream of a moving picture, which is encoded by a moving picture encoding device provided with a method for predicting a motion vector according to the present embodiment, and which is decoded by a decoding device.

FIG. 10 shows a first syntax structure that is described in a slice header for each slice of a bitstream generated in accordance with the present embodiment. The figure shows only syntax elements related to the present embodiment. In case that a slice type is a B slice, a flag collocated_from_l0_flag is established. The flag collocated_from_l0_flag indicates which of the reference pictures a picture colPic of a different time uses, namely, a reference picture registered in a reference list of L0 or a reference picture registered in a reference list of L1 of a picture including a prediction block subject to processing. The picture colPic of a different time is used when deriving a candidate of a motion vector predictor over time or when deriving a merge candidate. The detail on the flag collocated_from_l0_flag will be described later.

The syntax elements described above may be established in a picture parameter set that describes a syntax element that is set for each picture.

FIG. 11 shows a syntax pattern described for each prediction block. In case that the value of the prediction mode PredMode of a prediction block is inter prediction (MODE_INTER), merge_flag[x0][y0] that indicates whether or not a mode is a merge mode is established. x0 and y0 are indexes indicating the position of an upper left pixel in a prediction block in a picture of brightness signals, and merge_flag[x0][y0] is a flag indicating whether or not the mode of a prediction block positioned at (x0, y0) in the picture is a merge mode or not.

Next, in case that merge_flag[x0][y0] is 1, which indicates that the mode is a merge mode, a syntax element merge_idx[x0][y0] of an index of a merge list, which is a list of merge candidates to be referred to, is established. x0 and y0 are indexes indicating the position of an upper left pixel in a prediction block in a picture, and merg_e flag[x0][y0] is a merge index of a prediction block positioned at (x0, y0) in the picture. FIG. 12 shows an example of an entropy code of a syntax element merg_e idx[x0][y0] of a merge index. According to the present embodiment, the number of candidates of merge is set to 5. When the merge index is 0, 1, 2, 3, and 4, the code of syntax element merge_idx[x0][y0] of a merge index is '0', '10', '110', '1110', and '1111', respectively.

On the other hand, in case that merge_flag[x0][y0] is 0, the merge_flag[x0][y0] indicates that the mode is not a merge mode, and in case that the slice type is a B slice, a syntax element inter_pred_flag[x0][y0] that identifies an inter prediction mode is established. By this syntax element, L0 prediction (Pred_L0), L1 prediction (Pred_L1), and bi-prediction (Pred_BI) are distinguished. For each L0 and L1, syntax elements of reference index ref_idx_l0[x0][y0] and ref_idx_l1[x0][y0] for specifying a reference picture, and syntax elements mvd_l0[x0][y0][j] and mvd_l1[x0][y0][j] of a motion vector difference, which is a difference between a motion vector of a prediction block derived by detection of a motion vector and a motion vector predictor, are established. x0 and y0 are indexes indicating the position of an upper left pixel in a prediction block in a picture. ref_idx_l0[x0][y0] and mvd_l0[x0][y0][j] are a reference index and a motion vector difference of L0 of a prediction block positioned at (x0, y0) in the picture, respectively. ref_idx_l1[x0][y0], mvd_l1[x0][y0][j] are a reference index and a motion vector difference of L1 of a prediction block positioned at (x0, y0) in the picture, respectively. j indicates components of motion vector difference. A value 0 for j represents x component, and a value 1 for j represents y component. Next, syntax elements mvp_idx_l0[x0][y0] and mvp_idx_l1[x0][y0] of index of a motion vector predictor list, which is a list of candidates of motion vector predictor to be referred to, is established. x0 and y0 are indexes indicating the position of an upper left pixel in a prediction block in a picture. mvp_idx_l0[x0][y0] and mvp_idx_l1[x0][y0] are motion vector predictor index of L0 and L1 of a prediction block positioned at (x0, y0) in the picture. According to the present embodiment, the value of the number of candidates is set to 2.

A method for deriving inter prediction information according to the embodiment is performed in the inter prediction information derivation unit 104 of the moving picture encoding device of FIG. 1 and in the inter prediction information derivation unit 205 of the moving picture decoding device of FIG. 2.

Next, an explanation will be given on the method for deriving inter prediction information according to an embodiment while referring to figures. The method for deriving inter prediction information is executed for each prediction block that constitutes a coding block at any of the encoding processes or decoding processes. If a prediction mode PredMode of a prediction block is inter prediction (MODE_INTER) and a mode is a merge mode, and in case of encoding, the method is used when deriving a prediction mode, a reference index, and a motion vector of a prediction block subject to encoding by using a prediction mode, a reference index, and a motion vector of an encoded prediction block. In case of decoding, the method is used when deriving a prediction mode, a reference index, and a motion vector of a prediction block subject to decoding by using a prediction mode, a reference index, and a motion vector of a decoded prediction block.

In a merge mode, a merge candidate is derived not only from the five prediction blocks (i.e., a prediction block A adjacent to the left, a prediction block B adjacent to the top, a prediction block C adjacent to the upper right, a prediction block D adjacent to the lower left, and a prediction block E adjacent to the upper left) explained while referring to FIGS. 5, 6, 7, and 8, but also from a prediction block of a prediction block Col (T0 or T1) at an identical position or in a proximity and different in time, which has been explained while referring to FIG. 9. The inter prediction information derivation unit 104 of the moving picture encoding device and the inter prediction information derivation unit 205 of the moving picture decoding device register those merge candidates in merge candidate list in prescribed order that is common between encoding and decoding. The inter prediction information derivation unit 104 of the moving picture encoding device determines a merge index that specifies an element of a candidate list and encodes via a first bitstream generating unit. The inter prediction information derivation unit 205 of the moving picture decoding device selects a prediction block from the merge candidate list in accordance with a merge index decoded in the first bitstream decoding unit 202 and provided, and performs motion compensation prediction by using inter prediction information (e.g., a prediction mode, a reference index, a motion vector, or the like) of the selected merge candidate.

Figure 13:
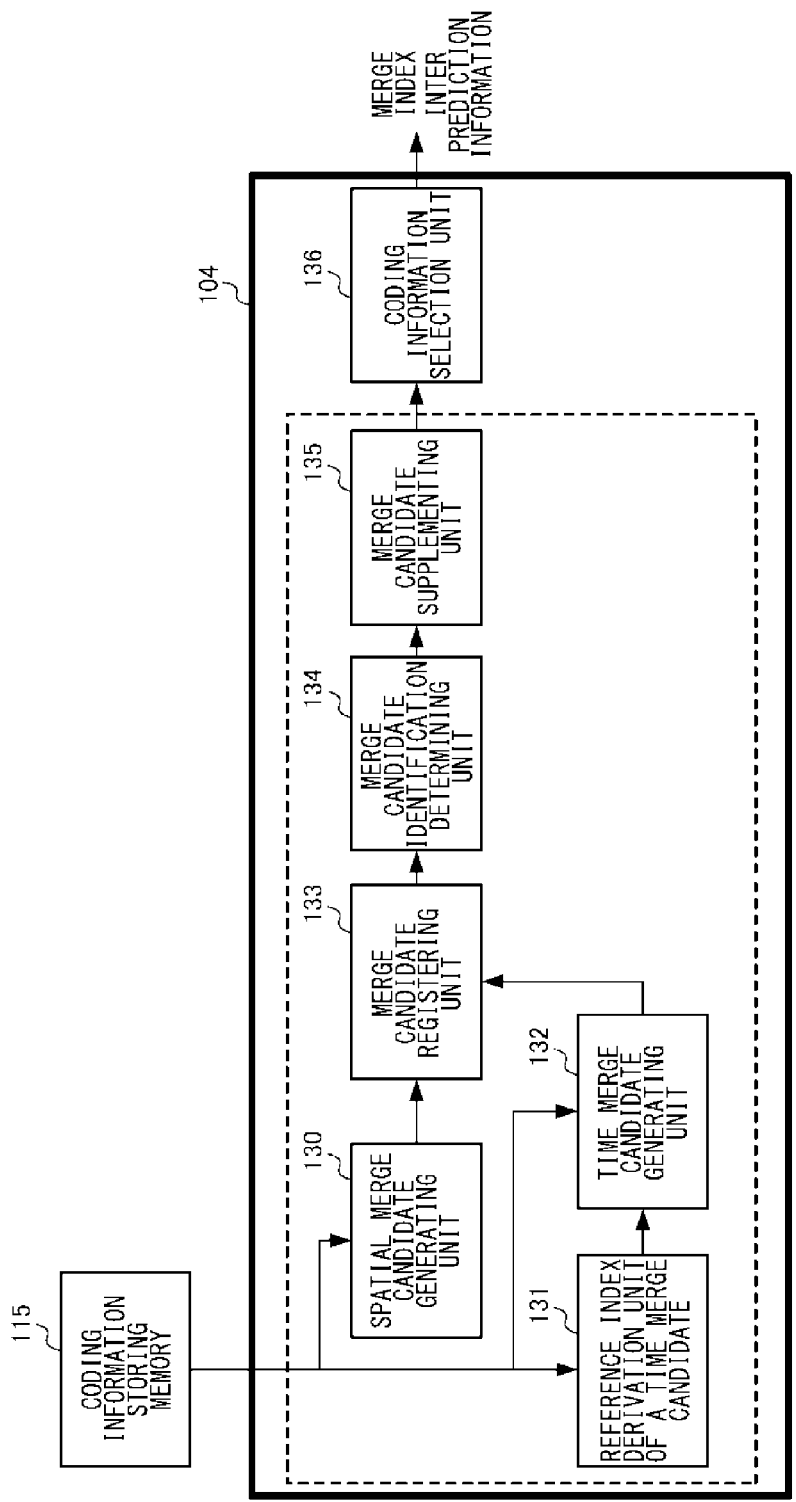
FIG. 13 is a block diagram showing a detailed configuration of an inter prediction information derivation unit of the moving picture encoding device of FIG. 1.
Figure 14:
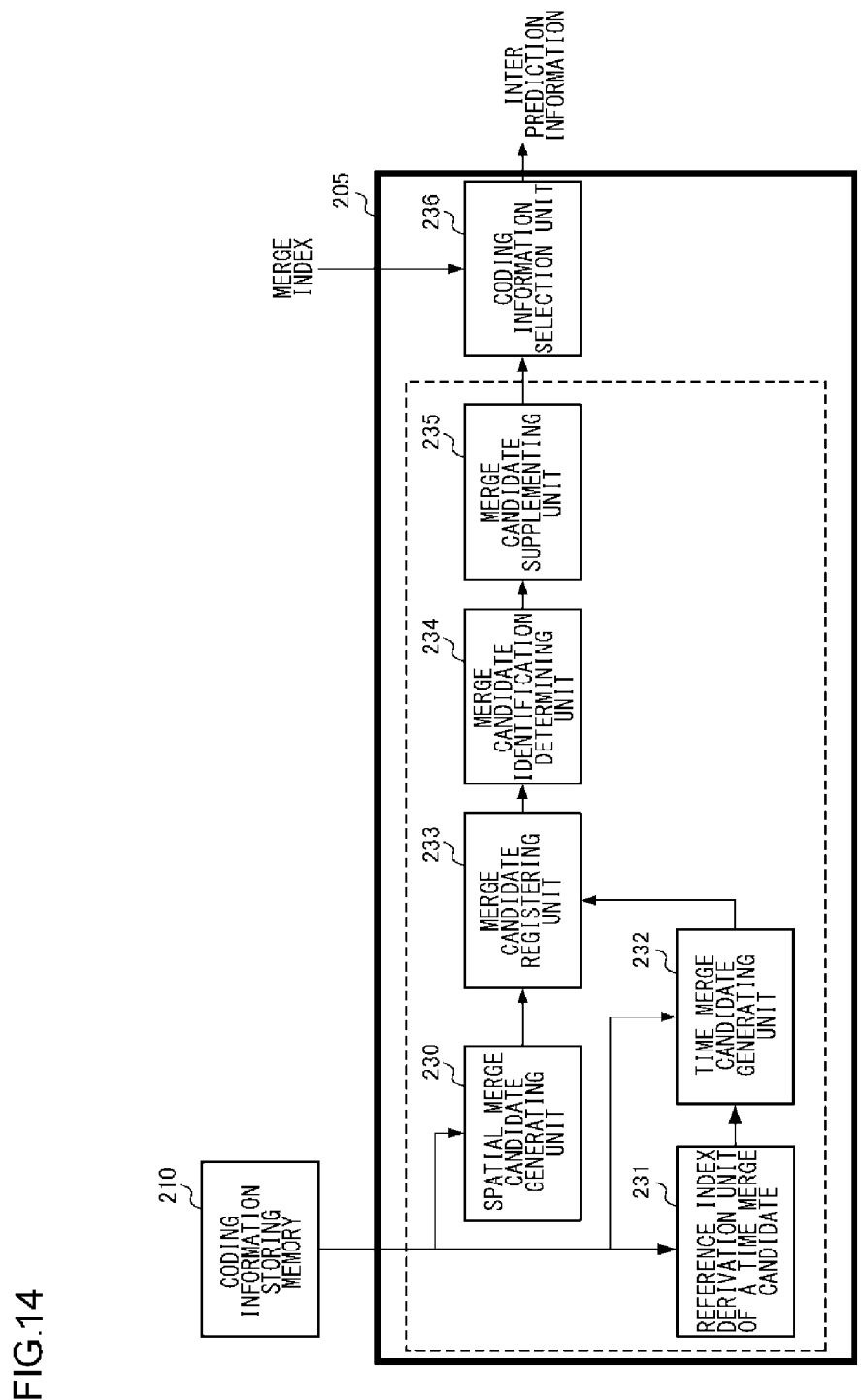
FIG. 14 is a block diagram showing a detailed configuration of an inter prediction information derivation unit of the moving picture decoding device of FIG. 2.

FIG. 13 shows a detailed configuration of the inter prediction information derivation unit 104 of the moving picture encoding device of FIG. 1. FIG. 14 shows a detailed configuration of the inter prediction information derivation unit 205 of the moving picture decoding device of FIG. 2.

Portions surrounded by a thick line box in FIGS. 13 and 14 indicate the inter prediction information derivation unit 104 of the moving picture encoding device and the inter prediction information derivation unit 205 of the moving picture decoding device, respectively.

In addition, portions surrounded by a thick dotted line in the boxes indicate a construction unit 120 of merge candidate list of the moving picture encoding device and a construction unit 220 of merge candidate list of the moving picture decoding device, respectively. The construction unit of merge candidate list is provided also in the moving picture decoding device that corresponds to the moving picture encoding device according to the embodiment so that same derivation results that do not contradict between encoding and decoding can be obtained.

According to the method for deriving inter prediction information according to the embodiment, in merge candidate derivation and in merge candidate list construction process in the construction unit 120 of merge candidate list of the moving picture encoding device and the construction unit 220 of merge candidate list of the moving picture decoding device, it is assumed that merge candidate derivation and merge candidate list construction process of a prediction block subject to processing are performed without referring to a prediction block included in a coding block identical to a coding block including a prediction block subject to processing. In this manner, in case that the partition mode (PartMode) of a coding block is not 2N by 2N partition (PART_2N×2N), that is, in case that a plurality of prediction blocks exist in a coding block, merge candidate derivation and merge candidate list construction process of a prediction block subject to processing for each prediction block can be performed in parallel in a coding block at encoding.

Figure 15:
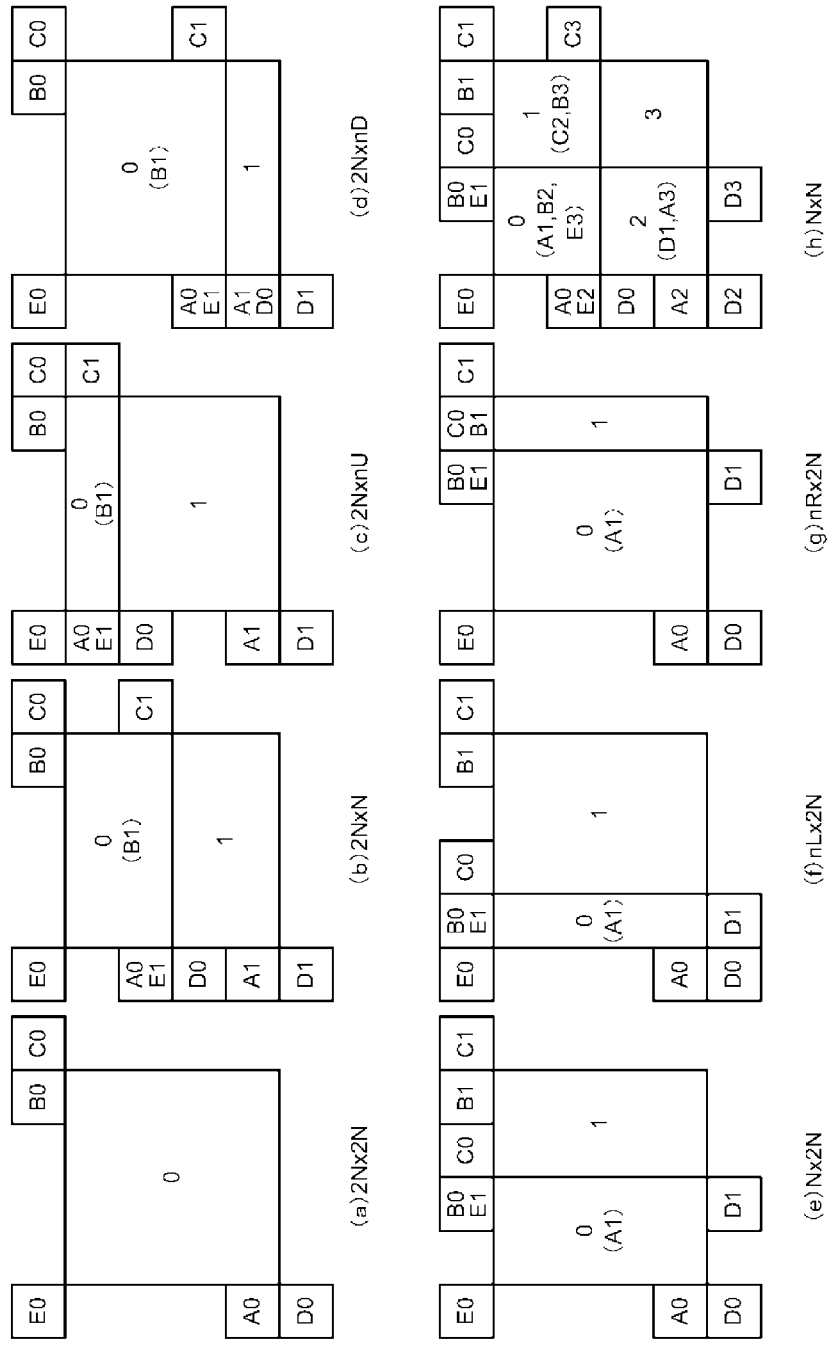
FIG. 15 illustrates a prediction block in the proximity of a prediction block subject to processing in a merge mode.

An explanation will be given for each partition mode (PartMode) on the parallel processes of merge candidate list construction of respective prediction block in a coding block while referring to FIG. 15. FIG. 15 illustrates a prediction block that is in the proximity of a prediction block subject to processing for each partition mode (PartMode) of the prediction block subject to processing. In FIG. 15, A0, B0, C0, D0, and E0 indicates: a prediction block A adjacent to the left edge of the prediction block subject to processing of which the partition index PartIdx is 0; a prediction block B adjacent to the upper edge thereof; a prediction block C adjacent to the upper right vertex thereof; a prediction block D adjacent to the lower left vertex thereof; and a prediction block E adjacent to the upper left vertex thereof, respectively. A1, B1, C1, D1, and E1 indicates: a prediction block A adjacent to the left edge of the prediction block subject to processing of which the partition index PartIdx is 1; a prediction block B adjacent to the upper edge thereof; a prediction block C adjacent to the upper right vertex thereof; a prediction block D adjacent to the lower left vertex thereof; and a prediction block E adjacent to the upper left vertex thereof, respectively. A2, B2, C2, D2, and E2 indicates: a prediction block A adjacent to the left edge of the prediction block subject to processing of which the partition index PartIdx is 2; a prediction block B adjacent to the upper edge thereof; a prediction block C adjacent to the upper right vertex thereof; a prediction block D adjacent to the lower left vertex thereof; and a prediction block E adjacent to the upper left vertex thereof, respectively. A3, B3, C3, D3, and E3 indicates: a prediction block A adjacent to the left edge of the prediction block subject to processing of which the partition index PartIdx is 3; a prediction block B adjacent to the upper edge thereof; a prediction block C adjacent to the upper right vertex thereof; a prediction block D adjacent to the lower left vertex thereof; and a prediction block E adjacent to the upper left vertex thereof, respectively.

FIGS. 15B, 15C, and 15D show prediction blocks in the proximity in case that a partition mode (PartMode) is 2N by N partition (PART_2N×N), 2N by nU partition (PART_2N×nU), or 2N by nD partition (PART_2N×nD), where a coding block subject to processing is partitioned into two prediction blocks arranged vertically. The prediction block B1 in the proximity of a prediction block subject to processing of which PartIdx is 1, is a prediction block of which PartIdx is 0. Therefore, merge candidate derivation and merge candidate list construction of a prediction block, of which PartIdx is 1, by referring to the prediction block B1 cannot be processed until merge candidate derivation and merge candidate list construction process of a prediction block, which is a prediction block B1 and belongs to a same coding block and of which PartIdx is 0, is completed and a merge candidate to be used is specified. Therefore, in the method for deriving inter prediction information according to the embodiment, in case that a partition mode is 2N by N partition (PART_2N×N), 2N by nU partition (PART_2N×nU), or 2N by nD partition (PART_2N×nD), and in case that PartIdx of a prediction block subject to processing is 1, merge candidate derivation and merge candidate list construction process of two prediction blocks in the coding block can be processed in parallel by referring to coding information of the prediction block A1, C1, D1, or E1, which are not included in a coding block identical to a coding block including the prediction block subject to processing, and by performing merge candidate derivation and merge candidate list construction process of a prediction block of which PartIdx is 1, without referring to coding information of the prediction block B1, which is a prediction block adjacent to the upper edge of the prediction block subject to processing, and is included in a coding block identical to a coding block including the prediction block subject to processing, and of which PartIdx is 0.

FIGS. 15F, 15F, and 15G show prediction blocks in the proximity in case that a partition mode (PartMode) is N by 2N partition (PART_N×2N), nL by 2N partition (PART_nL×2N), or nR by 2N partition (PART_nR×2N), where a coding block subject to processing is partitioned into two prediction blocks arranged horizontally. The prediction block A1 in the proximity of a prediction block subject to processing, of which PartIdx is 1, is a prediction block of which PartIdx is 0. Therefore, merge candidate derivation and merge candidate list construction of a prediction block, of which PartIdx is 1, by referring to the prediction block A1 cannot be processed until merge candidate derivation and merge candidate list construction process of a prediction block, which is a prediction block A1 and belongs to a same coding block and of which PartIdx is 0, is completed and a merge candidate to be used is specified. Therefore, in the method for deriving inter prediction information according to the embodiment, in case that a partition mode is N by 2N partition (PART_N×2N), nL by 2N partition (PART_nL×2N), and nR by 2N partition (PART_nR×2N), and in case that PartIdx of a prediction block subject to processing is 1, merge candidate derivation and merge candidate list construction process of respective prediction blocks in the coding block can be processed in parallel by referring to coding information of the prediction block B1, C1, D1, or E1, which are not included in a coding block identical to a coding block including the prediction block subject to processing, and by performing merge candidate derivation and merge candidate list construction process of a prediction block of which PartIdx is 1, without referring to coding information of the prediction block A1, which is a prediction block adjacent to the left edge of the prediction block subject to processing, and is included in a coding block identical to a coding block including the prediction block subject to processing, and of which PartIdx is 0.

Figure 16:
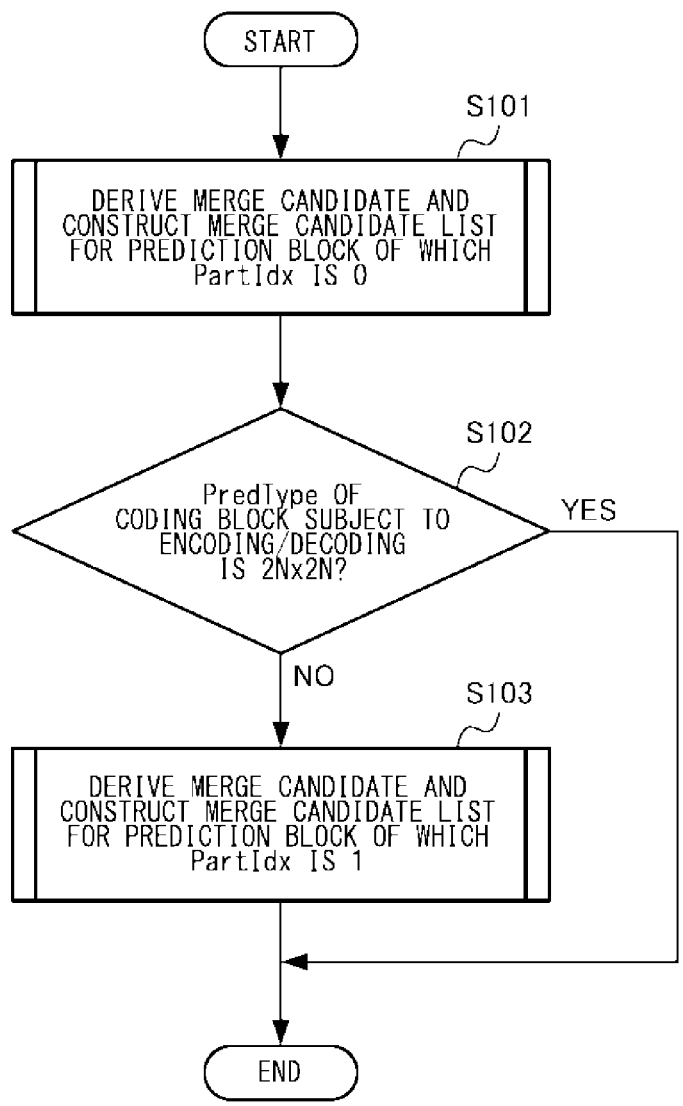
FIG. 16 shows a flowchart illustrating a processing procedure of sequential processing of merge candidate derivation process and merge candidate list construction process.

An explanation will be given on the parallel processing of merge candidate derivation and merge candidate list construction process. FIG. 16 shows a flowchart illustrating merge candidate derivation and merge candidate list construction process by sequential processing, and FIG. 17 shows a flowchart illustrating merge candidate derivation and merge candidate list construction process by parallel processing.

In the sequential processing of merge candidate derivation and merge candidate list construction process shown in FIG. 16, merge candidate is derived and merge candidate list is constructed for a prediction block, of which a partition index PartIdx is 0, of a coding block subject to processing (step S101). Next, in case that the partition mode (PartMode) is 2N by 2N partition (PART_2N×2N) (NO in step S102), the merge candidate derivation and merge candidate list construction process is completed. In case that the partition mode (PartMode) is not 2N by 2N partition (PART_2N×2N) (NO in step S102), that is, in case that the partition mode (PartMode) is the 2N by N partition (PART_2N×N), the 2N by nU partition (PART_2N×nU), the 2N by nD partition (PART_2N×nD), the N by 2N partition (PART_N×2N), the nL by 2N partition (PART_nL×2N), or the nR by 2N partition (PART_nR×2N), merge candidate is derived and merge candidate list is constructed for a prediction block, of which a partition index PartIdx is 1, of a coding block subject to processing (step S103), and the merge candidate derivation and merge candidate list construction process is completed, accordingly.

Figure 17:
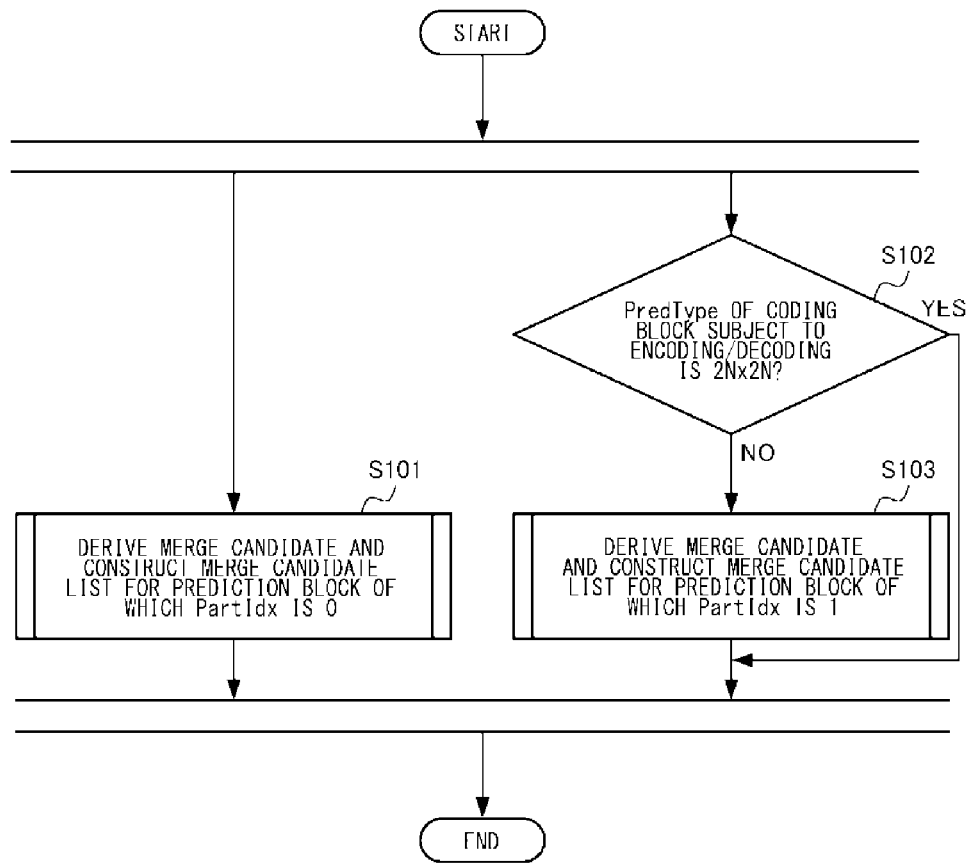
FIG. 17 shows a flowchart illustrating a processing procedure of parallel processing of merge candidate derivation process and merge candidate list construction process.

In the parallel processing of merge candidate derivation and merge candidate list construction process shown in FIG. 17, merge candidate is derived and merge candidate list is constructed for a prediction block, of which a partition index PartIdx is 0, of a coding block subject to processing (step S101). In parallel with the step S101, in case that the partition mode (PartMode) is not 2N by 2N partition (PART_2N×2N) (NO in step S102), that is, in case that the partition mode (PartMode) is the 2N by N partition (PART_2N×N), the 2N by nU partition (PART_2N×nU), the 2N by nD partition (PART_2N×nD), the N by 2N partition (PART_N×2N), the nL by 2N partition (PART_nL×2N), or the nR by 2N partition (PART_nR×2N), merge candidate is derived and merge candidate list is constructed for a prediction block, of which a partition index PartIdx is 1, of a coding block subject to processing (step S103).

In the parallel processing of merge candidate derivation and merge candidate list construction process shown in FIG. 17, in case that the partition mode (PartMode) is the 2N by N partition (PART_2N×N), the 2N by nU partition (PART_2N×nU), the 2N by nD partition (PART_2N×nD), the N by 2N partition (PART_N×2N), the nL by 2N partition (PART_nL×2N), or the nR by 2N partition (PART_nR×2N), merge candidate derivation and merge candidate list construction process of two prediction blocks, of which a partition index PartIdx are 0 and 1 respectively, can be started simultaneously, by performing merge candidate derivation and merge candidate list construction for a prediction block, of which a partition index PartIdx is 1, without referring to a prediction block, of which a partition index PartIdx is 0, in the same coding block.

Also in the sequential processing of merge candidate derivation and merge candidate list construction process shown in FIG. 16, merge candidate derivation and merge candidate list construction process of a prediction block, of which a partition index PartIdx is 1, can be performed without referring to a prediction block, of which a partition index PartIdx is 0.

Although it is assumed that N by N partition (PART_N×N) is not defined as a partition mode (PartMode) according to the present embodiment, it is also possible to define the N by N partition (PART_N×N). FIG. 15H shows prediction blocks in the proximity in case that the partition mode (PartMode) is N by N partition (PART_N×N) in which a brightness signal of a coding block subject to processing is partitioned into four blocks vertically and horizontally. The prediction block B1 in the proximity of a prediction block subject to processing, of which PartIdx is 1, is a prediction block of which PartIdx is 0. Therefore, merge candidate derivation and merge candidate list construction of a prediction block, of which PartIdx is 1, by referring to the prediction block A1 cannot be processed until merge candidate derivation and merge candidate list construction process of a prediction block, which is a prediction block A1 and belongs to a same coding block and of which PartIdx is 0, is completed and a merge candidate to be used is specified. Therefore, in the method for deriving inter prediction information according to the embodiment, in case that a partition mode is N by N partition (PART_N×N), and in case that PartIdx of a prediction block subject to processing is 1, merge candidate derivation and merge candidate list construction process of respective prediction blocks in the coding block can be processed in parallel by performing merge candidate derivation and merge candidate list construction process of a prediction block of which PartIdx is 1, without referring to coding information of the prediction block A1, of which PartIdx is 0. The prediction block B2 in the proximity of a prediction block subject to processing of which PartIdx is 2, is a prediction block of which PartIdx is 0, and the prediction block C2 is a prediction block of which PartIdx is 1. Therefore, merge candidate derivation and merge candidate list construction of a prediction block, of which PartIdx is 2, by referring to the prediction blocks B2 and C2 cannot be processed until merge candidate derivation and merge candidate list construction process of prediction blocks, which are prediction blocks B2 and C2 and belong to the same coding block and of which PartIdx are 0 and 1 respectively, is completed and a merge candidate to be used is specified. Therefore, in the method for deriving inter prediction information according to the embodiment, in case that a partition mode is N by N partition (PART_N×N), and in case that PartIdx of a prediction block subject to processing is 2, merge candidate derivation and merge candidate list construction process of respective prediction blocks in the coding block can be processed in parallel by performing merge candidate derivation and merge candidate list construction process of a prediction block of which PartIdx is 2, without referring to coding information of the prediction blocks B2 and C2, of which PartIdx are 0 and 1, respectively. The prediction block E3 in the proximity of a prediction block subject to processing of which PartIdx is 3, is a prediction block of which PartIdx is 0, the prediction block B3 is a prediction block of which PartIdx is 1, and the prediction block A3 is a prediction block of which PartIdx is 2. Therefore, merge candidate derivation and merge candidate list construction of a prediction block, of which PartIdx is 3, by referring to the prediction blocks E3, B3, and A3 cannot be processed until merge candidate derivation and merge candidate list construction process of prediction blocks, which are prediction blocks E3, B3, and A3 and belong to the same coding block and of which PartIdx are 0, 1 and 2 respectively, is completed and a merge candidate to be used is specified. Therefore, in the method for deriving inter prediction information according to the embodiment, in case that a partition mode is N by N partition (PART_N×N), and in case that PartIdx of a prediction block subject to processing is 3, merge candidate derivation and merge candidate list construction process of respective prediction blocks in the coding block can be processed in parallel by performing merge candidate derivation and merge candidate list construction process of a prediction block of which PartIdx is 3, without referring to coding information of the prediction blocks E3, B3, and A3, of which PartIdx are 0, 1, and 2, respectively.

The inter prediction information derivation unit 104 in FIG. 13 includes a spatial merge candidate generating unit 130, a reference index derivation unit 131, a time merge candidate generating unit 132, a merge candidate registering unit 133, a merge candidate identification determining unit 134, a merge candidate supplementing unit 135, and a coding information selection unit 136.

The inter prediction information derivation unit 205 in FIG. 14 includes a spatial merge candidate generating unit 230, a reference index derivation unit 231 of time merge candidate, a time merge candidate generating unit 232, a merge candidate registering unit 233, a merge candidate identification determining unit 234, a merge candidate supplementing unit 235, and a coding information selection unit 236.

Figure 18:
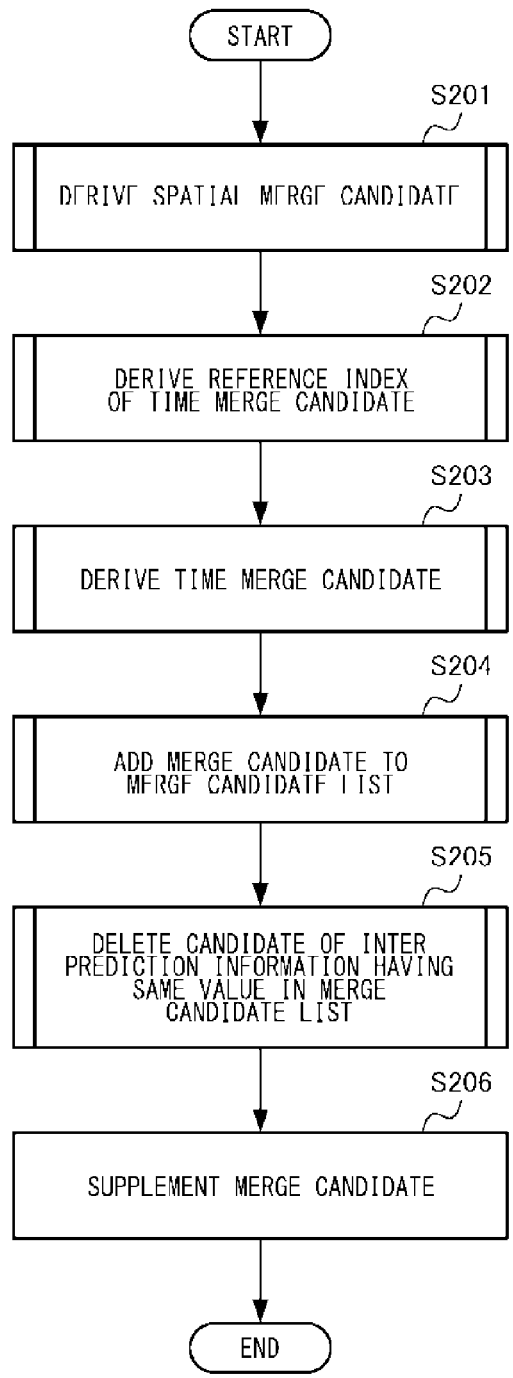
FIG. 18 shows a flowchart illustrating procedure of derivation process of a merge candidate in a merge mode and construction process of a merge candidate list.

FIG. 18 shows a flowchart illustrating a procedure of a merge candidate derivation and merge candidate list construction process, that is a function common to the inter prediction information derivation unit 104 of the moving picture encoding device and the inter prediction information derivation unit 205 of the moving picture decoding device according to an embodiment of the invention. An explanation on the processes will be given below sequentially. Although an explanation where a slice type slice_type is a B slice is given in the following explanation, the explanation can be also applied to the case of P slice, unless otherwise noted. However, in case that the slice type slice_type is a P slice, an inter prediction mode only includes L0 prediction (Pred_L0) and does not include L1 prediction (Pred_L1) nor bi-prediction (Pred_BI). Therefore a process regarding L1 can be omitted.

In the spatial merge candidate generating unit 130 of the inter prediction information derivation unit 104 of the moving picture encoding device and in the spatial merge candidate generating unit 230 of the inter prediction information derivation unit 205 of the moving picture decoding device, spatial merge candidates A, B, C, D, and E from respective prediction blocks A, B, C, D, and E in the proximity of a block subject to encoding or decoding are derived and outputted. N that indicates A, B, C, D, E, or a spatial merge candidate Col is defined. A flag availableFlagN indicating whether or not inter prediction information of a prediction block N is available as a spatial merge candidate N, a reference index refIdxL0N of L0 and a reference index refIdxL1N of L1 of the spatial merge candidate N, a prediction flag predFlagL0N indicating whether or not the L0 prediction is performed and a prediction flag predFlagL1N indicating whether or not the L1 prediction is performed, a motion vector mvL0N of L0, and a motion vector mvL1N of L1 are outputted (step S201). However, according to the present embodiment, since a merge candidate is derived without referring to a prediction block included in a coding block identical to the coding block that includes a prediction block subject to processing, a spatial merge candidate included in the coding block identical to the coding block including a prediction block subject to processing is not derived. A detailed explanation will be given later on the detailed processing procedure of step S201 with reference to the flowchart shown in FIG. 19.

Subsequently, in the reference index derivation unit 131 of time merge candidate of the inter prediction information derivation unit 104 of the moving picture encoding device and in the reference index derivation unit 231 of time merge candidate of the inter prediction information derivation unit 205 of the moving picture decoding device, a reference index of a time merge candidate is derived from a prediction block in the proximity of a block subject to encoding or decoding are derived and output (step S202). However, according to the present embodiment, a reference index of a time merge candidate is derived without referring to a prediction block included in a coding block identical to the coding block that includes a prediction block subject to processing. In case that a slice type slice_type is a P slice and inter prediction is performed by using inter prediction information of the time merge candidate, only the reference index of L0 is derived in order to perform L0 prediction (Pred_L0). In case that a slice type slice_type is a B slice and inter prediction is performed by using inter prediction information of the time merge candidate, respective reference indexes of L0 and L1 are derived in order to perform bi-prediction (Pred_BI). A detailed explanation will be given later on the detailed processing procedure of step S202 with reference to the flowcharts shown in FIG. 21, FIG. 23, FIG. 25, FIG. 27, FIG. 29, FIG. 30, and FIG. 32.

Subsequently, in the time merge candidate generating unit 132 of the inter prediction information derivation unit 104 of the moving picture encoding device and in the time merge candidate generating unit 232 of the inter prediction information derivation unit 205 of the moving picture decoding device, a time merge candidate is derived from a picture of a different time and the time merge candidate is outputted. A flag availableFlagCol indicating whether or not a time merge candidate is available, a prediction flag predFlagL0Col indicating whether or not the L0 prediction of time merge candidate is performed and a prediction flag predFlagL1Col indicating whether or not the L1 prediction is performed, a motion vector mvL0N of L0, and a motion vector mvL1N of L1 are outputted (step S203). A detailed explanation will be given later on the detailed processing procedure of step S203 with reference to the flowchart shown in FIG. 34.

Subsequently, in the merge candidate registering unit 133 of the inter prediction information derivation unit 104 of the moving picture encoding device and in the merge candidate registering unit 233 of the inter prediction information derivation unit 205 of the moving picture decoding device, a merge candidate list is generated, and spatial merge candidates A, B, C, D, and E, and a time merge candidate Col are added to the merge candidate list mergeCandList, by which, the merge candidate list mergeCandList is established, and the merge candidate list mergeCandList is outputted (step S204). A detailed explanation will be given later on the detailed processing procedure of step S204 with reference to the flowchart shown in FIG. 41.

Subsequently, in the merge candidate identification determining unit 134 of the inter prediction information derivation unit 104 of the moving picture encoding device and in the merge candidate identification determining unit 234 of the inter prediction information derivation unit 205 of the moving picture decoding device, a merge candidate list is generated, in case that motion vectors of reference indexes of an identical merge candidate have a same value in the merge candidate list mergeCandList, the merge candidate is omitted except for a merge candidate that is earliest in the order, and the merge candidate list mergeCandList is outputted (step S205).

Subsequently, in the merge candidate supplementing unit 135 of the inter prediction information derivation unit 104 of the moving picture encoding device and in the merge candidate supplementing unit 235 of the inter prediction information derivation unit 205 of the moving picture decoding device, a merge candidate list is supplemented so that the number of merge candidates registered in the merge candidate list mergeCandList, and the merge candidate list mergeCandList is outputted (step S206). According to the present embodiment, the number of merge candidates is set to 5.

While the upper limit of the number of merge candidates registered in the merge candidate list mergeCandList is set to 5, a merge candidate of which the prediction mode is bi-prediction (Pred_BI) and which is made by changing the combination of L0 prediction and L1 prediction between merge candidates that have been registered already; a merge candidate of which the prediction mode is bi-prediction (Pred_BI), which has a different reference index, and the value of the motion vector of which is (0, 0); or the like is added.

Figure 19:
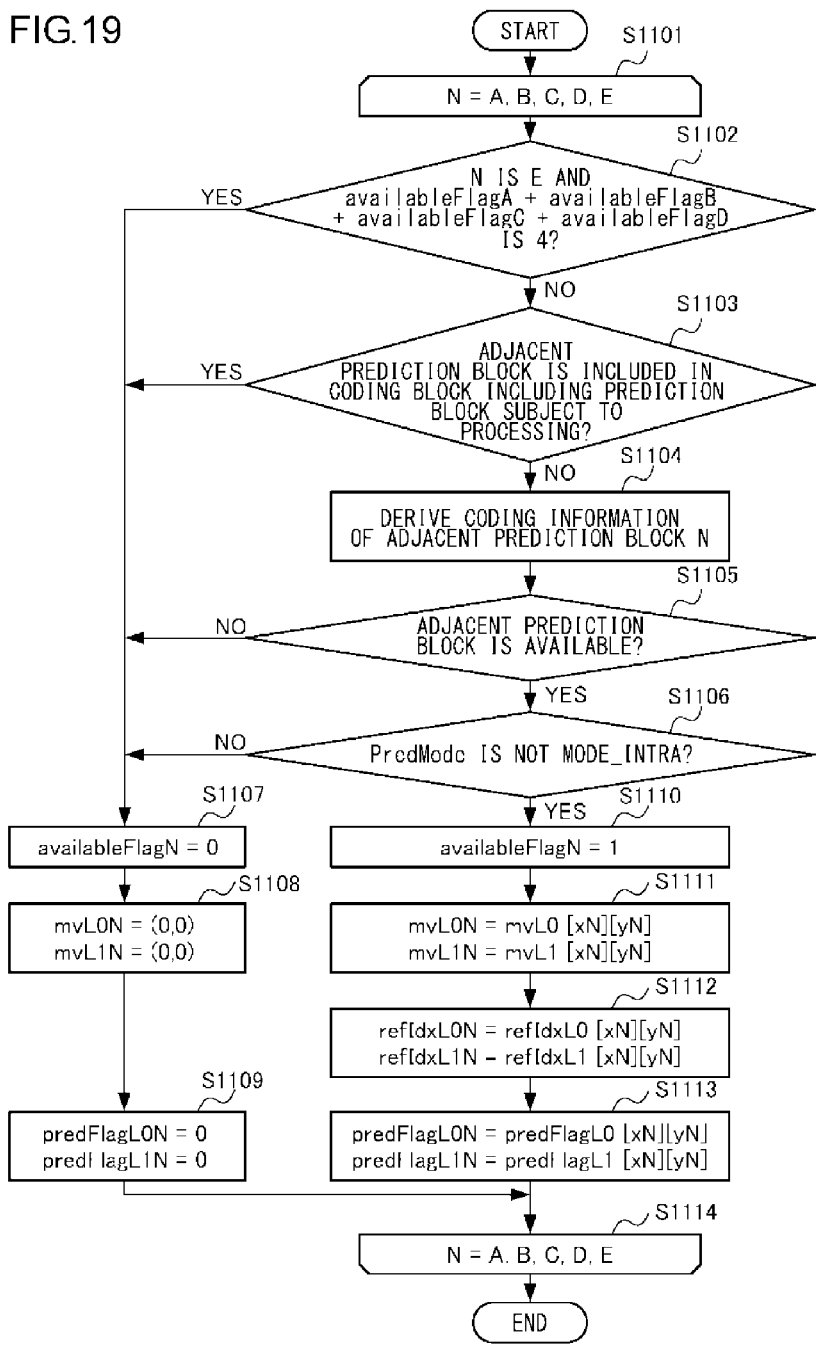
FIG. 19 shows a flowchart illustrating procedure of derivation process of spatial merge candidate of a merge mode.

A detailed explanation will be given on a method for deriving a merge candidate N from a prediction block N in the proximity of a prediction block subject to encoding or decoding, which is a processing procedure of step S201 of FIG. 18. FIG. 19 shows a flowchart illustrating procedure of spatial merge candidate derivation process of step S201 in FIG. 18. N represents A (left), B (up), C (upper right), D (lower left), or E (upper left) indicating an are of a prediction block in the proximity. According to the present embodiment, up to four spatial merge candidates are derived from five prediction blocks in the proximity.

In FIG. 18, by assigning A as a parameter N, coding information of a prediction block A adjacent to the left edge of a prediction block subject to encoding or decoding is checked and a merge candidate A is derived, by assigning B as a parameter N, coding information of a prediction block B adjacent to the upper edge is checked and a merge candidate B is derived, by assigning C as a parameter N, coding information of a prediction block C adjacent to the upper right is checked and a merge candidate C is derived, by assigning D as a parameter N, coding information of a prediction block D adjacent to the lower left is checked and a merge candidate D is derived, and by assigning E as a parameter N, coding information of a prediction block E adjacent to the upper left is checked and a merge candidate E is derived (step S1101-step S1114).

First, in case that the parameter N is E, and that values of a flags availableFlagA, availableFlagB, availableFlagC, and availableFlagD are added and the total thereof is 4 (YES in S1102), that is, in case that four spatial merge candidates are derived, a flag of a merge candidate E availableFlagE is set to 0 (step S1107), both values of motion vectors mvL0E and mvL1E of merge candidate E are set to (0,0) (step S1108), both values of flags predFlagL0E and predFlagL1E of merge candidate E are set to 0 (step S1109), and this spatial merge candidate derivation process is completed. According to the present embodiment, up to four spatial merge candidate are derived from prediction blocks in the proximity. Therefore, in case that four spatial merge candidates have been derived already, it is not required to perform the derivation process of spatial merge candidates any more.

On the other hand, in case that the parameter N is not E, or in case that values of a flags availableFlagA, availableFlagB, availableFlagC, and availableFlagD are added and the total thereof is not 4 (NO in S1102), the method proceeds to step S1103. If the prediction block N in the proximity is included in a coding block identical to a coding block including a prediction block subject to derivation (YES in step S1103), the value of a flag availableFlagN of a merge candidate N is set to 0 (step S1107), both values of motion vectors mvL0N and mvL1N of the merge candidate N are set to (0,0) (step S1108), and both values of flags predFlagL0N and predFlagL1N of the merge candidate N are set to 0 (step S1109). If the prediction block N in the proximity is included in a coding block identical to a coding block including a prediction block subject to derivation (YES in step S1103), the value of a flag availableFlagN of merge candidate N is set to 0 (step S1107), by not referring to coding information of the prediction block N in the proximity and by setting the value of flag availableFlagN of the merge candidate N to 0, so as not to using as a spatial merge candidate, merge candidate derivation and merge candidate list construction process for respective prediction blocks in a same coding block can be processed in parallel.

More specifically, the case of prediction block B adjacent to the upper edge of a prediction block subject to derivation, where a partition mode is 2N by N partition (PART_2N×N), 2N by nU partition (PART_2N×nU), or 2N by nD partition (PART_2N×nD) and where that PartIdx of a prediction block subject to processing is 1, corresponds to the case where the prediction block N in the proximity is included in a coding block identical to a coding block including a prediction block subject to derivation. In this case, the prediction block B adjacent to the upper edge of a prediction block subject to derivation is a prediction block which is included in a coding block identical to a coding block including a prediction block subject to derivation and of which the PartIdx is 0. Therefore, by not referring to coding information of the prediction block B in the proximity and by setting the value of flag availableFlagB of the merge candidate B to 0 so as not to using as a spatial merge candidate, merge candidate derivation and merge candidate list construction process for respective prediction blocks in a same coding block can be processed in parallel.

Further, the case of a prediction block A adjacent to the upper edge of a prediction block subject to derivation, where a partition mode is N by 2N partition (PART_N×2N), nL by 2N partition (PART_nL×2N), or nR by 2N partition (PART_nR×2N) and where PartIdx of a prediction block subject to processing is 1, also corresponds to the case where the prediction block N in the proximity is included in a coding block identical to a coding block including a prediction block subject to derivation. Also in this case, the prediction block A adjacent to the left edge of a prediction block subject to derivation is a prediction block which is included in a coding block identical to a coding block including a prediction block subject to derivation and of which the PartIdx is 0. Therefore, by not referring to coding information of the prediction block A in the proximity and by setting the value of flag availableFlagA of the merge candidate A to 0 so as not to using as a spatial merge candidate, merge candidate derivation and merge candidate list construction process for respective prediction blocks in a same coding block can be processed in parallel.

Although not defined according to the present embodiment, also in case that a partition mode (PartMode) is N by N partition (PART_N×N), and in case that PartIdx of a prediction block subject to processing is 1, 2, or 3, the prediction block N in the proximity is sometimes included in a coding block identical to a coding block including a prediction block subject to derivation.

On the other hand, in case that the prediction block N in the proximity is not included in a coding block identical to a coding block including a prediction block subject to derivation (YES in step S1103), the prediction block N in the proximity of a prediction block subject to encoding or decoding is specified, and in case that respective prediction blocks N are available, coding information of a prediction block N is derived from the coding information storing memory 115 or from the coding information storing memory 210 (step S1104).

If the prediction block N in the proximity cannot be used (NO in step S1105), or the prediction mode PredMode of the prediction block N is intra prediction (MODE_INTRA) (YES in step S1106), the value of a flag availableFlagN of a merge candidate N is set to 0 (step S1107), both values of motion vectors mvL0N and mvL1N of the merge candidate N are set to (0,0) (step S1108), and both values of flags predFlagL0N and predFlagL1N of the merge candidate N are set to 0 (step S1109). The case where a prediction block N in the proximity cannot be used corresponds, for example, to a case where the prediction block N in the proximity is positioned outside of a slice subject to encoding or decoding, a case where encoding or decoding process has not been completed because the block N is late in the processing order of encoding or decoding process, etc.

On the other hand, if the prediction block N in the proximity is outside of a coding block identical to a coding block including a prediction block subject to derivation (YES in step S1104), the prediction block N in the proximity is available (YES in step S1105), and in case that the prediction mode PredMode of the prediction block N is not an intra prediction (MODE_INTRA) (YES in step S1106), the inter prediction information of the prediction block N is used as the inter prediction information of the merge candidate N. The value of a flag availableFlagN of the merge candidate N is set to 1 (step S1110), the motion vectors mvL0N and mvL1N of the merge candidate N are set to a value identical to that of the motion vectors mvL0N[xN][yN] and mvL1N[xN][yN] of respective prediction block N (step S1111), the reference indexes refIdxL0N and refIdxL1N of the merge candidate N are set to a value identical to that of the reference indexes refIdxL0[xN][yN] and refIdxL1[xN][yN] of respective prediction block N (step S1112), and flags predFlagL0N and predFlagL1N of a merge candidate N are set to flags predFlagL0[xN][yN] and predFlagL1[xN][yN] of respective prediction block N (step S1113). xN and yN are indexes indicating the position of an upper left pixel in a prediction block N in a picture.

The above process of steps S1102 through S1113 are repeated for N=A, B, C, D, and E, respectively (step S1101-step S1114).

Next, a detailed explanation will be given on a method for deriving a reference index of a time merge candidate of step S202 in FIG. 18. Respective reference indexes of L0 and L1 of a time merge candidate are derived.

According to the present embodiment, reference indexes of a time merge candidate is derived by using a reference index of a spatial merge candidate, that is, a reference index used in a prediction block in the proximity of a prediction block subject to encoding or decoding. This is because, in case that a time merge candidate is selected, a reference index of a prediction block subject to encoding or decoding has a high correlation with the reference index of a prediction block in the proximity of a prediction block subject to encoding or decoding, which will be a spatial merge candidate. Particularly, according to the present embodiment, only a reference index of a prediction block A adjacent to the left edge of the prediction block subject to derivation, or a prediction block B adjacent to the upper edge thereof is used, except for a sixth exemplary embodiment and a seventh exemplary embodiment, which will be described later. This is because, the prediction blocks A and B adjacent to the edge of the prediction block subject to encoding or decoding, among the prediction blocks A,B,C,D, and E in the proximity, which are also a spatial merge candidates, have a higher correlation than the prediction blocks C,D, and E adjacent only to a vertex. By limiting prediction blocks to use to prediction blocks A and B without using the prediction blocks C, D, and E having relatively low correlation, an improvement effect of encoding efficiency can be obtained by deriving a reference index of a time merge candidate, and the amount of calculation and a frequency of access to memory relating to derivation process of a reference index of a time merge candidate can be reduced.

First Exemplary Embodiment

Figure 20:
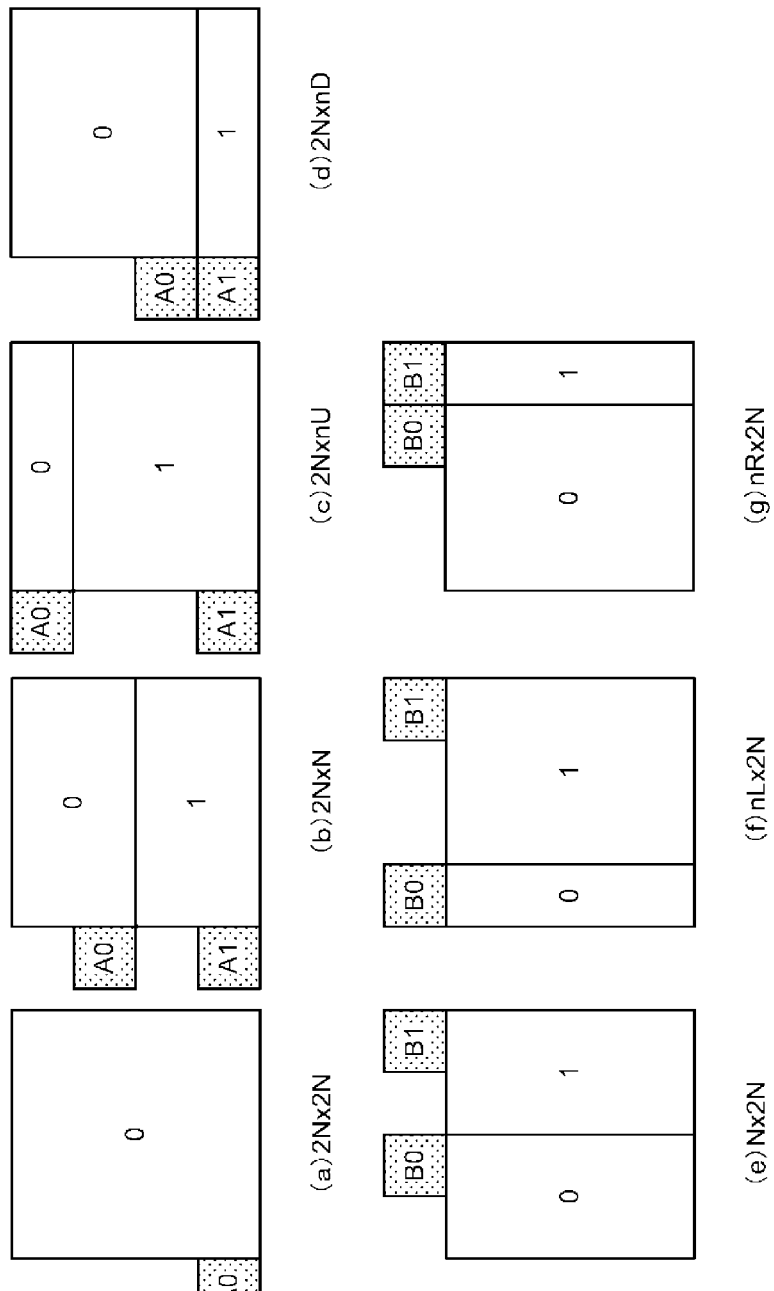
FIG. 20 illustrates an adjacent block referred to in derivation process of a reference index of a time merge candidate according to a first exemplary embodiment of the present embodiment.

An explanation will be given below on the present embodiment with some exemplary embodiments. First, an explanation will be given below on a first exemplary embodiment of the present embodiment. FIG. 20 shows an adjacent block referred to in the derivation process of a reference index of a time merge candidate according to the first exemplary embodiment of the present embodiment. According to the first exemplary embodiment of the present embodiment, in accordance with the partition mode (PartMode), which of prediction blocks: a prediction block adjacent to the left edge of a prediction block subject to derivation, or a prediction block adjacent to the upper edge thereof is used is switched. A prediction block adjacent to the edge outside of a coding block is referred to. In case that a partition mode (PartMode) is 2N by 2N partition (PART_2N×2N), as shown in FIG. 20A, a prediction block A0 adjacent to the left of a prediction block subject to derivation is referred to, and a reference index of LX of a time merge candidate is set to a value of reference index of LX of the prediction block A0.

In case that a partition mode (PartMode) is 2N by N partition (PART_2N×N), 2N by nU partition (PART_2N×nU), or 2N by nD partition (PART_2N×nD), where coding block subject to processing is partitioned into two prediction blocks arranged vertically, as shown in FIGS. 20B, 20C, and 20D, prediction blocks adjacent to the left edge of respective prediction blocks subject to derivation are referred to, and respective reference indexes of LX of time merge candidates are set to values of reference indexes of LX of prediction blocks adjacent to the left edge of respective prediction blocks subject to derivation. In case of a prediction block subject to derivation of which the partition index PartIdx is 0, a prediction block A0 adjacent to the left is referred to, and a reference index of LX of a time merge candidate is set to a value of reference index of LX of the prediction block A0. In case of a prediction block subject to derivation of which the partition index PartIdx is 1, a prediction block A1 adjacent to the left is referred to, and a reference index of LX of a time merge candidate is set to the value of reference index of LX of the prediction block A1. Since both prediction blocks A0 and A1 to refer to are outside of the coding block, a reference index of time merge candidate of two prediction blocks, of which the partition index PartIdx are 0 and 1 respectively, can be derived in parallel, respectively.

In case that a partition mode (PartMode) is N by 2N partition (PART_N×2N), nL by 2N partition (PART_nL×2N), or nR by 2N partition (PART_nR×2N), where coding block subject to processing is partitioned into two prediction blocks arranged horizontally, as shown in FIGS. 20E, 20F, and 20G, a prediction block adjacent to the upper edge of a prediction block subject to derivation is referred to, and respective reference indexes of LX of time merge candidates are set to values of reference indexes of LX of prediction blocks adjacent to the upper edge of respective prediction blocks subject to derivation. In case of a prediction block subject to derivation of which the partition index PartIdx is 0, a prediction block B0 adjacent to the top is referred to, and a reference index of LX of a time merge candidate is set to a value of reference index of LX of the prediction blocks B0 and/or B1. In case of a prediction block subject to derivation of which the partition index PartIdx is 1, a prediction block B1 adjacent to the top is referred to, and a reference index of LX of a time merge candidate is set to the value of the reference index of LX of the prediction block B1. Since both prediction blocks B0 and B1 to refer to are outside of the coding block, a reference index of time merge candidate of two prediction blocks, of which the partition index PartIdx are 0 and 1 respectively, can be derived in parallel, respectively.

However, in case that prediction blocks A and B in the proximity do not perform LX prediction, a reference index of LX of a time merge candidate is set to a default value 0. The reason why the default value of a reference index of LX of a time merge candidate is set to 0 in case that prediction blocks A and B in the proximity do not perform LX prediction is that a reference picture corresponding to the reference index value 0 has the highest possibility to be selected in inter prediction. However, the scope of the present invention is not limited to this example. The default value of the reference index may be set to a value other than 0 (e.g., 1, 2, etc.), or a syntax element indicating the default value of the reference index may be provided in a bitstream at a sequence level, at a picture level, or at a slice level, so that the syntax element can be transmitted and selected at encoding.

Figure 21:
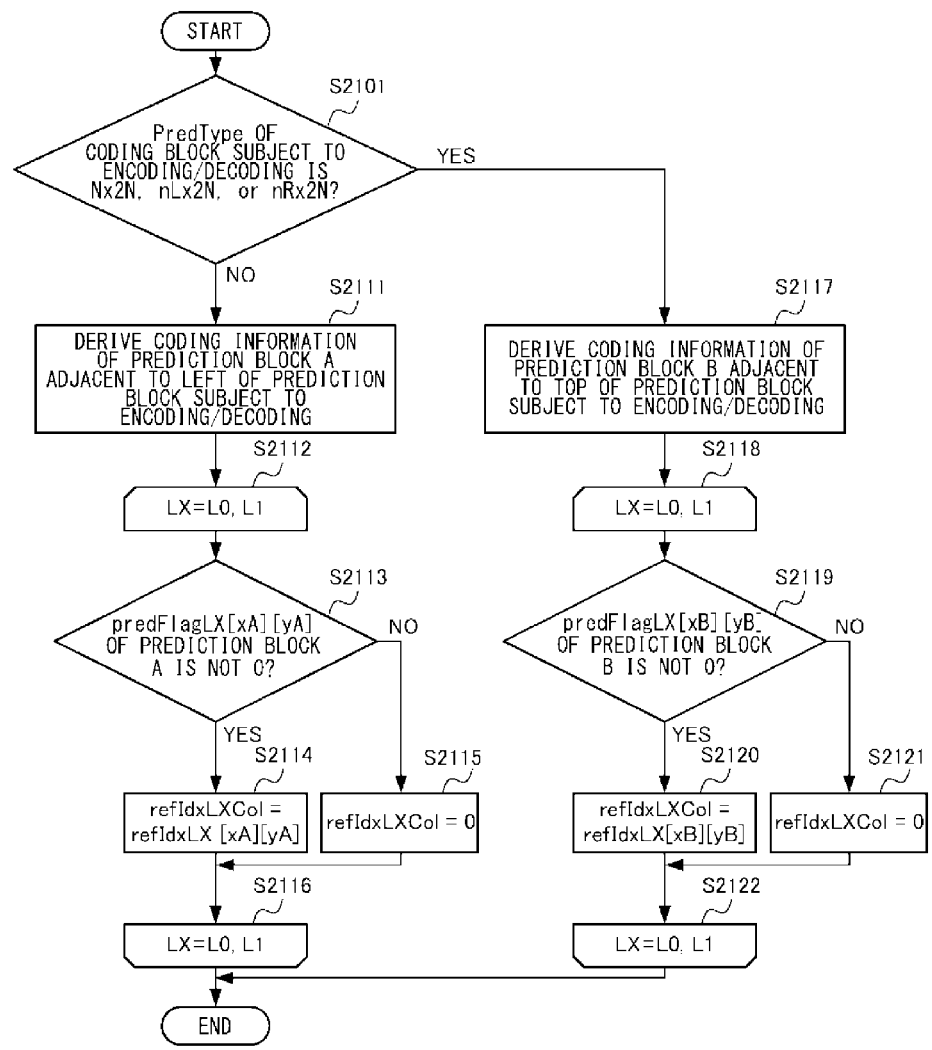
FIG. 21 shows a flowchart illustrating procedure of derivation process of a reference index of a time merge candidate of a merge mode according to a method of the first exemplary embodiment.

FIG. 21 shows a flowchart illustrating procedure of derivation process of a reference index of a time merge candidate in step S202 of FIG. 18 according to the first exemplary embodiment of the present embodiment. First, in case that the partition mode (PartMode) is not N by 2N partition (PART_N×2N), nL by 2N partition (PART_nL×2N), or nR by 2N partition (PART_nR×2N) (NO in step S2101), that is, in case of 2N by 2N partition (PART_2N×2N), 2N by N partition (PART_2N×N), 2N by nU partition (PART_2N×nU), 2N by nD partition (PART_2N×nD), coding information of a prediction block A adjacent to the left is derived from the coding information storing memory 115 or 210 (step S2111).

Subsequent processes of step S2113 through step S2115 are performed for L0 and L1 respectively (step S2112-S2116). In case of deriving a reference index of L0 of a time merge candidate, LX is set to L0, and in case of deriving a reference index of L1, LX is set to L1. However, in case that the slice type slice_type is a P slice, an inter prediction mode only includes L0 prediction (Pred_L0) and does not include L1 prediction (Pred_L1) nor bi-prediction (Pred_BI). Therefore a process regarding L1 can be omitted.

In case that a flag predFlagLX[xA][yA] indicating whether or not to perform LX prediction of a prediction block A is not 0 (YES in step S2113), a reference index refIdxLXCol of LX of a time merge candidate is set to a value identical to the value of reference index refIdxLX[xA][yA] of LX of the prediction block A (step S2114). xA and yA are indexes indicating the position of an upper left pixel in a prediction block A in a picture.

According to the present embodiment, in prediction block N (N=A, B), in case that the prediction block N is outside a slice subject to encoding and decoded and cannot be used, in case that the prediction block N has not been encoded because the prediction block N is subsequent to the prediction block subject to encoding or decoding in the order of encoding or decoding so that the prediction block N cannot be used, or in case that the prediction mode PredMode is intra prediction (MODE_INTRA), both flags, predFlagL0 [xN][yN] indicating whether or not to use L0 prediction and predFlagL1[xN][yN] indicating whether or not to use L1 prediction, are 0. xN and yN are indexes indicating the position of an upper left pixel in a prediction block N in a picture. In case that the prediction mode PredMode of the prediction block N is inter prediction (MODE_INTER) and the inter prediction mode is L0 prediction (Pred_L0), the flag predFlagL0[xN][yN] indicating whether or not to use L0 prediction of the prediction block N is 1, and the flag predFlagL1[xN][yN] indicating whether or not to use L1 prediction is 0. In case that the inter prediction mode of the prediction block N is L1 prediction (Pred_L1), the flag predFlagL0[xN][yN] indicating whether or not to use L0 prediction of the prediction block N is 0, and the flag predFlagL1[xN][yN] indicating whether or not to use L1 prediction is 1. In case that the inter prediction mode of the prediction block N is bi-prediction (Pred_BI), the flag predFlagL0[xN][yN] indicating whether or not to use L0 prediction of the prediction block N and the flag predFlagL1 [xN][yN] indicating whether or not to use L1 prediction are both 1.

In case that a flag predFlagLX[xA][yA] indicating whether or not to perform LX prediction of a prediction block A is 0 (NO in step S2113), a reference index refIdx-LXCol of LX of a time merge candidate is set to a default value 0 (step S2115).

Processes of step S2113 through step S2115 are performed for L0 and L1 respectively (step S2112-S2116), and the derivation process of a reference index is completed.

On the other hand, in case that the partition mode (PartMode) is N by 2N partition (PART_Nx2N), nL by 2N partition (PART_nLx2N), or nR by 2N partition (PART_nRx2N) (YES in step S2101), coding information of a prediction B adjacent to the top of the prediction block subject to derivation, is derived from the coding information storing memory 115 or 210 (step S2117).

Subsequent processes of step S2119 through step S2121 are performed for L0 and L1 respectively (step S2118-S2122). In case of deriving a reference index of L0 of a time merge candidate, LX is set to L0, and in case of deriving a reference index of L1, LX is set to L1. However, in case that the slice type slice_type is a P slice, an inter prediction mode only includes L0 prediction (Pred_L0) and does not include L1 prediction (Pred_L1) nor bi-prediction (Pred_BI). Therefore a process regarding L1 can be omitted.

In case that a flag predFlagLX[xB][yB] indicating whether or not to perform LX prediction of a prediction block B is not 0 (YES in step S2119), a reference index refIdxLXCol of LX of a time merge candidate is set to a value identical to the value of reference index refIdxLX[xB][yB] of LX of the prediction block B (step S2120). xB and yB are indexes indicating the position of an upper left pixel in a prediction block B in a picture.

In case that a flag predFlagLX[xB][yB] indicating whether or not to perform LX prediction of a prediction block B is 0 (NO in step S2119), a reference index refIdx-LXCol of LX of a time merge candidate is set to a default value 0 (step S2121).

Processes of step S2119 through step S2121 are performed for L0 and L1 respectively (step S2118-S2122), and the derivation process of the reference index is completed.

Second Exemplary Embodiment

Figure 22:
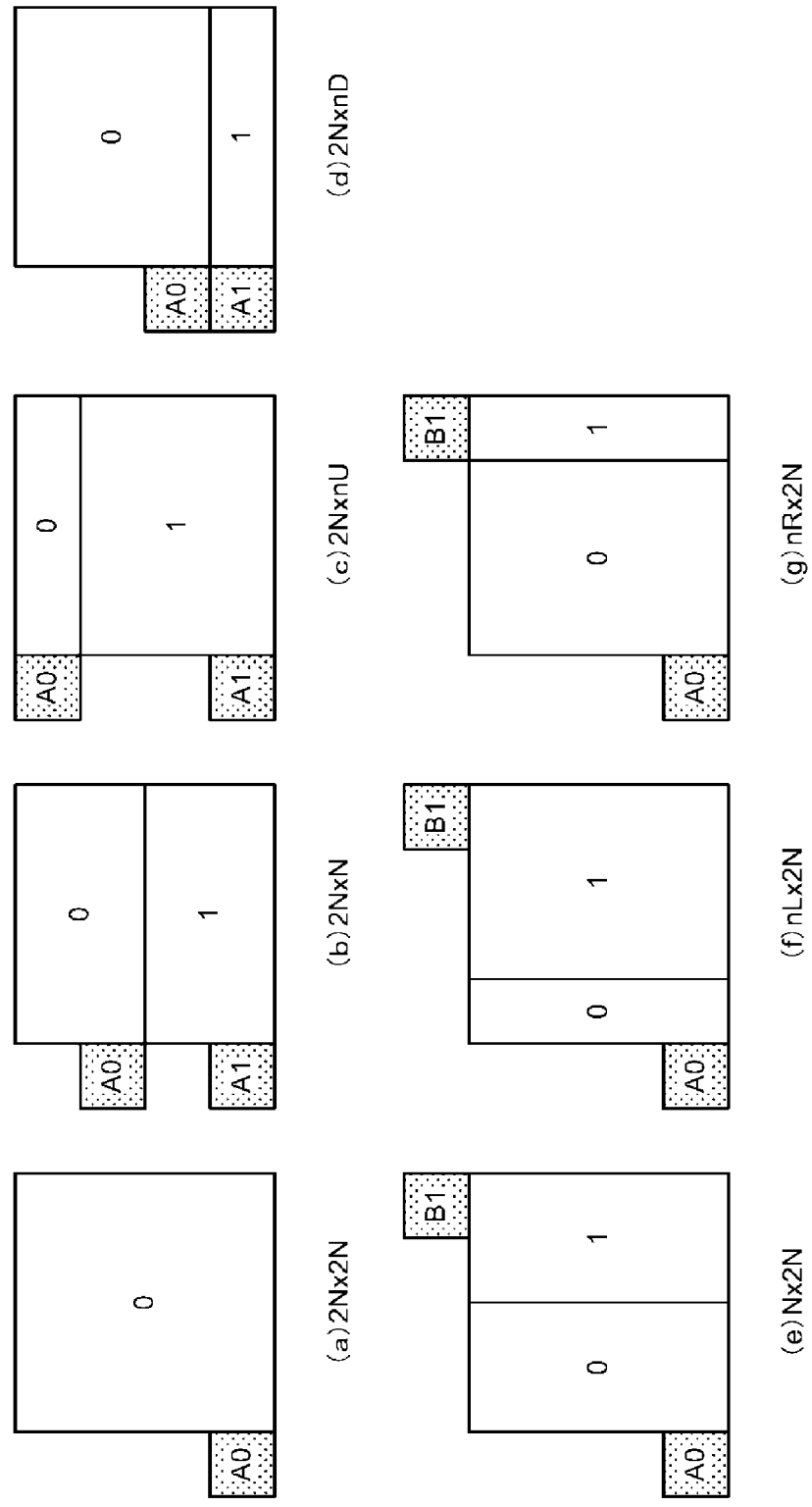
FIG. 22 illustrates an adjacent block referred to in derivation process of a reference index of a time merge candidate according to a second exemplary embodiment of the present embodiment.

Next, an explanation will be given below on a second exemplary embodiment of the present embodiment. FIG. 22 shows adjacent blocks referred to in the derivation process of a reference index of a time merge candidate according to the second exemplary embodiment of the present embodiment. According to the second exemplary embodiment of the present embodiment, in accordance with the partition mode (PartMode) of a prediction block and the partition index PartIdx of the prediction block, which of prediction blocks: a prediction block adjacent to the left edge of a prediction block subject to derivation; or a prediction block adjacent to the upper edge thereof is used is switched. A prediction block adjacent to the edge outside of a coding block is referred to. In case that a partition mode (PartMode) is 2N by 2N partition (PART_2Nx2N), as shown in FIG. 22A, a prediction block A0 adjacent to the left of a prediction block subject to derivation is referred to, and a reference index of LX of a time merge candidate is set to a value of reference index of LX of the prediction block A0.

In case that a partition mode (PartMode) is 2N by N partition (PART_2NxN), 2N by nU partition (PART_2Nx nU), or 2N by nD partition (PART_2NxnD), where coding block subject to processing is partitioned into two prediction blocks arranged vertically, as shown in FIGS. 22B, 20C, and 20D, prediction blocks adjacent to the left edge of respective prediction blocks subject to derivation are referred to, and respective reference indexes of LX of time merge candidates are set to values of reference indexes of LX of prediction blocks adjacent to the left edge of respective prediction blocks subject to derivation. In case of a prediction block subject to derivation of which the partition index PartIdx is 0, a prediction block A0 adjacent to the left is referred to, and a reference index of LX of a time merge candidate is set to a value of reference index of LX of the prediction block A0. In case of a prediction block subject to derivation of which the partition index PartIdx is 1, a prediction block A1 adjacent to the left is referred to, and a reference index of LX of a time merge candidate is set to the value of reference index of LX of the prediction block A1. Since both prediction blocks A0 and A1 to refer to are outside of the coding block, a reference index of time merge candidate of two prediction blocks, of which the partition index PartIdx are 0 and 1 respectively, can be derived in parallel, respectively.

In case that a partition mode (PartMode) is N by 2N partition (PART_Nx2N), nL by 2N partition (PART_nLx 2N), or nR by 2N partition (PART_nRx2N), where coding block subject to processing is partitioned into two prediction blocks arranged horizontally, as shown in FIGS. 22E, 22F, and 22G, a prediction block A0 adjacent to the left is referred to for a prediction block subject to derivation of which the partition index PartIdx is 0, reference indexes of LX of time merge candidates are set to a value of reference index of LX of prediction block A0. In case of a prediction block subject to derivation of which the partition index PartIdx is 1, a prediction block B1 adjacent to the top is referred to, and a reference index of LX of a time merge candidate is set to the value of the reference index of LX of the prediction block B1. Since both prediction blocks A0 and B1 to refer to are outside of the coding block, a reference index of time merge candidate of two prediction blocks of which the partition index PartIdx are 0 and 1 respectively, can be derived in parallel, respectively.

However, in case that prediction blocks A and B in the proximity do not perform LX prediction, a reference index of LX of a time merge candidate is set to a default value 0.

The reason why the default value of a reference index of LX of a time merge candidate is set to 0 in case that prediction blocks A and B in the proximity do not perform LX prediction is that a reference picture corresponding to the reference index value 0 has the highest possibility to be selected in inter prediction. However, the scope of the present invention is not limited to this example. The default value of the reference index may be set to a value other than 0 (e.g., 1, 2, etc.), or a syntax element indicating the default value of the reference index may be provided in a bitstream at a sequence level, at a picture level, or at a slice level, so that the syntax element can be transmitted and selected at encoding.

Figure 23:
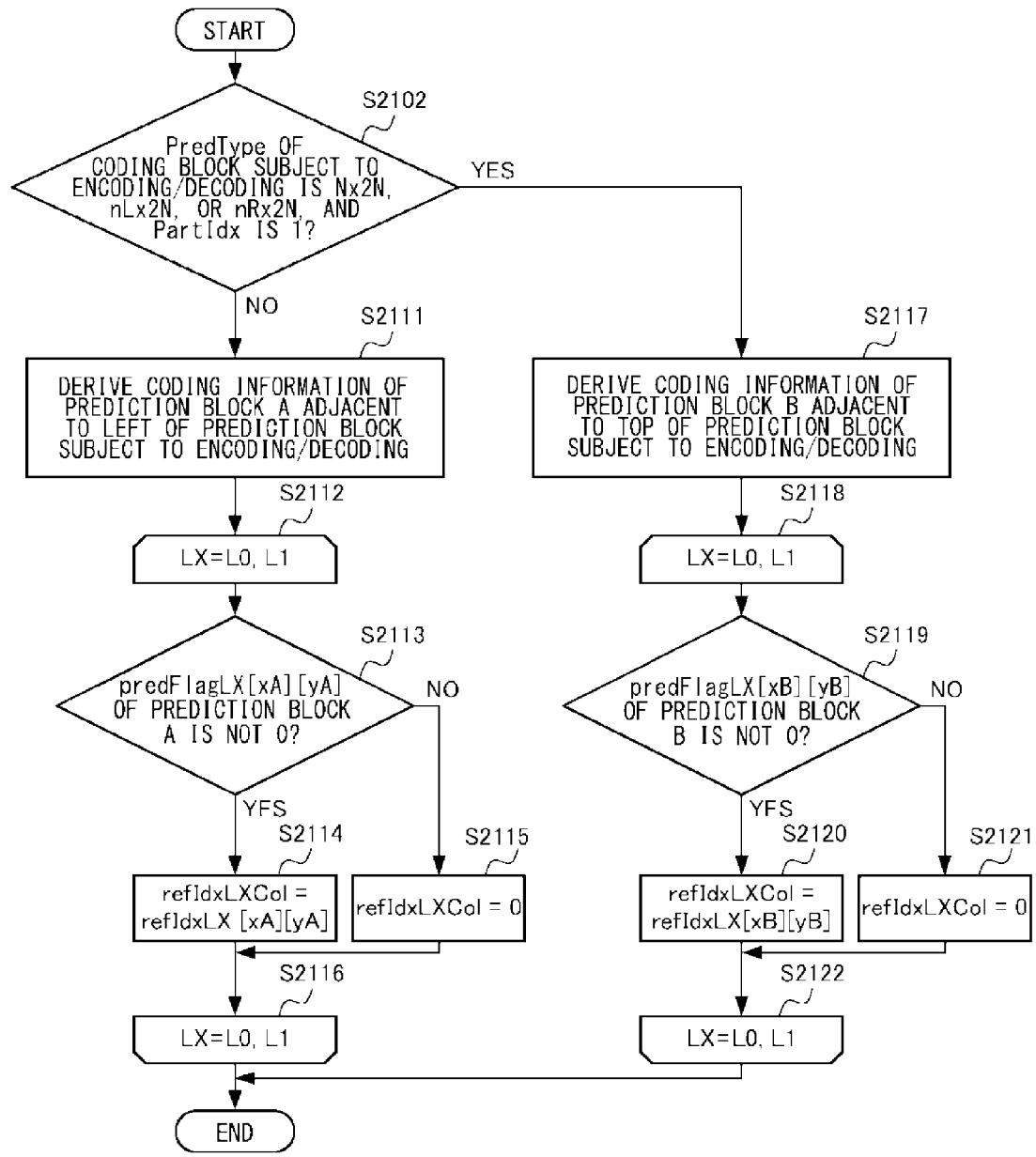
FIG. 23 shows a flowchart illustrating procedure of derivation process of a reference index of a time merge candidate of a merge mode according to a method of the second exemplary embodiment.

FIG. 23 shows a flowchart illustrating procedure of derivation process of a reference index of a time merge candidate in step S202 of FIG. 18 according to the second exemplary embodiment of the present embodiment. First, in case that the partition mode (PartMode) is not N by 2N partition (PART_N×2N), nL by 2N partition (PART_nL×2N), or nR by 2N partition (PART_nR×2N) and the partition index PartIdx is not 1 (NO in step S2102), (i.e., in case of 2N by 2N partition (PART_2N×2N), 2N by N partition (PART_2N×N), 2N by nU partition (PART_2N×nU), 2N by nD partition (PART_2N×nD), N by 2N partition (PART_N×2N), nL by 2N partition (PART_nL×2N), or nR by 2N partition (PART_nR×2N), and the partition index PartIdx is 0), coding information of a prediction block A adjacent to the left of a prediction block subject to derivation is derived from the coding information storing memory 115 or 210 (step S2111).

Subsequent processes of step S2113 through step S2115 are performed for L0 and L1 respectively (step S2112-S2116). In case of deriving a reference index of L0 of a time merge candidate, LX is set to L0, and in case of deriving a reference index of L1, LX is set to L1. However, in case that the slice type slice_type is a P slice, an inter prediction mode only includes L0 prediction (Pred_L0) and does not include L1 prediction (Pred_L1) nor bi-prediction (Pred_BI). Therefore a process regarding L1 can be omitted.

In case that a flag predFlagLX[xA][yA] indicating whether or not to perform LX prediction of a prediction block A is not 0 (YES in step S2113), a reference index refIdxLXCol of LX of a time merge candidate is set to a value identical to the value of reference index refIdxLX[xA][yA] of LX of the prediction block A (step S2114). xA and yA are indexes indicating the position of an upper left pixel in a prediction block A in a picture.

According to the present embodiment, in prediction block N (N=A or B), in case that the prediction block N is outside a slice subject to encoding and decoded and cannot be used, in case that the prediction block N has not been encoded because the prediction block N is subsequent to the prediction block subject to encoding or decoding in the order of encoding or decoding so that the prediction block N cannot be used, or in case that the prediction mode PredMode is intra prediction (MODE_INTRA), both flags, predFlagL0[xN][yN] indicating whether or not to use L0 prediction and predFlagL1[xN][yN] indicating whether or not to use L1 prediction, are 0. xN and yN are indexes indicating the position of an upper left pixel in a prediction block N in a picture. In case that the prediction mode PredMode of the prediction block N is inter prediction (MODE_INTER) and the inter prediction mode is L0 prediction (Pred_L0), the flag predFlagL0[xN][yN] indicating whether or not to use L0 prediction of the prediction block N is 1, and the flag predFlagL1[xN][yN] indicating whether or not to use L1 prediction is 0. In case that the inter prediction mode of the prediction block N is L1 prediction (Pred_L1), the flag predFlagL0[xN][yN] indicating whether or not to use L0 prediction of the prediction block N is 0, and the flag predFlagL1[xN][yN] indicating whether or not to use L1 prediction is 1. In case that the inter prediction mode of the prediction block N is bi-prediction (Pred_BI), the flag predFlagL0[xN][yN] indicating whether or not to use L0 prediction of the prediction block N and the flag predFlagL1[xN][yN] indicating whether or not to use L1 prediction are both 1.

In case that a flag predFlagLX[xA][yA] indicating whether or not to perform LX prediction of a prediction block A is 0 (NO in step S2113), a reference index refIdxLXCol of LX of a time merge candidate is set to a default value 0 (step S2115).

Processes of step S2113 through step S2115 are performed for L0 and L1 respectively (step S2112-S2116), and the derivation process of a reference index is completed.

On the other hand, in case that the partition mode (PartMode) is N by 2N partition (PART_N×2N), nL by 2N partition (PART_nL×2N), or nR by 2N partition (PART_nR×2N) and the partition index PartIdx is 1 (YES in step S2102), coding information of a prediction B adjacent to the top of the prediction block subject to derivation is derived from the coding information storing memory 115 or 210 (step S2117).

Subsequent processes of step S2119 through step S2121 are performed for L0 and L1 respectively (step S2118-S2122). In case of deriving a reference index of L0 of a time merge candidate, LX is set to L0, and in case of deriving a reference index of L1, LX is set to L1. However, in case that the slice type slice_type is a P slice, an inter prediction mode only includes L0 prediction (Pred_L0) and does not include L1 prediction (Pred_L1) nor bi-prediction (Pred_BI). Therefore a process regarding L1 can be omitted.

In case that a flag predFlagLX[xB][yB] indicating whether or not to perform LX prediction of a prediction block B is not 0 (YES in step S2119), a reference index refIdxLXCol of LX of a time merge candidate is set to a value identical to the value of reference index refIdxLX[xB][yB] of LX of the prediction block B (step S2120). xB and yB are indexes indicating the position of an upper left pixel in a prediction block B in a picture.

In case that a flag predFlagLX[xB][yB] indicating whether or not to perform LX prediction of a prediction block B is 0 (NO in step S2119), a reference index refIdxLXCol of LX of a time merge candidate is set to a default value 0 (step S2121).

Processes of step S2119 through step S2121 are performed for L0 and L1 respectively (step S2118-S2122), and the derivation process of the reference index is completed.

Third Exemplary Embodiment

Figure 24:
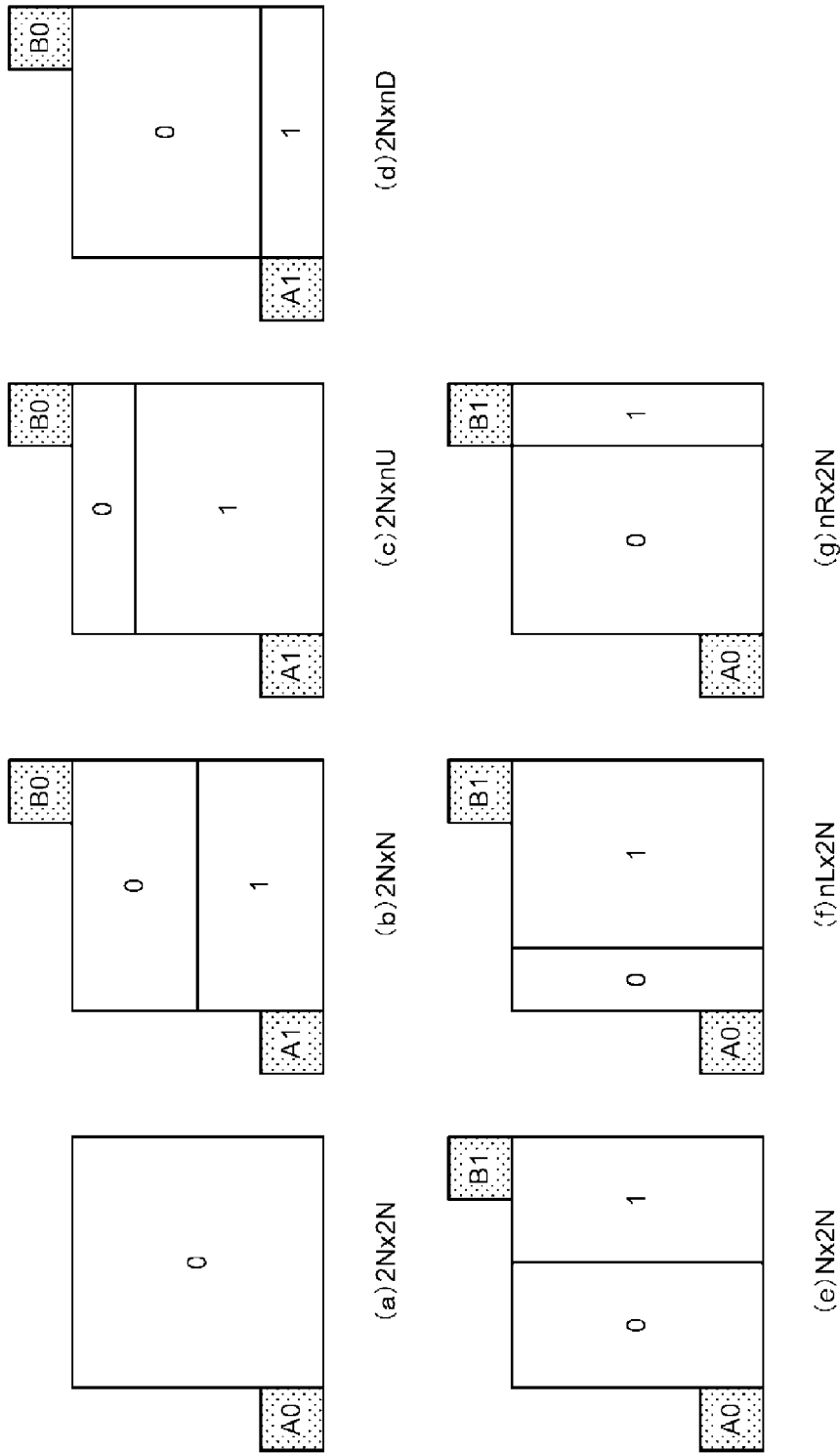
FIG. 24 illustrates an adjacent block referred to in derivation process of a reference index of a time merge candidate according to a third exemplary embodiment of the present embodiment.

Next, an explanation will be given below on a third exemplary embodiment of the present embodiment. FIG. 24 shows adjacent blocks referred to in the derivation process of a reference index of a time merge candidate according to the third exemplary embodiment of the present embodiment. According to the third exemplary embodiment of the present embodiment, in accordance with the partition mode (PartMode) of a prediction block and the partition index PartIdx of the prediction block, which of prediction blocks: a prediction block adjacent to the left edge of a prediction block subject to derivation; or a prediction block adjacent to the upper edge thereof is used is switched. In case of a prediction block subject to derivation of which the partition index PartIdx is 0, a prediction block that is adjacent to a long edge, which has a higher correlation, is referred to. In case of a prediction block subject to derivation of which the partition index PartIdx is 1, a prediction block that is adjacent to an edge outside the prediction block is referred to. In case that a partition mode (PartMode) is 2N by 2N partition (PART_2N×2N), as shown in FIG. 24A, a prediction block A0 adjacent to the left of a prediction block subject to derivation is referred to, and a reference index of LX of a time merge candidate is set to a value of reference index of LX of the prediction block A0.

In case that a partition mode (PartMode) is 2N by N partition (PART_2N×N), 2N by nU partition (PART_2N×nU), and 2N by nD partition (PART_2N×nD), where coding block subject to processing is partitioned into two prediction blocks arranged vertically, as shown in FIGS. 24B, 24C, and 24D, a prediction block B0 adjacent to the upper edge, which is a long edge, is referred to for a prediction block subject to derivation of which the partition index PartIdx is 0, a reference index of LX of time merge candidate is set to a value of reference index of LX of prediction block B0. In case of a prediction block subject to derivation of which the partition index PartIdx is 1, a prediction block A1 adjacent to the left edge, which is outside the coding block, is referred to, and a reference index of LX of a time merge candidate is set to the value of reference index of LX of the prediction block A1. Since both prediction blocks B0 and A1 to refer to are outside of the coding block, a reference index of time merge candidate of two prediction blocks, of which the partition index PartIdx are 0 and 1 respectively, can be derived in parallel, respectively.

In case that a partition mode (PartMode) is N by 2N partition (PART_N×2N), nL by 2N partition (PART_nL×2N), or nR by 2N partition (PART_nR×2N), where coding block subject to processing is partitioned into two prediction blocks arranged horizontally, as shown in FIGS. 24E, 24F, and 24G, a prediction block A0 adjacent to the left edge, which is a long edge, is referred to for a prediction block subject to derivation of which the partition index PartIdx is 0, a reference index of LX of time merge candidate is set to a value of reference index of LX of prediction block A0. In case of a prediction block subject to derivation of which the partition index PartIdx is 1, a prediction block B1 adjacent to the upper edge, which is outside the coding block, is referred to, and a reference index of LX of a time merge candidate is set to the value of reference index of LX of the prediction block B1. Since both prediction blocks A0 and B1 to refer to are outside of the coding block, a reference index of time merge candidate of two prediction blocks of which the partition index PartIdx are 0 and 1 respectively, can be derived in parallel, respectively.

However, in case that prediction blocks A and B in the proximity do not perform LX prediction, a reference index of LX of a time merge candidate is set to a default value 0. The reason why the default value of a reference index of LX of a time merge candidate is set to 0 in case that prediction blocks A and B in the proximity do not perform LX prediction is that a reference picture corresponding to the reference index value 0 has the highest possibility to be selected in inter prediction. However, the scope of the present invention is not limited to this example. The default value of the reference index may be set to a value other than 0 (e.g., 1, 2, etc.), or a syntax element indicating the default value of the reference index may be provided in a bitstream at a sequence level, at a picture level, or at a slice level, so that the syntax element can be transmitted and selected at encoding.

Figure 25:
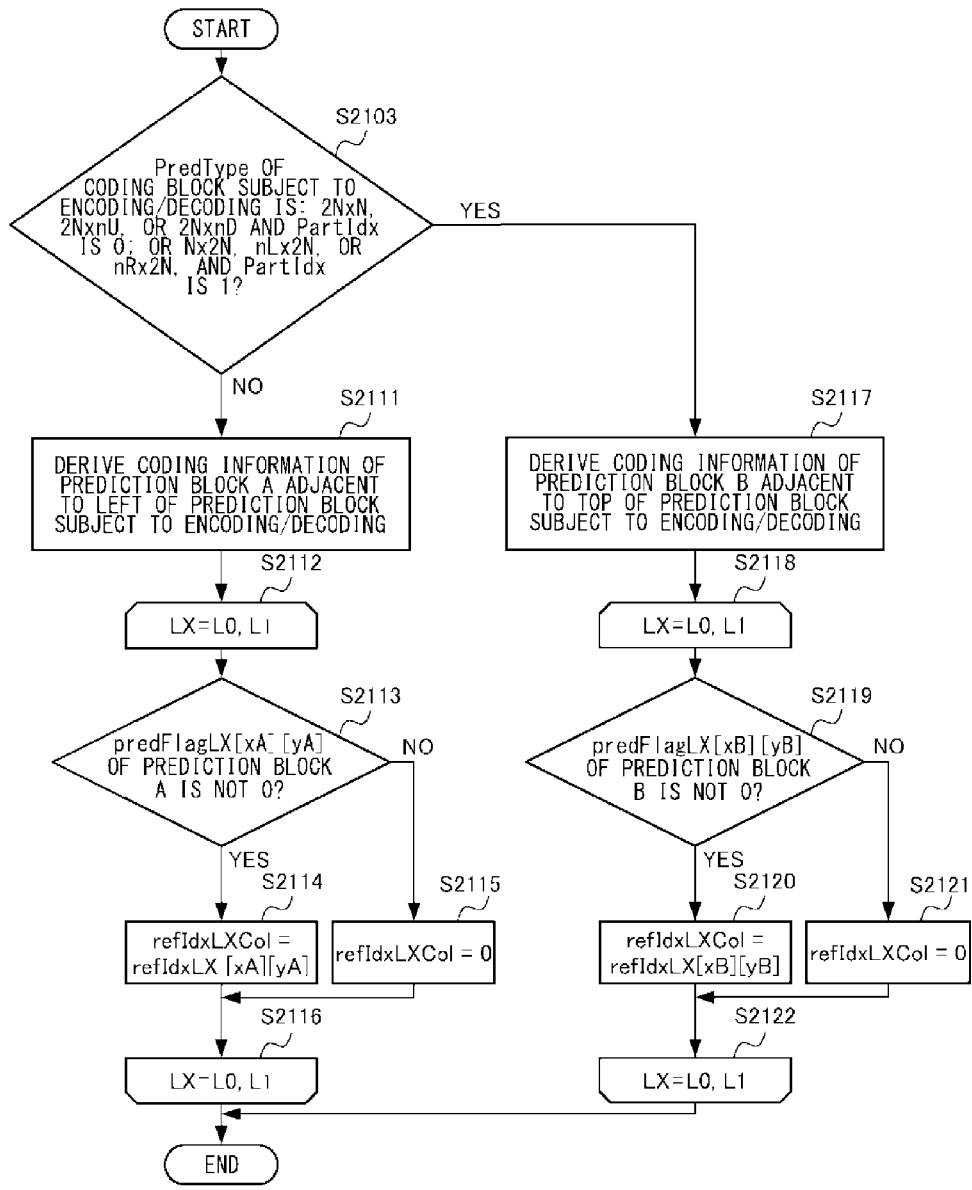
FIG. 25 shows a flowchart illustrating procedure of derivation process of a reference index of a time merge candidate of a merge mode according to a method of the third exemplary embodiment.

FIG. 25 shows a flowchart illustrating procedure of derivation process of a reference index of a time merge candidate in step S202 of FIG. 18 according to the third exemplary embodiment of the present embodiment. First, in case that the partition mode (PartMode) is 2N by N partition (PART_2N×N), 2N by nU partition (PART_2N×nU), 2N by nD partition (PART_2N×nD), and the partition index PartIdx is not 0, or in case that the partition mode is N by 2N partition (PART_N×2N), nL by 2N partition (PART_nL×2N), or nR by 2N partition (PART_nR×2N), and the partition index PartIdx is not 1 (NO in step S2103), in other words, in case that the partition mode is 2N by 2N partition (PART_2N×2N), in case that the partition mode is 2N by N partition (PART_2N×N), 2N by nU partition (PART_2N×nU), or 2N by nD partition (PART_2N×nD), and the partition index PartIdx is 0, or in case that the partition mode is N by 2N partition (PART_N×2N), nL by 2N partition (PART_nL×2N), or nR by 2N partition (PART_nR×2N) and the partition index PartIdx is 0, coding information of a prediction block A adjacent to the left of a prediction block subject to derivation is derived from the coding information storing memory 115 or 210 (step S2111).

Subsequent processes of step S2113 through step S2115 are performed for L0 and L1 respectively (step S2112-S2116). In case of deriving a reference index of L0 of a time merge candidate, LX is set to L0, and in case of deriving a reference index of L1, LX is set to L1. However, in case that the slice type slice_type is a P slice, an inter prediction mode only includes L0 prediction (Pred_L0) and does not include L1 prediction (Pred_L1) nor bi-prediction (Pred_BI). Therefore a process regarding L1 can be omitted.

In case that a flag predFlagLX[xA][yA] indicating whether or not to perform LX prediction of a prediction block A is not 0 (YES in step S2113), a reference index refIdxLXCol of LX of a time merge candidate is set to a value identical to the value of reference index refIdxLX[xA][yA] of LX of the prediction block A (step S2114). xA and yA are indexes indicating the position of an upper left pixel in a prediction block A in a picture.

According to the present embodiment, in prediction block N (N=A or B), in case that the prediction block N is outside a slice subject to encoding and decoded and cannot be used, in case that the prediction block N has not been encoded because the prediction block N is subsequent to the prediction block subject to encoding or decoding in the order of encoding or decoding so that the prediction block N cannot be used, or in case that the prediction mode PredMode is intra prediction (MODE_INTRA), both flags, predFlagL0[xN][yN] indicating whether or not to use L0 prediction and predFlagL1[xN][yN] indicating whether or not to use L1 prediction, are 0. xN and yN are indexes indicating the position of an upper left pixel in a prediction block N in a picture. In case that the prediction mode PredMode of the prediction block N is inter prediction (MODE_INTER) and the inter prediction mode is L0 prediction (Pred_L0), the flag predFlagL0[xN][yN] indicating whether or not to use L0 prediction of the prediction block N is 1, and the flag predFlagL1[xN][yN] indicating whether or not to use L1 prediction is 0. In case that the inter prediction mode of the prediction block N is L1 prediction (Pred_L1), the flag predFlagL0[xN][yN] indicating whether or not to use L0 prediction of the prediction block N is 0, and the flag predFlagL1[xN][yN] indicating whether or not to use L1 prediction is 1. In case that the inter prediction mode of the prediction block N is bi-prediction (Pred_BI), the flag predFlagL0[xN][yN] indicating whether or not to use L0 prediction of the prediction block N and the flag predFlagL1[xN][yN] indicating whether or not to use L1 prediction are both 1.

In case that a flag predFlagLX[xA][yA] indicating whether or not to perform LX prediction of a prediction block A is 0 (NO in step S2113), a reference index refIdxLXCol of LX of a time merge candidate is set to a default value 0 (step S2115).

Processes of step S2113 through step S2115 are performed for L0 and L1 respectively (step S2112-S2116), and the derivation process of a reference index is completed.

On the other hand, in case that the partition mode (PartMode) is N by 2N partition (PART_Nx2N), nL by 2N partition (PART_nLx2N), or nR by 2N partition (PART_nRx2N) and the partition index PartIdx is 1 (YES in step S2102), coding information of a prediction B adjacent to the top of the prediction block subject to derivation is derived from the coding information storing memory 115 or 210 (step S2117).

Subsequent processes of step S2119 through step S2121 are performed for L0 and L1 respectively (step S2118-S2122). In case of deriving a reference index of L0 of a time merge candidate, LX is set to L0, and in case of deriving a reference index of L1, LX is set to L1. However, in case that the slice type slice_type is a P slice, an inter prediction mode only includes L0 prediction (Pred_L0) and does not include L1 prediction (Pred_L1) nor bi-prediction (Pred_BI). Therefore a process regarding L1 can be omitted.

In case that a flag predFlagLX[xB][yB] indicating whether or not to perform LX prediction of a prediction block B is not 0 (YES in step S2119), a reference index refIdxLXCol of LX of a time merge candidate is set to a value identical to the value of reference index refIdxLX[xB][yB] of LX of the prediction block B (step S2120). xB and yB are indexes indicating the position of an upper left pixel in a prediction block B in a picture.

In case that a flag predFlagLX[xB][yB] indicating whether or not to perform LX prediction of a prediction block B is 0 (NO in step S2119), a reference index refIdxLXCol of LX of a time merge candidate is set to a default value 0 (step S2121).

Processes of step S2119 through step S2121 are performed for L0 and L1 respectively (step S2118-S2122), and the derivation process of the reference index is completed.

Fourth Exemplary Embodiment

Figure 26:
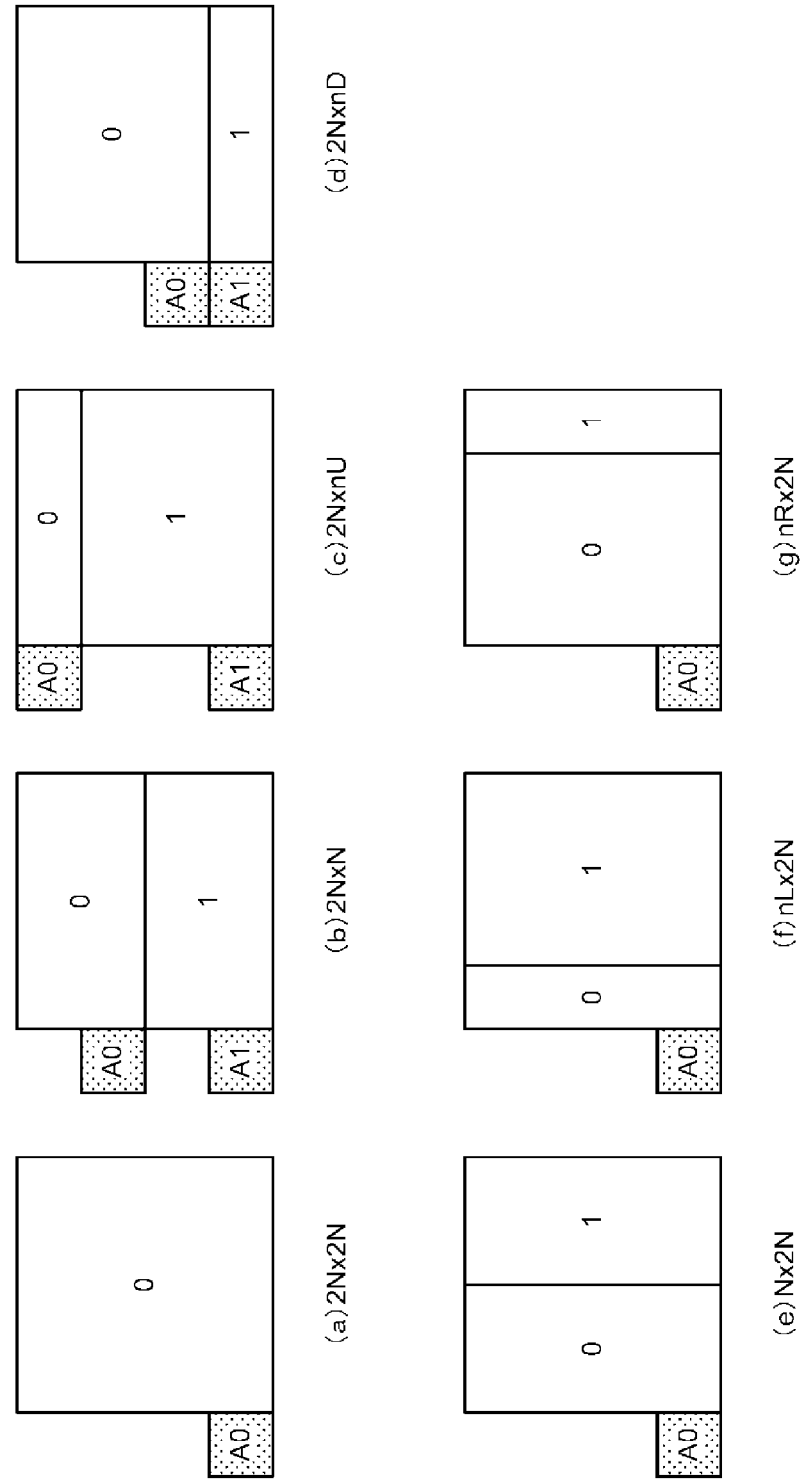
FIG. 26 illustrates an adjacent block referred to in derivation process of a reference index of a time merge candidate according to a fourth exemplary embodiment of the present embodiment.

Next, an explanation will be given below on a fourth exemplary embodiment of the present embodiment. FIG. 26 shows adjacent blocks referred to in the derivation process of a reference index of a time merge candidate according to the fourth exemplary embodiment of the present embodiment. According to the fourth exemplary embodiment of the present embodiment, in accordance with the partition mode (PartMode) of a coding block and the partition index PartIdx of the prediction block, whether or not to refer to a prediction block adjacent to the left edge of a prediction block subject to derivation is switched. In case that a prediction block adjacent to the left edge is outside the coding block, the prediction block is referred to and in case that the prediction block adjacent to the left edge is inside the coding block, the prediction block is not referred to and a default value is set. In case that a partition mode (PartMode) is 2N by 2N partition (PART_2Nx2N), as shown in FIG. 26A, a prediction block A0 adjacent to the left of a prediction block subject to derivation is referred to, and a reference index of LX of a time merge candidate is set to a value of reference index of LX of the prediction block A0.

In case that a partition mode (PartMode) is 2N by N partition (PART_2NxN), 2N by nU partition (PART_2NxnU), and 2N by nD partition (PART_2NxnD), where coding block subject to processing is partitioned into two prediction blocks arranged vertically, as shown in FIGS. 26B, 26C, and 26D, a prediction block A0 adjacent to the left is referred to for a prediction block subject to derivation of which the partition index PartIdx is 0, and a reference index of LX of time merge candidate is set to a value of reference index of LX of prediction block A0. In case of a prediction block subject to derivation of which the partition index PartIdx is 1, a prediction block A1 adjacent to the left is referred to, and a reference index of LX of a time merge candidate is set to the value of reference index of LX of the prediction block A1. Since both prediction blocks A0 and A1 to refer to are outside of the coding block, a reference index of time merge candidate of two prediction blocks, of which the partition index PartIdx are 0 and 1 respectively, can be derived in parallel, respectively.

In case that a partition mode (PartMode) is N by 2N partition (PART_Nx2N), nL by 2N partition (PART_nLx2N), or nR by 2N partition (PART_nRx2N), where coding block subject to processing is partitioned into two prediction blocks arranged horizontally, as shown in FIGS. 26E, 26F, and 26G, a prediction block A0 adjacent to the left is referred to for a prediction block subject to derivation of which the partition index PartIdx is 0, reference indexes of LX of time merge candidates are set to a value of reference index of LX of prediction block A0. In case of a prediction block subject to derivation of which the partition index PartIdx is 1, a prediction block in the proximity is not referred to, and a reference index of LX of a time merge candidate is set to a default value 0. Since a prediction block A0 to be referred to is outside of the coding block, a reference index of time merge candidate of two prediction blocks of which the partition index PartIdx are 0 and 1 respectively, can be derived in parallel, respectively.

However, in case that a prediction blocks A does not perform LX prediction, a reference index of LX of a time merge candidate is set to a default value 0. The reason why the default value of a reference index of LX of a time merge candidate is set to 0 in case that a prediction block A in the proximity does not perform LX prediction or in case that a partition index PartIdx of a prediction block subject to derivation is 1 is that a reference picture corresponding to the reference index value 0 has the highest possibility to be selected in inter prediction. However, the scope of the present invention is not limited to this example. The default value of the reference index may be set to a value other than 0 (e.g., 1, 2, etc.), or a syntax element indicating the default value of the reference index may be provided in a bitstream at a sequence level, at a picture level, or at a slice level, so that the syntax element can be transmitted and selected at encoding.

Figure 27:
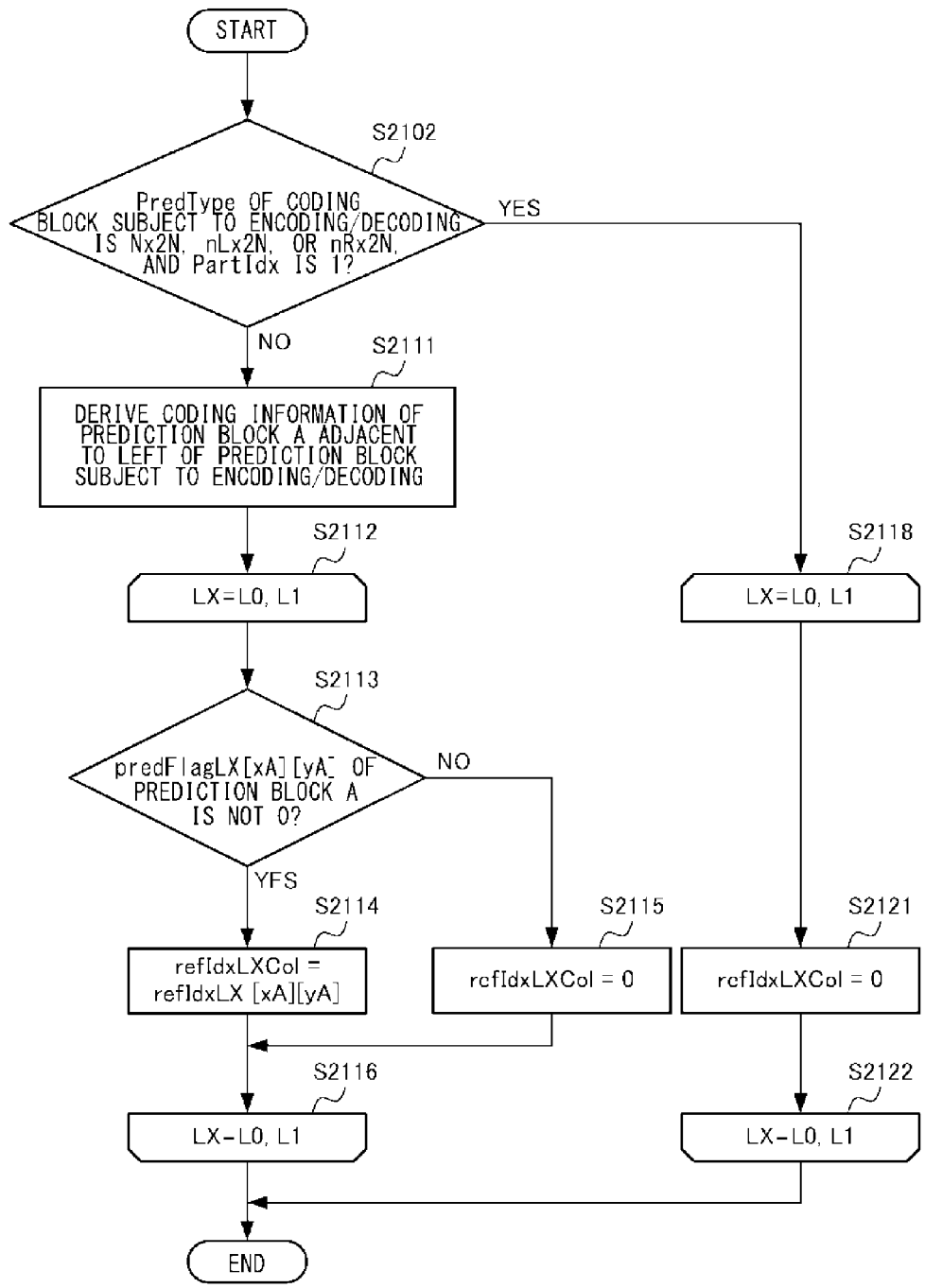
FIG. 27 shows a flowchart illustrating procedure of derivation process of a reference index of a time merge candidate of a merge mode according to a method of the fourth exemplary embodiment.

FIG. 27 shows a flowchart illustrating procedure of derivation process of a reference index of a time merge candidate in step S202 of FIG. 18 according to the fourth exemplary embodiment of the present embodiment. First, in case that the partition mode (PartMode) is not N by 2N partition (PART_Nx2N), nL by 2N partition (PART_nLx2N), or nR by 2N partition (PART_nRx2N) and the partition index PartIdx is not 1 (NO in step S2102), (i.e., in case of 2N by 2N partition (PART_2Nx2N), 2N by N partition (PART_2NxN), 2N by nU partition (PART_2NxnU), 2N by nD partition (PART_2NxnD), N by 2N partition (PART_Nx 2N), nL by 2N partition (PART_nL×2N), or nR by 2N partition (PART_nR×2N), and the partition index PartIdx is 0), coding information of a prediction block A adjacent to the left of a prediction block subject to derivation is derived from the coding information storing memory 115 or 210 (step S2111).

Subsequent processes of step S2113 through step S2115 are performed for L0 and L1 respectively (step S2112-S2116). In case of deriving a reference index of L0 of a time merge candidate, LX is set to L0, and in case of deriving a reference index of L1, LX is set to L1. However, in case that the slice type slice_type is a P slice, an inter prediction mode only includes L0 prediction (Pred_L0) and does not include L1 prediction (Pred_L1) nor bi-prediction (Pred_BI). Therefore a process regarding L1 can be omitted.

In case that a flag predFlagLX[xA][yA] indicating whether or not to perform LX prediction of a prediction block A is not 0 (YES in step S2113), a reference index refIdxLXCol of LX of a time merge candidate is set to a value identical to the value of reference index refIdxLX[xA][yA] of LX of the prediction block A (step S2114). xA and yA are indexes indicating the position of an upper left pixel in a prediction block A in a picture.

According to the present embodiment, in prediction block N (N=A or B), in case that the prediction block N is outside a slice subject to encoding and decoded and cannot be used, in case that the prediction block N has not been encoded because the prediction block N is subsequent to the prediction block subject to encoding or decoding in the order of encoding or decoding so that the prediction block N cannot be used, or in case that the prediction mode PredMode is intra prediction (MODE_INTRA), both flags, predFlagL0[xN][yN] indicating whether or not to use L0 prediction and predFlagL1[xN][yN] indicating whether or not to use L1 prediction, are 0. xN and yN are indexes indicating the position of an upper left pixel in a prediction block N in a picture. In case that the prediction mode PredMode of the prediction block N is inter prediction (MODE_INTER) and the inter prediction mode is L0 prediction (Pred_L0), the flag predFlagL0[xN][yN] indicating whether or not to use L0 prediction of the prediction block N is 1, and the flag predFlagL1[xN][yN] indicating whether or not to use L1 prediction is 0. In case that the inter prediction mode of the prediction block N is L1 prediction (Pred_L1), the flag predFlagL0[xN][yN] indicating whether or not to use L0 prediction of the prediction block N is 0, and the flag predFlagL1[xN][yN] indicating whether or not to use L1 prediction is 1. In case that the inter prediction mode of the prediction block N is bi-prediction (Pred_BI), the flag predFlagL0[xN][yN] indicating whether or not to use L0 prediction of the prediction block N and the flag predFlagL1[xN][yN] indicating whether or not to use L1 prediction are both 1.

In case that a flag predFlagLX[xA][yA] indicating whether or not to perform LX prediction of a prediction block A is 0 (NO in step S2113), a reference index refIdxLXCol of LX of a time merge candidate is set to a default value 0 (step S2115).

Processes of step S2113 through step S2115 are performed for L0 and L1 respectively (step S2112-S2116), and the derivation process of a reference index is completed.

On the other hand, in case that the partition mode (PartMode) is N by 2N partition (PART_N×2N), nL by 2N partition (PART_nL×2N), or nR by 2N partition (PART_nR×2N) and the partition index PartIdx is 1 (YES in step S2102), subsequent process of step S2121 is performed for each L0 and L1 (step S2118-S2122). In case of deriving a reference index of L0 of a time merge candidate, LX is set to L0, and in case of deriving a reference index of L1, LX is set to L1. However, in case that the slice type slice_type is a P slice, an inter prediction mode only includes L0 prediction (Pred_L0) and does not include L1 prediction (Pred_L1) nor bi-prediction (Pred_BI). Therefore a process regarding L1 can be omitted.

A reference index refIdxLXCol of LX of a time merge candidate is set to a default value 0 (step S2121).

Processes up to S2121 are performed for L0 and L1 respectively (step S2118-S2122), and the derivation process of the reference index is completed.

Fifth Exemplary Embodiment

Figure 28:
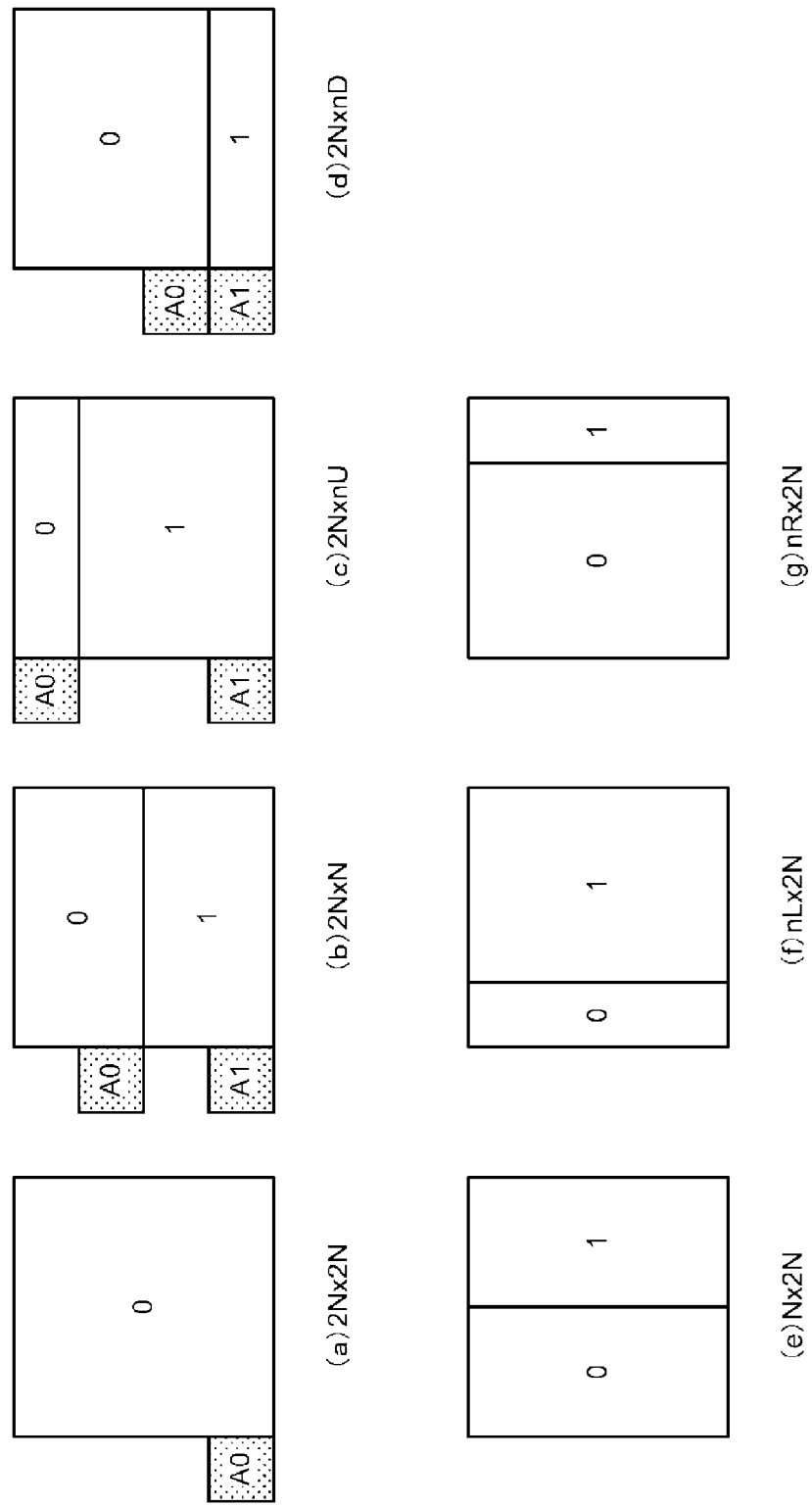
FIG. 28 illustrates an adjacent block referred to in derivation process of a reference index of a time merge candidate according to a fifth exemplary embodiment of the present embodiment.

Next, an explanation will be given below on a fifth exemplary embodiment of the present embodiment. FIG. 28 shows adjacent blocks referred to in the derivation process of a reference index of a time merge candidate according to the fifth exemplary embodiment of the present embodiment. According to the fifth exemplary embodiment of the present embodiment, in accordance with the partition mode (PartMode), whether or not to refer to a prediction block adjacent to the left edge of a prediction block subject to derivation is switched. A prediction block adjacent to the edge outside of a coding block is referred to. In case that a prediction block adjacent to the left edge is outside the coding block, the prediction block is referred to and in case that the prediction block adjacent to the left edge is inside the coding block, the prediction block is not referred to and a default value is set. In case that a partition mode (PartMode) is 2N by 2N partition (PART_2N×2N), as shown in FIG. 28A, a prediction block A0 adjacent to the left of a prediction block subject to derivation is referred to, and a reference index of LX of a time merge candidate is set to a value of reference index of LX of the prediction block A0.

In case that a partition mode (PartMode) is 2N by N partition (PART_2N×N), 2N by nU partition (PART_2N×nU), and 2N by nD partition (PART_2N×nD), where coding block subject to processing is partitioned into two prediction blocks arranged vertically, as shown in FIGS. 28B, 28C, and 28D, a prediction block A0 adjacent to the left is referred to for a prediction block subject to derivation of which the partition index PartIdx is 0, a reference index of LX of time merge candidate is set to a value of reference index of LX of prediction block A0. In case of a prediction block subject to derivation of which the partition index PartIdx is 1, a prediction block A1 adjacent to the left is referred to, and a reference index of LX of a time merge candidate is set to the value of reference index of LX of the prediction block A1. Since both prediction blocks A0 and A1 to refer to are outside of the coding block, a reference index of time merge candidate of two prediction blocks, of which the partition index PartIdx are 0 and 1 respectively, can be derived in parallel, respectively.

In case that a partition mode (PartMode) is N by 2N partition (PART_N×2N), nL by 2N partition (PART_nL×2N), or nR by 2N partition (PART_nR×2N), where coding block subject to processing is partitioned into two prediction blocks arranged horizontally, in both cases of a prediction block of which the partition index PartIdx is 0 or 1, a prediction block in the proximity is not referred to, and a reference index of LX of a time merge candidate is set to a default value 0. Since a prediction block in the proximity of a prediction block subject to processing is not referred to, a prediction block in the coding block is not referred to, therefore a reference index of time merge candidate of two prediction blocks of which the partition index PartIdx are 0 and 1 respectively, can be derived in parallel, respectively.

However, in case that a prediction blocks A does not perform LX prediction, a reference index of LX of a time merge candidate is set to a default value 0. The reason why the default value of a reference index of LX of a time merge candidate is set to 0 in case that a prediction block A in the proximity does not perform LX prediction or in case that the partition mode (PartMode) of a coding block including a prediction block subject to derivation is N by 2N partition (PART_N×2N), nL by 2N partition (PART_nL×2N), or nR by 2N partition is that a reference picture corresponding to the reference index value 0 has the highest possibility to be selected in inter prediction. However, the scope of the present invention is not limited to this example. The default value of the reference index may be set to a value other than 0 (e.g., 1, 2, etc.), or a syntax element indicating the default value of the reference index may be provided in a bitstream at a sequence level, at a picture level, or at a slice level, so that the syntax element can be transmitted and selected at encoding.

Figure 29:
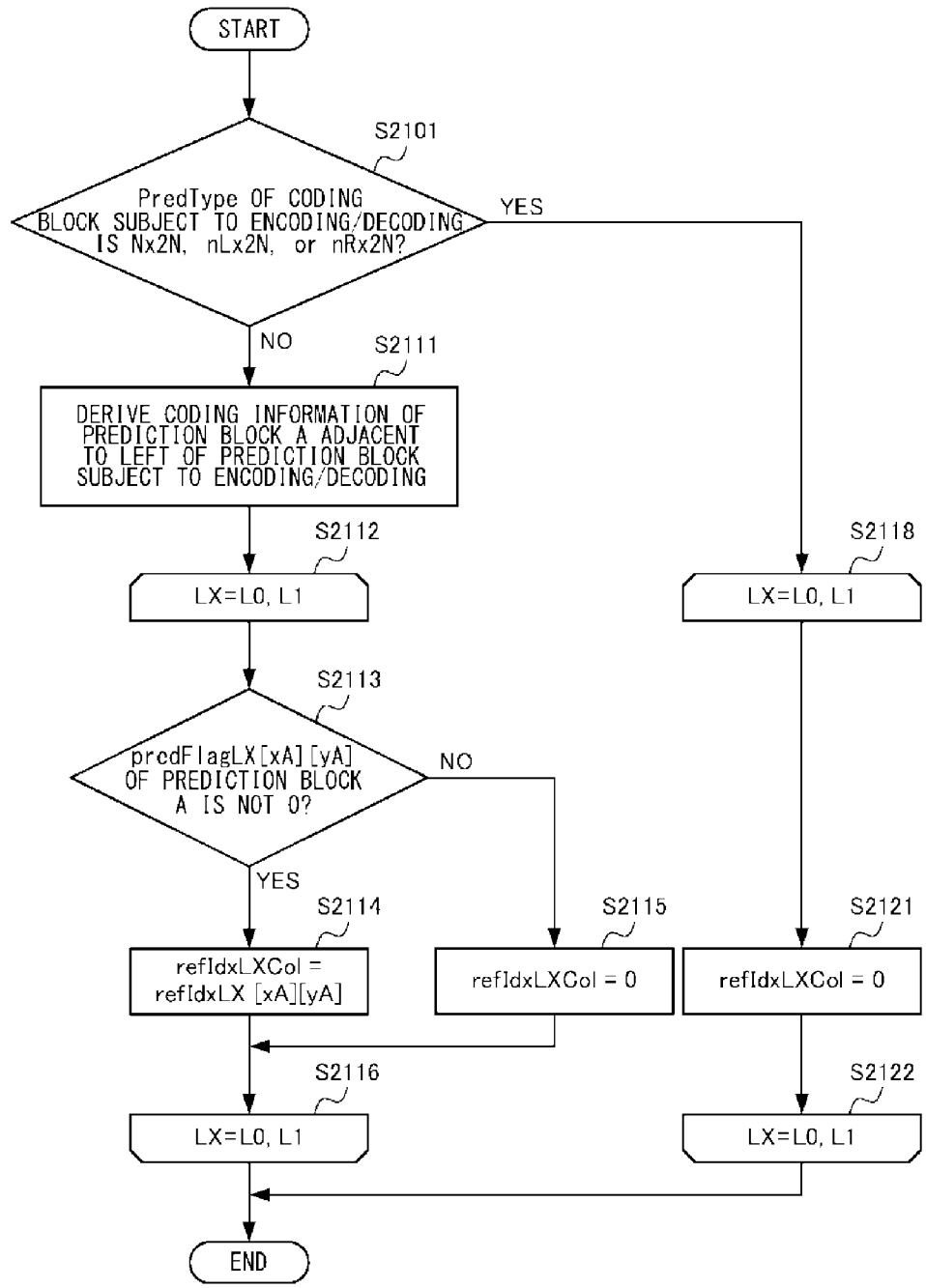
FIG. 29 shows a flowchart illustrating procedure of derivation process of a reference index of a time merge candidate of a merge mode according to a method of the fifth exemplary embodiment.

FIG. 29 shows a flowchart illustrating procedure of derivation process of a reference index of a time merge candidate in step S202 of FIG. 18 according to the fifth exemplary embodiment of the present embodiment. First, in case that the partition mode (PartMode) is not N by 2N partition (PART_N×2N), nL by 2N partition (PART_nL×2N), or nR by 2N partition (PART_nR×2N) (NO in step S2101), that is, in case of 2N by 2N partition (PART_2N×2N), 2N by N partition (PART_2N×N), 2N by nU partition (PART_2N×nU), 2N by nD partition (PART_2N×nD), coding information of a prediction block A adjacent to the left of a prediction block subject to derivation is derived from the coding information storing memory 115 or 210 (step S2111).

Subsequent processes of step S2113 through step S2115 are performed for L0 and L1 respectively (step S2112-S2116). In case of deriving a reference index of L0 of a time merge candidate, LX is set to L0, and in case of deriving a reference index of L1, LX is set to L1. However, in case that the slice type slice_type is a P slice, an inter prediction mode only includes L0 prediction (Pred_L0) and does not include L1 prediction (Pred_L1) nor bi-prediction (Pred_BI). Therefore a process regarding L1 can be omitted.

In case that a flag predFlagLX[xA][yA] indicating whether or not to perform LX prediction of a prediction block A is not 0 (YES in step S2113), a reference index refIdxLXCol of LX of a time merge candidate is set to a value identical to the value of reference index refIdxLX[xA][yA] of LX of the prediction block A (step S2114). xA and yA are indexes indicating the position of an upper left pixel in a prediction block A in a picture.

According to the present embodiment, in prediction block N (N=A or B), in case that the prediction block N is outside a slice subject to encoding and decoded and cannot be used, in case that the prediction block N has not been encoded because the prediction block N is subsequent to the prediction block subject to encoding or decoding in the order of encoding or decoding so that the prediction block N cannot be used, or in case that the prediction mode PredMode is intra prediction (MODE_INTRA), both flags, predFlagL0[xN][yN] indicating whether or not to use L0 prediction and predFlagL1[xN][yN] indicating whether or not to use L1 prediction, are 0. xN and yN are indexes indicating the position of an upper left pixel in a prediction block N in a picture. In case that the prediction mode PredMode of the prediction block N is inter prediction (MODE_INTER) and the inter prediction mode is L0 prediction (Pred_L0), the flag predFlagL0[xN][yN] indicating whether or not to use L0 prediction of the prediction block N is 1, and the flag predFlagL1[xN][yN] indicating whether or not to use L1 prediction is 0. In case that the inter prediction mode of the prediction block N is L1 prediction (Pred_L1), the flag predFlagL0[xN][yN] indicating whether or not to use L0 prediction of the prediction block N is 0, and the flag predFlagL1[xN][yN] indicating whether or not to use L1 prediction is 1. In case that the inter prediction mode of the prediction block N is bi-prediction (Pred_BI), the flag predFlagL0[xN][yN] indicating whether or not to use L0 prediction of the prediction block N and the flag predFlagL1[xN][yN] indicating whether or not to use L1 prediction are both 1.

In case that a flag predFlagLX[xA][yA] indicating whether or not to perform LX prediction of a prediction block A is 0 (NO in step S2113), a reference index refIdxLXCol of LX of a time merge candidate is set to a default value 0 (step S2115).

Processes of step S2113 through step S2115 are performed for L0 and L1 respectively (step S2112-S2116), and the derivation process of a reference index is completed.

On the other hand, in case that the partition mode (PartMode) is N by 2N partition (PART_N×2N), nL by 2N partition (PART_nL×2N), or nR by 2N partition (PART_nR×2N) (YES in step S2101), subsequent process of step S2121 is performed for each L0 and L1 (step S2118-S2122). In case of deriving a reference index of L0 of a time merge candidate, LX is set to L0, and in case of deriving a reference index of L1, LX is set to L1. However, in case that the slice type slice_type is a P slice, an inter prediction mode only includes L0 prediction (Pred_L0) and does not include L1 prediction (Pred_L1) nor bi-prediction (Pred_BI). Therefore a process regarding L1 can be omitted.

A reference index refIdxLXCol of LX of a time merge candidate is set to a default value 0 (step S2121).

Processes up to S2121 are performed for L0 and L1 respectively (step S2118-S2122), and the derivation process of the reference index is completed.

Sixth Exemplary Embodiment

Next, an explanation will be given below on a sixth exemplary embodiment of the present embodiment. According to the sixth exemplary embodiment of the present embodiment, regardless of a partition mode (PartMode) of a coding block including prediction mode subject to derivation (coding block subject to processing), and a value of partition index PartIdx of a prediction mode subject to derivation, prediction block in the proximity is not referred to, and a reference index of LX of a time merge candidate is set to a default value 0. Since a prediction block in the proximity of a prediction block subject to processing is not referred to, a prediction block in the coding block is not referred to, therefore time merge candidates of two prediction blocks which is included in a same coding block and of which the partition index PartIdx are 0 and 1 respectively, can be derived in parallel, respectively.

The reason why the default value of a reference index of LX of a time merge candidate is set to 0 is that a reference picture corresponding to the reference index value 0 has the highest possibility to be selected in inter prediction. However, the scope of the present invention is not limited to this example. The default value of the reference index may be set to a value other than 0 (e.g., 1, 2, etc.), or a syntax element indicating the default value of the reference index may be provided in a bitstream at a sequence level, at a picture level, or at a slice level, so that the syntax element can be transmitted and selected at encoding.

In addition, according to the sixth exemplary embodiment, a reference index refIdxLXCol of LX of a time merge candidate is set to a default value 0 without referring to a block in the proximity. Therefore, the derivation process can be simplified in comparison with the first, second, third, fourth, fifth, and seventh (described later) embodiment.

Figure 30:
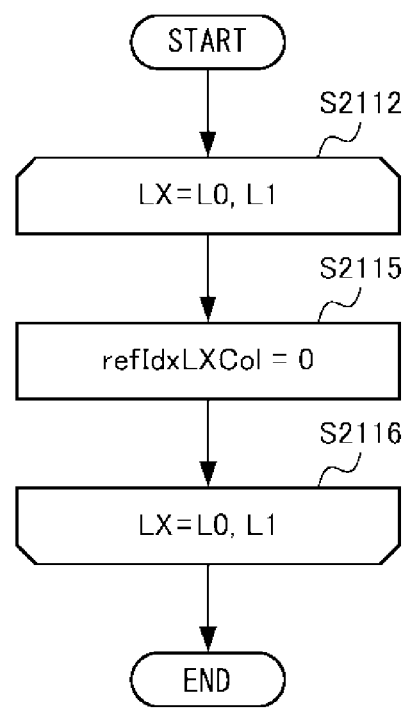
FIG. 30 shows a flowchart illustrating procedure of derivation process of a reference index of a time merge candidate of a merge mode according to a method of a sixth exemplary embodiment.

FIG. 30 shows a flowchart illustrating procedure of derivation process of a reference index of a time merge candidate in step S202 of FIG. 18 according to the sixth exemplary embodiment of the present embodiment.

A process of step S2115 is performed for L0 and L1 respectively (step S2112-S2116). In case of deriving a reference index of L0 of a time merge candidate, LX is set to L0, and in case of deriving a reference index of L1, LX is set to L1. However, in case that the slice type slice_type is a P slice, an inter prediction mode only includes L0 prediction (Pred_L0) and does not include L1 prediction (Pred_L1) nor bi-prediction (Pred_BI). Therefore a process regarding L1 can be omitted.

A reference index refIdxLXCol of LX of a time merge candidate is set to a default value 0 (step S2115).

A process of step S2115 is performed for L0 and L1 respectively (step S2112-S2116), and the derivation process of a reference index is completed.

Seventh Exemplary Embodiment

Figure 31:
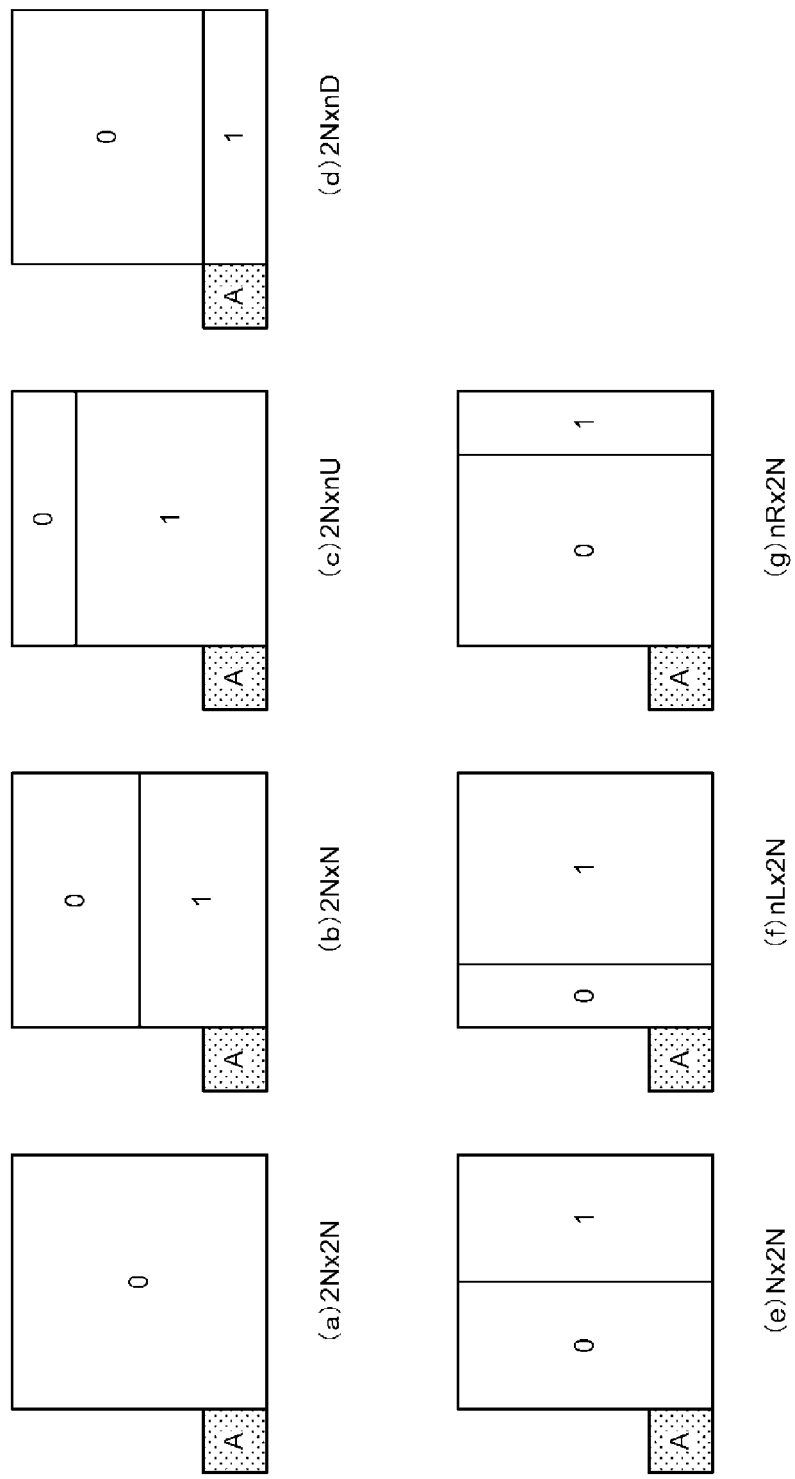
FIG. 31 illustrates an adjacent block referred to in derivation process of a reference index of a time merge candidate according to a seventh exemplary embodiment of the present embodiment.

Next, an explanation will be given below on a seventh exemplary embodiment of the present embodiment. FIG. 31 shows adjacent blocks referred to in the derivation process of a reference index of a time merge candidate according to the seventh exemplary embodiment of the present embodiment. According to the seventh exemplary embodiment of the present embodiment, regardless of a partition mode (PartMode) of a coding block including prediction mode subject to derivation (coding block subject to processing), and a value of partition index PartIdx of a prediction mode subject to derivation, prediction block A adjacent to the left of a coding block subject to processing is referred to as shown in FIGS. 31A-31G, and a reference index of LX of a time merge candidate is set to a value of a reference index of LX of the prediction block A. Since a prediction block A to be referred to is outside of the coding block, a reference index of time merge candidate of two prediction blocks of which the partition index PartIdx are 0 and 1 respectively, can be derived in parallel, respectively.

However, in case that a prediction blocks A does not perform LX prediction, a reference index of LX of a time merge candidate is set to a default value 0. The reason why the default value of a reference index of LX of a time merge candidate is set to 0 in case that the prediction block A in the proximity does not perform LX prediction is that a reference picture corresponding to the reference index value 0 has the highest possibility to be selected in inter prediction. However, the scope of the present invention is not limited to this example. The default value of the reference index may be set to a value other than 0 (e.g., 1, 2, etc.), or a syntax element indicating the default value of the reference index may be provided in a bitstream at a sequence level, at a picture level, or at a slice level, so that the syntax element can be transmitted and selected at encoding.

According to the sixth exemplary embodiment, reference indexes of time merge candidates of respective prediction blocks in the coding block are set to a common value. Therefore, it is not required to derive a reference index of time merge candidate for each prediction block, so that the derivation process can be simplified.

Figure 32:
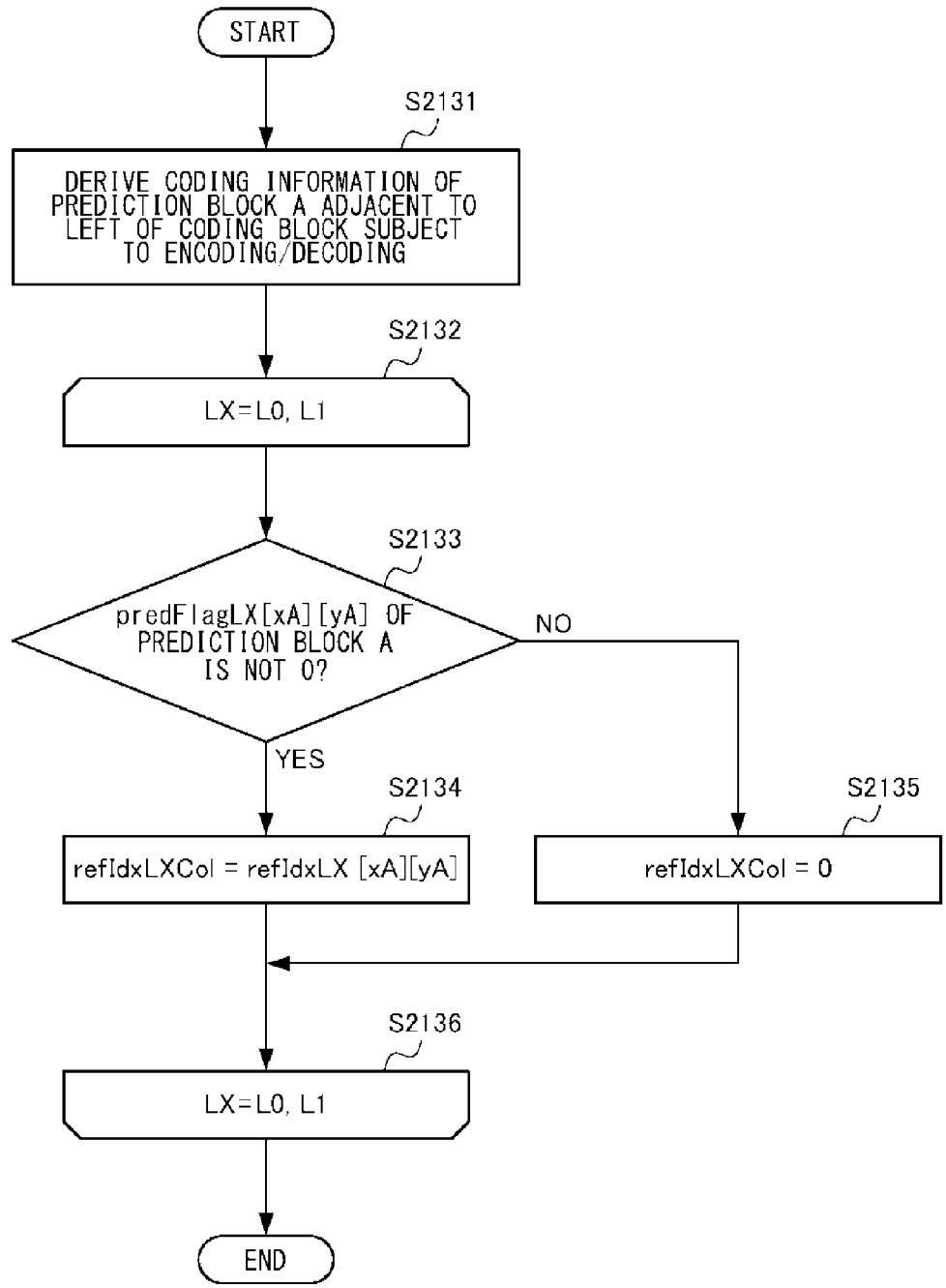
FIG. 32 shows a flowchart illustrating procedure of derivation process of a reference index of a time merge candidate of a merge mode according to the method of the seventh exemplary embodiment.

FIG. 32 shows a flowchart illustrating procedure of derivation process of a reference index of a time merge candidate in step S202 of FIG. 18 according to the seventh exemplary embodiment of the present embodiment. First, coding information on a prediction block A adjacent to the left of a coding block subject to processing is derived from the coding information storing memory 115 or 210 (step S2131).

Subsequent processes of step S2133 through step S2135 are performed for L0 and L1 respectively (step S2132-S2136). In case of deriving a reference index of L0 of a time merge candidate, LX is set to L0, and in case of deriving a reference index of L1, LX is set to L1. However, in case that the slice type slice_type is a P slice, an inter prediction mode only includes L0 prediction (Pred_L0) and does not include L1 prediction (Pred_L1) nor bi-prediction (Pred_BI). Therefore a process regarding L1 can be omitted.

In case that a flag predFlagLX[xA][yA] indicating whether or not to perform LX prediction of a prediction block A, which is adjacent to the left of a coding block subject to processing, is not 0 (YES in step S2133), a reference index refIdxLXCol of LX of a time merge candidate is set to a value identical to the value of reference index refIdxLX[xA][yA] of LX of the prediction block A (step S2134). xA and yA are indexes indicating the position of an upper left pixel in a prediction block A, which is adjacent to the left of a coding block subject to processing, in a picture.

According to the present embodiment, in prediction block N (N=A or B), in case that the prediction block N is outside a slice subject to encoding and decoded and cannot be used, in case that the prediction block N has not been encoded because the prediction block N is subsequent to the prediction block subject to encoding or decoding in the order of encoding or decoding so that the prediction block N cannot be used, or in case that the prediction mode PredMode is intra prediction (MODE_INTRA), both flags, predFlagL0[xN][yN] indicating whether or not to use L0 prediction and predFlagL1[xN][yN] indicating whether or not to use L1 prediction, are 0. xN and yN are indexes indicating the position of an upper left pixel in a prediction block N in a picture. In case that the prediction mode PredMode of the prediction block N is inter prediction (MODE_INTER) and the inter prediction mode is L0 prediction (Pred_L0), the flag predFlagL0[xN][yN] indicating whether or not to use L0 prediction of the prediction block N is 1, and the flag predFlagL1[xN][yN] indicating whether or not to use L1 prediction is 0. In case that the inter prediction mode of the prediction block N is L1 prediction (Pred_L1), the flag predFlagL0[xN][yN] indicating whether or not to use L0 prediction of the prediction block N is 0, and the flag predFlagL1[xN][yN] indicating whether or not to use L1 prediction is 1. In case that the inter prediction mode of the prediction block N is bi-prediction (Pred_BI), the flag predFlagL0[xN][yN] indicating whether or not to use L0 prediction of the prediction block N and the flag predFlagL1[xN][yN] indicating whether or not to use L1 prediction are both 1.

In case that a flag predFlagLX[xA][yA] indicating whether or not to perform LX prediction of a prediction block A is 0 (NO in step S2133), a reference index refIdxLXCol of LX of a time merge candidate is set to a default value 0 (step S2135).

Processes of step S2133 through step S2135 are performed for L0 and L1 respectively (step S2132-S2136), and the derivation process of a reference index is completed.

Although whether or not to refer to a prediction block adjacent to the left edge of a coding block including a prediction block subject to derivation is switched according to the seventh exemplary embodiment, instead of the prediction block adjacent to the left edge, whether or not to refer to a prediction block adjacent to the upper edge may be switched.

Eighth Exemplary Embodiment

Figure 43:
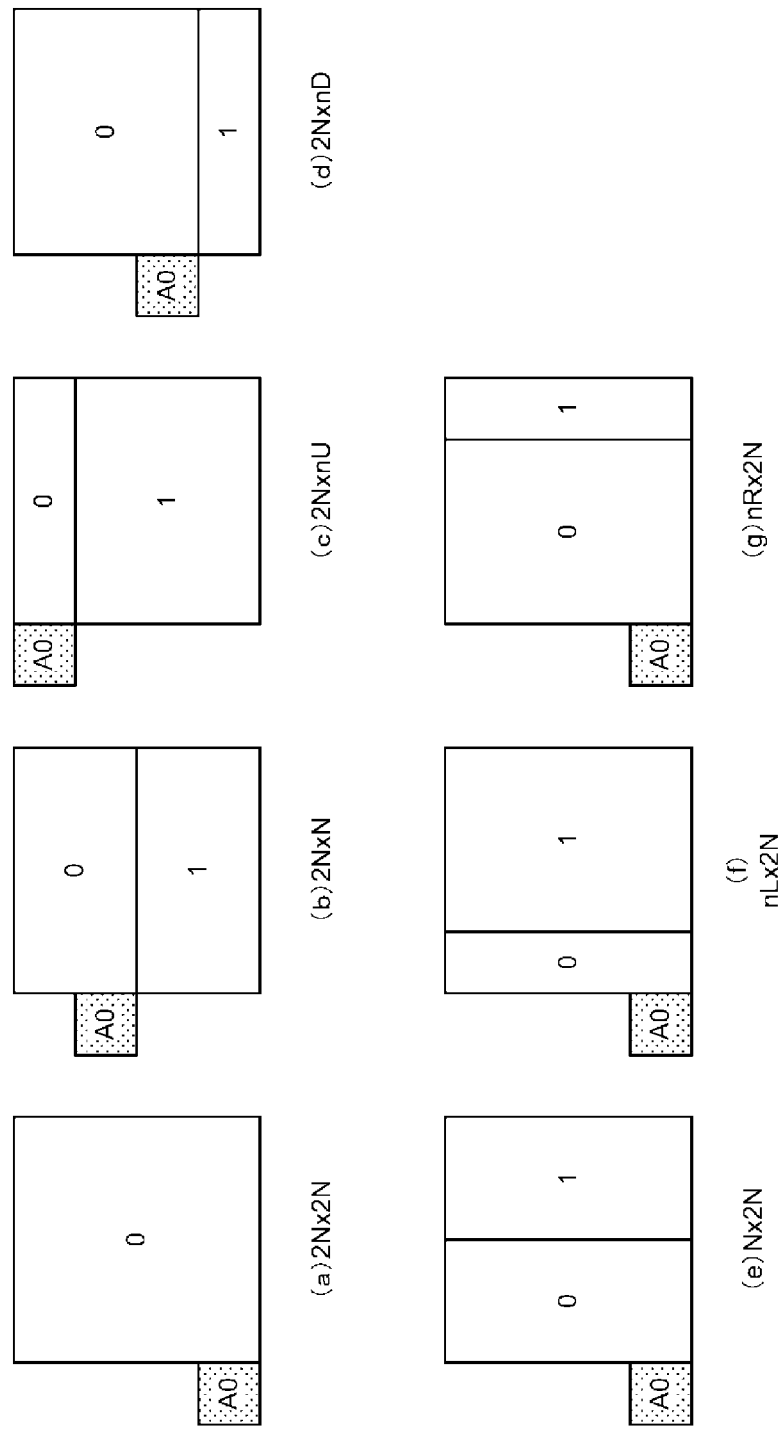
FIG. 43 illustrates an adjacent block referred to in derivation process of a reference index of a time merge candidate according to an eighth exemplary embodiment of the present embodiment.

Next, an explanation will be given below on an eighth exemplary embodiment of the present embodiment. FIG. 43 shows adjacent blocks referred to in the derivation process of a reference index of a time merge candidate according to the eighth exemplary embodiment of the present embodiment. According to the eighth exemplary embodiment of the present embodiment, regardless of the partition mode (PartMode) of a coding block, and in accordance with the partition index PartIdx of a prediction block, whether or not to refer to a prediction block adjacent to the left edge of a prediction block subject to derivation is switched. In case that the partition index PartIdx of a prediction block is 0, a prediction block adjacent to the left edge is referred to, and in case that the partition index PartIdx is a value other than 0, a prediction block in the proximity is not referred to, and a default value is set. In case that the partition index PartIdx of a prediction block is 0, a prediction block adjacent to the left edge is always outside the coding block in any partition mode (PartMode). However, in case that the partition index PartIdx is a value other than 0, a prediction block adjacent to the left edge may be inside the coding block depending on the partition mode (PartMode). As shown in FIG. 43A, a prediction block A0 adjacent to the left of a prediction block subject to derivation is referred to, and a reference index of LX of a time merge candidate is set to a value of reference index of LX of the prediction block A0.

In case that a partition mode (PartMode) is 2N by N partition (PART_2N×N), 2N by nU partition (PART_2N×nU), and 2N by nD partition (PART_2N×nD), where coding block subject to processing is partitioned into two prediction blocks arranged vertically, or in case that a partition mode (PartMode) is N by 2N partition (PART_N×2N), nL by 2N partition (PART_nL×2N), or nR by 2N partition (PART_nR×2N), as shown in FIGS. 43B, 43C, 43D, 43E, 43F, and 43G, a prediction block A0 adjacent to the left is referred to for a prediction block subject to derivation of which the partition index PartIdx is 0, and a reference index of LX of time merge candidate is set to a value of reference index of LX of prediction block A0. In case of a prediction block subject to derivation of which the partition index PartIdx is 1, a prediction block in the proximity is not referred to, and a reference index of LX of a time merge candidate is set to a default value 0. Since a prediction block A0 to be referred to is outside of the coding block, a reference index of time merge candidate of two prediction blocks of which the partition index PartIdx are 0 and 1 respectively, can be derived in parallel, respectively.

However, in case that a prediction blocks A does not perform LX prediction, a reference index of LX of a time merge candidate is set to a default value 0. The reason why the default value of a reference index of LX of a time merge candidate is set to 0 in case that a prediction block A in the proximity does not perform LX prediction or in case that a partition index PartIdx of a prediction block subject to derivation is 1 is that a reference picture corresponding to the reference index value 0 has the highest possibility to be selected in inter prediction. However, the scope of the present invention is not limited to this example. The default value of the reference index may be set to a value other than 0 (e.g., 1, 2, etc.), or a syntax element indicating the default value of the reference index may be provided in a bitstream at a sequence level, at a picture level, or at a slice level, so that the syntax element can be transmitted and selected at encoding.

Figure 44:
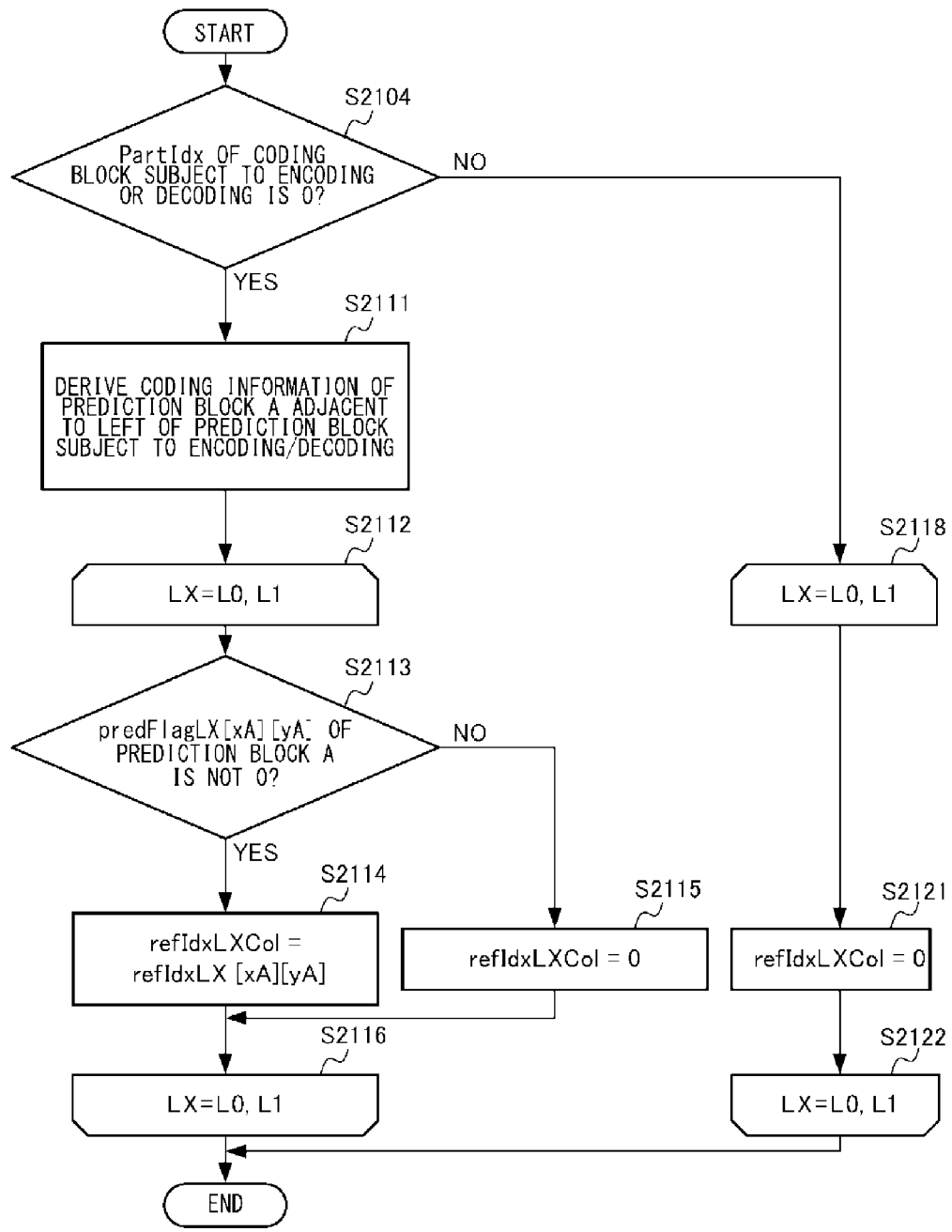
FIG. 44 shows a flowchart illustrating procedure of derivation process of a reference index of a time merge candidate in a merge mode according to a method of the eighth exemplary embodiment.

FIG. 44 shows a flowchart illustrating procedure of derivation process of a reference index of a time merge candidate in step S202 of FIG. 18 according to the eighth exemplary embodiment of the present embodiment. First, in case that the partition index PartIdx is 0 (YES in step S2104), coding information on a prediction block A adjacent to the left of a prediction block subject to derivation is derived from the coding information storing memory 115 or 210 (step S2111).

Subsequent processes of step S2113 through step S2115 are performed for L0 and L1 respectively (step S2112-S2116). In case of deriving a reference index of L0 of a time merge candidate, LX is set to L0, and in case of deriving a reference index of L1, LX is set to L1. However, in case that the slice type slice_type is a P slice, an inter prediction mode only includes L0 prediction (Pred_L0) and does not include L1 prediction (Pred_L1) nor bi-prediction (Pred_BI). Therefore a process regarding L1 can be omitted.

In case that a flag predFlagLX[xA][yA] indicating whether or not to perform LX prediction of a prediction block A is not 0 (YES in step S2113), a reference index refIdxLXCol of LX of a time merge candidate is set to a value identical to the value of reference index refIdxLX[xA][yA] of LX of the prediction block A (step S2114). xA and yA are indexes indicating the position of an upper left pixel in a prediction block A in a picture.

According to the present embodiment, in prediction block N (N=A or B), in case that the prediction block N is outside a slice subject to encoding and decoded and cannot be used, in case that the prediction block N has not been encoded because the prediction block N is subsequent to the prediction block subject to encoding or decoding in the order of encoding or decoding so that the prediction block N cannot be used, or in case that the prediction mode PredMode is intra prediction (MODE_INTRA), both flags, predFlagL0[xN][yN] indicating whether or not to use L0 prediction and predFlagL1[xN][yN] indicating whether or not to use L1 prediction, are 0. xN and yN are indexes indicating the position of an upper left pixel in a prediction block N in a picture. In case that the prediction mode PredMode of the prediction block N is inter prediction (MODE_INTER) and the inter prediction mode is L0 prediction (Pred_L0), the flag predFlagL0[xN][yN] indicating whether or not to use L0 prediction of the prediction block N is 1, and the flag predFlagL1[xN][yN] indicating whether or not to use L1 prediction is 0. In case that the inter prediction mode of the prediction block N is L1 prediction (Pred_L1), the flag predFlagL0[xN][yN] indicating whether or not to use L0 prediction of the prediction block N is 0, and the flag predFlagL1[xN][yN] indicating whether or not to use L1 prediction is 1. In case that the inter prediction mode of the prediction block N is bi-prediction (Pred_BI), the flag predFlagL0[xN][yN] indicating whether or not to use L0 prediction of the prediction block N and the flag predFlagL1[xN][yN] indicating whether or not to use L1 prediction are both 1.

In case that a flag predFlagLX[xA][yA] indicating whether or not to perform LX prediction of a prediction block A is 0 (NO in step S2113), a reference index refIdx-LXCol of LX of a time merge candidate is set to a default value 0 (step S2115).

Processes of step S2113 through step S2115 are performed for L0 and L1 respectively (step S2112-S2116), and the derivation process of a reference index is completed.

On the other hand, in case that the partition index PartIdx is not 0 (NO in step S2104), subsequent process of step S2121 is performed for each L0 and L1 (step S2118-S2122). In case of deriving a reference index of L0 of a time merge candidate, LX is set to L0, and in case of deriving a reference index of L1, LX is set to L1. However, in case that the slice type slice_type is a P slice, an inter prediction mode only includes L0 prediction (Pred_L0) and does not include L1 prediction (Pred_L1) nor bi-prediction (Pred_BI). Therefore a process regarding L1 can be omitted.

A reference index refIdxLXCol of LX of a time merge candidate is set to a default value 0 (step S2121).

Processes up to S2121 are performed for L0 and L1 respectively (step S2118-S2122), and the derivation process of the reference index is completed.

Although whether or not to refer to a prediction block adjacent to the left edge of a prediction block subject to derivation is switched according to the eighth exemplary embodiment, instead of the prediction block adjacent to the left edge, whether or not to refer to a prediction block adjacent to the upper edge may be switched.

Although it is assumed that N by N partition (PART_N× N) is not defined as a partition mode (PartMode) of a coding block according to the present embodiment, it is also possible to define the N by N partition (PART_N×N). Also in case that a partition mode (PartMode) is N by N partition (PART_N×N), when deriving a reference index of a time merge candidate of a prediction block included in a coding block subject to processing, by deriving the reference index without referring to a prediction block in the proximity, which is included in a coding block identical to a coding block included in a prediction block subject to processing, reference indexes of time merge candidates of four prediction blocks, of which the partition index PartIdx are 0, 1, 2, and 3 respectively, can be derived in parallel, respectively.

For example, in case of N by N partition (PART_N×N), a prediction block in the proximity is not referred to, and a reference index of LX of a time merge candidate is set to a default value 0. Since a prediction block in the proximity of a prediction block subject to derivation is not referred to, reference indexes of time merge candidates of four prediction blocks of which the partition index PartIdx are 0, 1, 2, and 3 respectively, can be derived in parallel, respectively.

Figure 33:
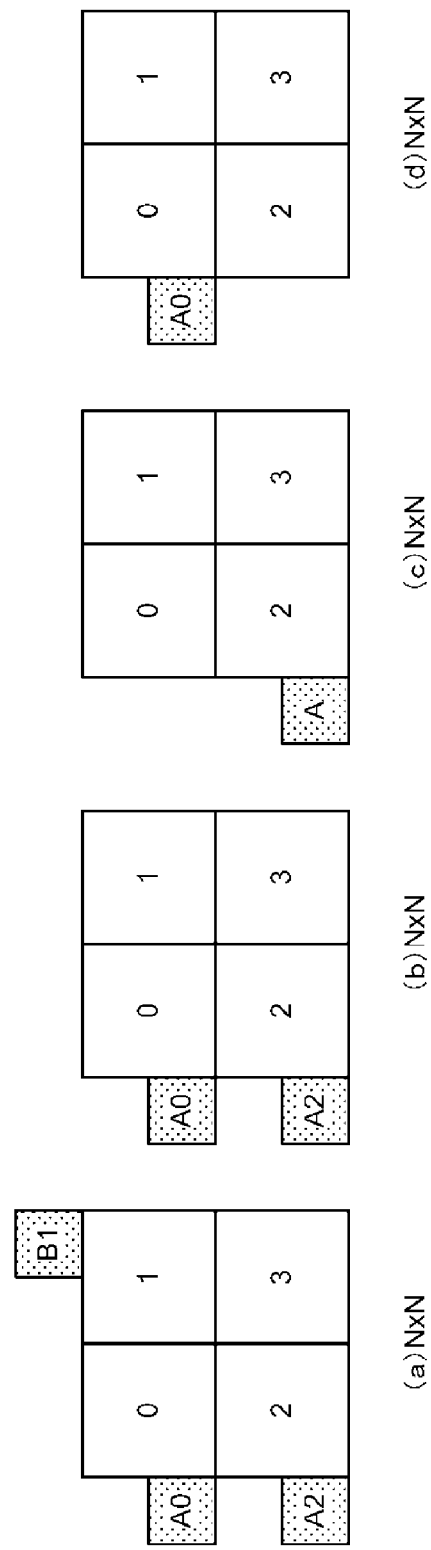
FIG. 33 illustrates an adjacent block referred to in derivation process of a reference index of a coding block of N by N partition.

Alternatively, a reference index of a block in the proximity can be referred to so that a reference index of a time merge candidate can be derived. FIG. 33 illustrates adjacent blocks referred to in the derivation process of a reference index of a time merge candidate of a coding block of N by N partition (PART_N×N).

As shown in FIG. 33A, in case of a prediction block subject to derivation of which the partition index PartIdx is 0, a prediction block A0 adjacent to the left is referred to, and a reference index of LX of a time merge candidate is set to a value of reference index of LX of the prediction block A0. In case of a prediction block subject to derivation of which the partition index PartIdx is 1, a prediction block B1 adjacent to the top is referred to, and a reference index of LX of a time merge candidate is set to the value of the reference index of LX of the prediction block B1. In case of a prediction block subject to derivation of which the partition index PartIdx is 2, a prediction block A2 adjacent to the left is referred to, and a reference index of LX of a time merge candidate is set to a value of reference index of LX of the prediction block A2. In case of a prediction block subject to derivation of which the partition index PartIdx is 3, a prediction block in the proximity is not referred to, and a reference index of LX of a time merge candidate is set to a default value 0. Since prediction blocks A0 and A2, adjacent to the left of a prediction block subject to processing, and B1, adjacent to the top thereof, are all outside of the coding block, reference indexes of time merge candidates of four prediction blocks of which the partition index PartIdx are 0, 1, 2, and 3 respectively, can be derived in parallel, respectively.

Alternatively, as shown in FIG. 33B, in case of a prediction block subject to derivation of which the partition index PartIdx is 0, a prediction block A0 adjacent to the left is referred to, and a reference index of LX of a time merge candidate is set to a value of the reference index of LX of the prediction block A0. In case of a prediction block subject to derivation of which the partition index PartIdx is 2, a prediction block A2 adjacent to the left is referred to, and a reference index of LX of a time merge candidate is set to a value of reference index of LX of the prediction block A2. In case of a prediction block subject to derivation of which the partition index PartIdx is 1 or 3, a prediction block in the proximity is not referred to, and a reference index of LX of a time merge candidate is set to a default value 0. Since both prediction blocks A0 and A2 adjacent to the left of a prediction block subject to processing are outside of the coding block, reference indexes of time merge candidates of four prediction blocks of which the partition index PartIdx are 0, 1, 2, and 3 can be derived respectively in parallel.

Alternatively, as shown in FIG. 33C, a prediction block A adjacent to the left of a coding block subject to processing is referred to, and a reference index of LX of a time merge candidate is set to a value of reference index of LX of the prediction block A. Since a prediction block A adjacent to the left of a coding block subject to processing is outside of the coding block, reference indexes of time merge candidates of four prediction blocks of which the partition index PartIdx are 0, 1, 2, and 3 can be derived respectively in parallel.

Alternatively, as shown in FIG. 33D, in case of a prediction block subject to derivation of which the partition index PartIdx is 0, a prediction block A0 adjacent to the left is referred to, and a reference index of LX of a time merge candidate is set to a value of the reference index of LX of the prediction block A0. In case of a prediction block subject to derivation of which the partition index PartIdx is other than 0 (PartIdx is 1, 2, or 3), a prediction block in the proximity is not referred to, and a reference index of LX of a time merge candidate is set to a default value 0. Since a prediction block A0 adjacent to the left of a prediction block subject to processing is outside of the coding block, reference indexes of time merge candidates of four prediction blocks of which the partition index PartIdx are 0, 1, 2, and 3 can be derived respectively in parallel.

Figure 34:
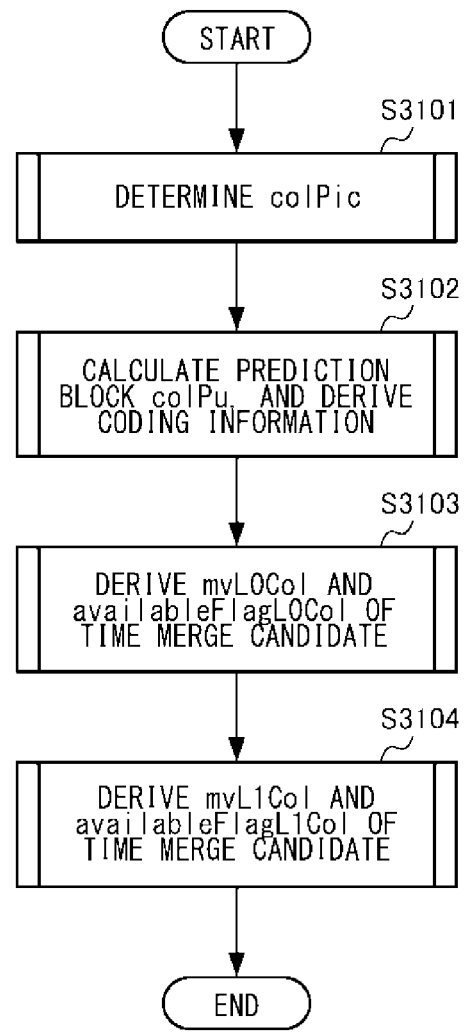
FIG. 34 shows a flowchart illustrating procedure of derivation process of a time merge candidate in a merge mode.

Next, a detailed explanation will be given on a method for deriving a merge candidate by using inter prediction information on a picture of a different time of step S203 of FIG. 18. FIG. 34 shows a flowchart illustrating procedure of time merge candidate derivation process of step S203 in FIG. 18.

First, a picture colPic of a different time is derived by a slice type slice_type and a flag collocated_from_l0_flag described above (step S3101).

Figure 35:
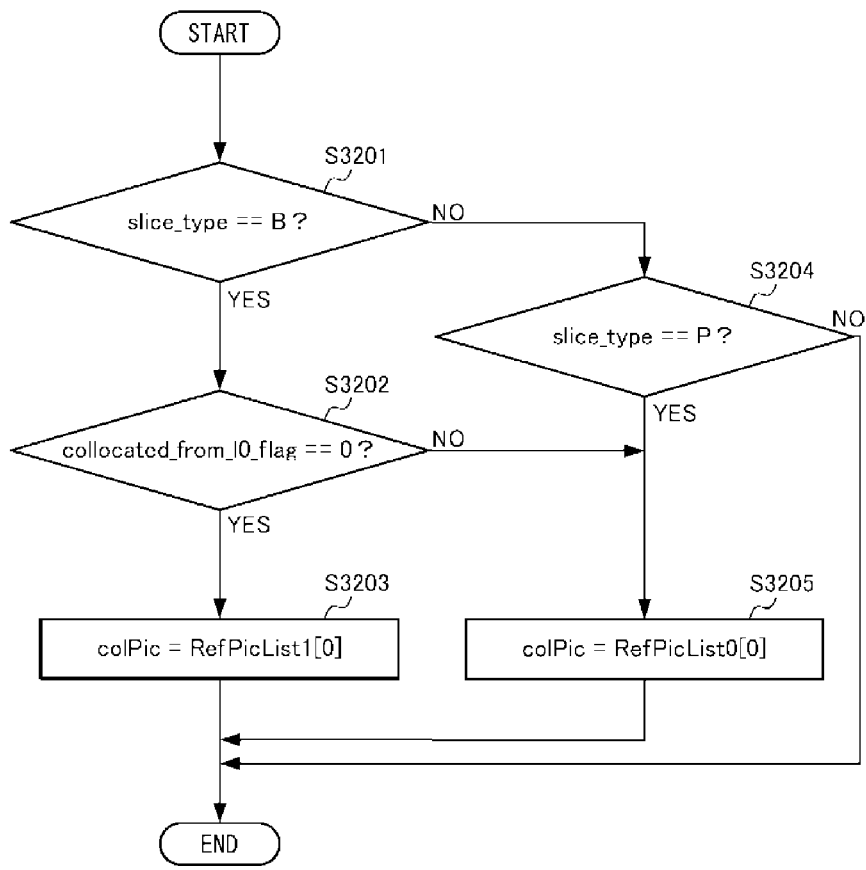
FIG. 35 shows a flowchart illustrating procedure of derivation process of a picture of a different time in a merge mode.

FIG. 35 shows a flowchart illustrating procedure of derivation process of a picture colPic of a different time of step S3101 in FIG. 34. In case that a slice type slice_type is a B slice and a flag collocated_from_l0_flag described above is 0 (YES in step S3201 and YES in step S3202), RefPicList1 [0] (i.e., a picture of which the reference index of reference list L1 is 0) is defined as a picture colPic of a different time (step S3203). Otherwise, that is, in case that a slice type slice_type is a B slice and a flag collocated_from_l0_flag described above is 1 (YES in step S3201 and NO in step S3202), or in case that a slice type slice_type is a P slice (NO in step S3201 and YES in step S3204), RefPicList0[0] (i.e., a picture of which the reference index of reference list L0 is 0) is defined as a picture colPic of a different time (step S3205).

Next, referring back to the flow chart of FIG. 34, a prediction block colPU of a different time is derived, and coding information is derived (step S3102).

Figure 36:
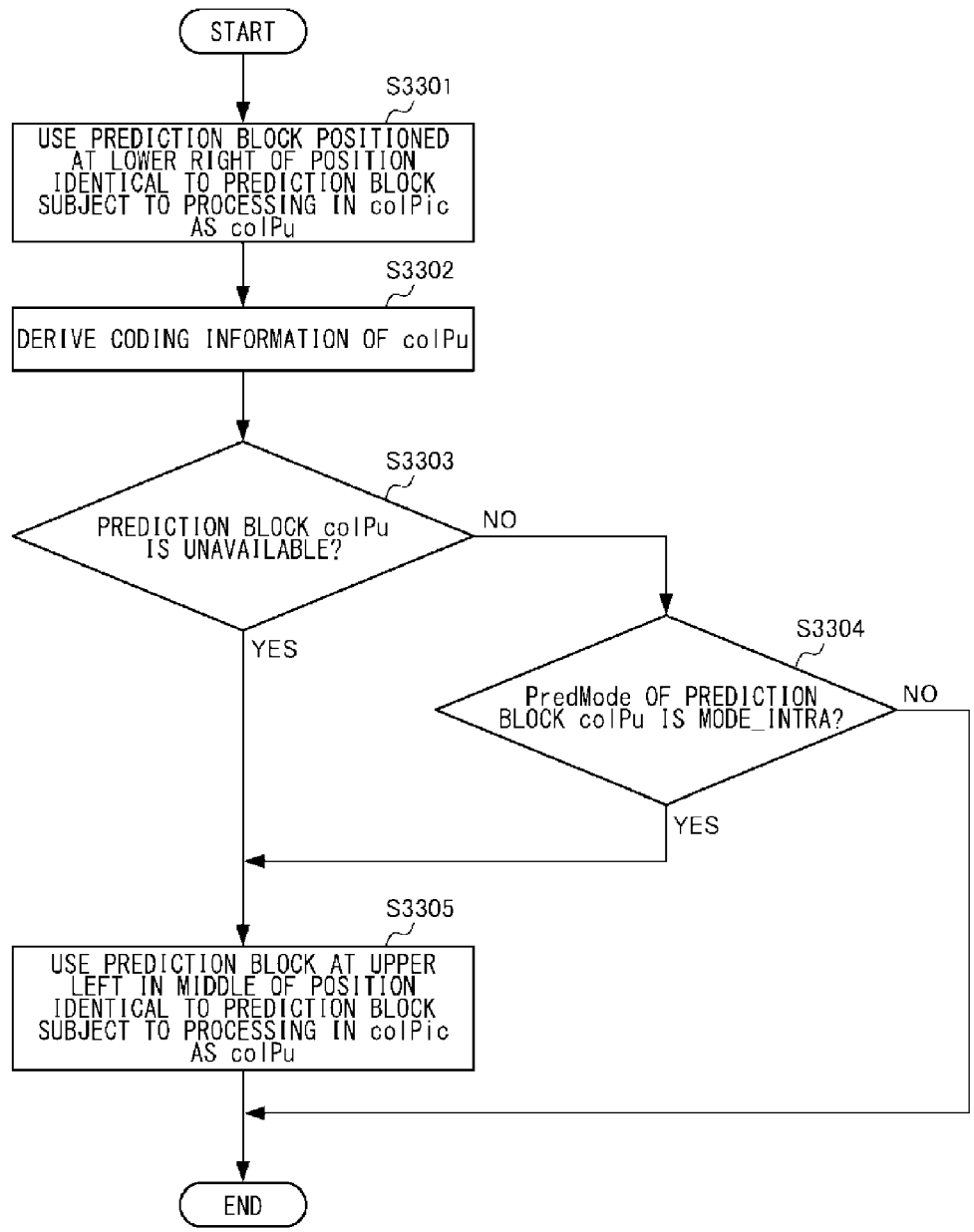
FIG. 36 shows a flowchart illustrating procedure of derivation process of a prediction block of a picture of a different time in a merge mode.

FIG. 36 shows a flowchart illustrating procedure of derivation process of a prediction block colPU of a picture colPic of a different time of step S3102 in FIG. 34.

First, in a picture colPic of a different time, a prediction block positioned at a lower right (outside) of a position identical to a prediction block subject to processing is used as a prediction block colPU of a different time (step S3301). This prediction block corresponds to the prediction block T0 in FIG. 9.

Next, coding information of the prediction block colPU of a different time is derived (step S3302). In case that PredMode of the prediction block colPU of a different time cannot be used or in case that the prediction mode PredMode of the prediction block colPU of a different time is intra prediction (MODE_INTRA) (YES in step S3303 の), and YES in step S3304), in a picture colPic of a different time, a prediction block at an upper left in the middle of a position identical to a prediction block subject to processing is used as a prediction block colPU of a different time (step S3305). This prediction block corresponds to the prediction block T1 in FIG. 9.

Next, referring back to the flow chart of FIG. 34, a motion vector predictor mvL1Col of L0 that is derived from a prediction block in another picture at a position identical to a prediction block subject to encoding or decoding, and a flag availableFlagL0Col indicating whether or not a time merge candidate Col is valid are derived (step S3103), and a motion vector predictor mvL1Col of L1 and a flag availableFlagCol indicating whether or not the time merge candidate Col is valid are derived. In addition, in case that the flag availableFlagL0Col or the flag availableFlagL1Col is 1, the flag availableFlagCol indicating whether or not the time merge candidate Col is valid is set to 1.

Figure 37:
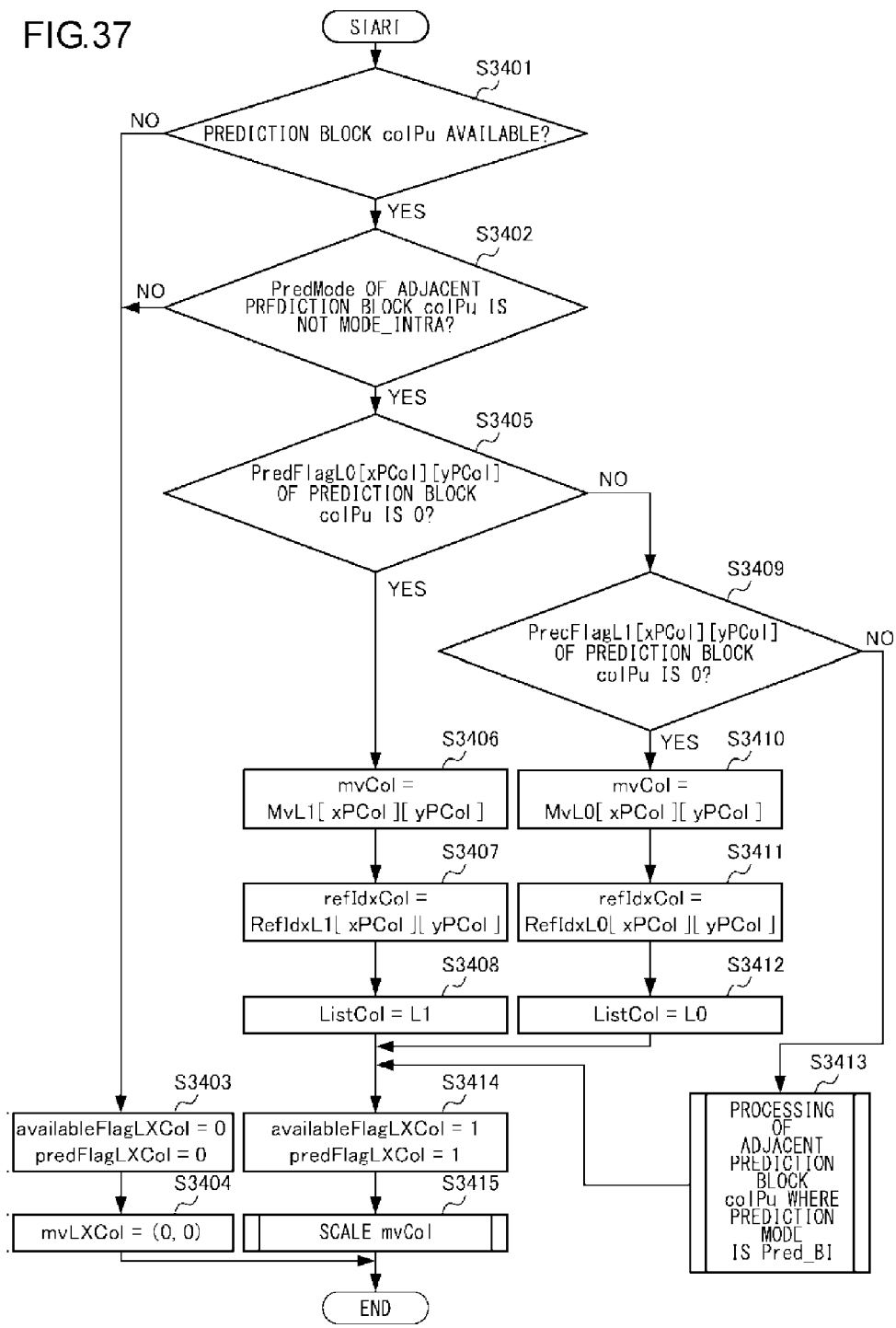
FIG. 37 shows a flowchart illustrating procedure of derivation process of a time merge candidate in a merge mode.

FIG. 37 shows a flowchart illustrating procedure of derivation process of inter prediction information of time merge candidate of step S3103 and step 3104 in FIG. 34. For L0 or L1, a list of target to derive time merge candidate is defined as LX, and prediction using LX is referred to as LX prediction, unless otherwise noted. In case of being called as step S3103, which is a derivation process of L0 of time merge candidate, LX is set to L0, and in case of being called as step S3104, which is a derivation process of L1 of time merge candidate, LX is set to L1.

In case that a prediction mode PredMode of a prediction block colPU of a different time is intra prediction (MODE_INTRA) or cannot be used, (NO in step S3401, NO in step S3402), a flag availableFlagLXCol and a flag predFlagLXCol are both set to 0 (step S3403), a motion vector mvLXCol is set to (0,0) (step S3404), the derivation process of inter prediction information of time merge candidate is completed.

In case that a prediction block colPU is available and in case that a prediction mode PredMode is not intra prediction (MODE_INTRA) (YES in step S3401, YES in step S3402), mvCol, refIdxCol, and availableFlagCol are derived in the following procedure.

In case that a flag PredFlagL0[xPCol][yPCol], which indicates whether or not the L0 prediction of the prediction block colPU, is 0 (YES in step S3405), the prediction mode of the prediction block colPU is Pred_L1. Therefore, a motion vector mvCol is set to a value identical to that of MvL1[xPCol][yPCol], which is a motion vector of L1 of the prediction block colPU (step S3406), and a reference index refIdxCol is set to a value identical to that of a reference index RefIdxL1[xPCol][yPCol] of L1 (step S3407), and a list ListCol is set to L1 (step S3408). xPCol and yPCol are indexes indicating the position of an upper left pixel of a prediction block colPU in a picture colPic of a different time.

On the other hand, in case that the L0 prediction flag PredFlagL0[xPCol][yPCol] of the prediction block colPU is not 0 (NO in step S3405 in FIG. 37), whether or not the L1 prediction flag PredFlagL1[xPCol][yPCol] of the prediction block colPU is 0 is determined. In case that the L1 prediction flag PredFlagL1[xPCol][yPCol] of the prediction block colPU is 0 (YES in step S3409), a motion vector mvCol is set to a value identical to that of MvL0[xPCol][yPCol], which is a motion vector of L0 of the prediction block colPU (step S3410), and a reference index refIdxCol is set to a value identical to that of a reference index RefIdxL0[xPCol][yPCol] of L0 (step S3411), and a list ListCol is set to L0 (step S3412).

On the other hand, in case that both L0 prediction flag PredFlagL0[xPCol][yPCol] of prediction block colPU and L1 prediction flag PredFlagL1[xPCol][yPCol] of prediction block colPU are not 0 (NO in step S3405 and NO in step S3409), the inter prediction mode of the prediction block colPU is bi-prediction (Pred_BI). Therefore, one of two motion vectors L0 and L1 is selected (step S3413).

Figure 38:
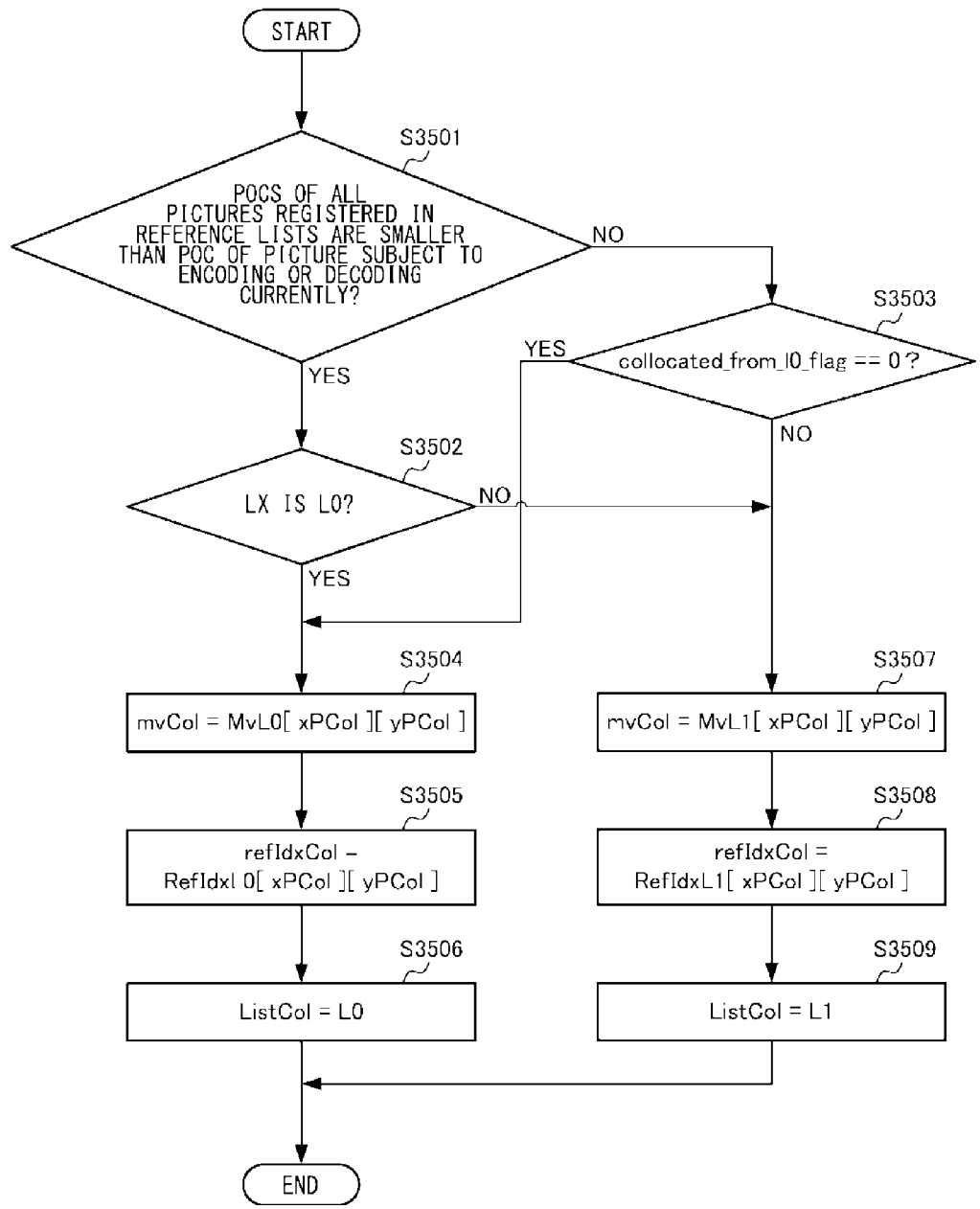
FIG. 38 shows a flowchart illustrating procedure of derivation process of a time merge candidate in a merge mode.

FIG. 38 shows a flowchart indicating procedure of derivation process of inter prediction information of time merge candidate when the inter prediction mode of the prediction block colPU is bi-prediction (Pred_BI).

First, whether or not POCs of all pictures registered in all reference lists are smaller than POC of a picture subject to encoding or decoding currently is determined (step S3501). In case that POCs of all pictures registered in L0 or L1, L0 and L1 being all reference lists of prediction block colPU, are smaller than POC of a picture subject to encoding or decoding currently (YES in step S3501) and LX is L0, that is, a prediction vector candidate of a motion vector of L0 of a picture subject to encoding or decode is derived (YES in step S3502), inter prediction information of L0 of the prediction block colPU is selected, and in case that LX is L1, that is, a prediction vector candidate of a motion vector of L1 of a picture subject to encoding or decode is derived (NO in step S3502), inter prediction information of L1 of the prediction block colPU is selected. On the other hand, in case that at least one of the POC of pictures registered in any of all reference lists L0 and L1 of prediction block colPU is bigger than the POC of a picture subject to encoding or decoding currently (NO in step S3501) and flag collocated_from_l0_flag is 0 (YES in step S3503), inter prediction information of L0 of the prediction block colPU is selected, and in case that flag collocated_from_l0_flag is 1 (NO in step S3503), inter prediction information of L1 of the prediction block colPU is selected.

In case of selecting inter prediction information of L0 of the prediction block colPU (YES in step and YES in step S3503), a motion vector mvCol is set to a value identical to that of MvL0[xPCol][yPCol] (step S3504), and a reference index refIdxCol is set to a value identical to that of RefIdxL0[xPCol][yPCol] (step S3505), and a list ListCol is set to L0 (step S3506).

In case of selecting inter prediction information of L1 of the prediction block colPU (NO in step S2502 and NO in step S3503), a motion vector mvCol is set to a value identical to that of MvL1[xPCol][yPCol] (step S3507), and a reference index refIdxCol is set to a value identical to that of RefIdxL1[xPCol][yPCol] (step S3508), and a list ListCol is set to L1 (step S3509).

Referring back to FIG. 37, if inter prediction information can be derived from a prediction block colPU, a flag availableFlagLXCol and a flag predFlagLXCol are both set to 1 (step S3414).

Subsequently, a motion vector mvCol is scaled and defined as a motion vector mvLXCol of LX of a time merge candidate (step S3415). An explanation will be given on procedure of scaling computation process of the motion vector, while referring to FIGS. 39 and 40.

Figure 39:
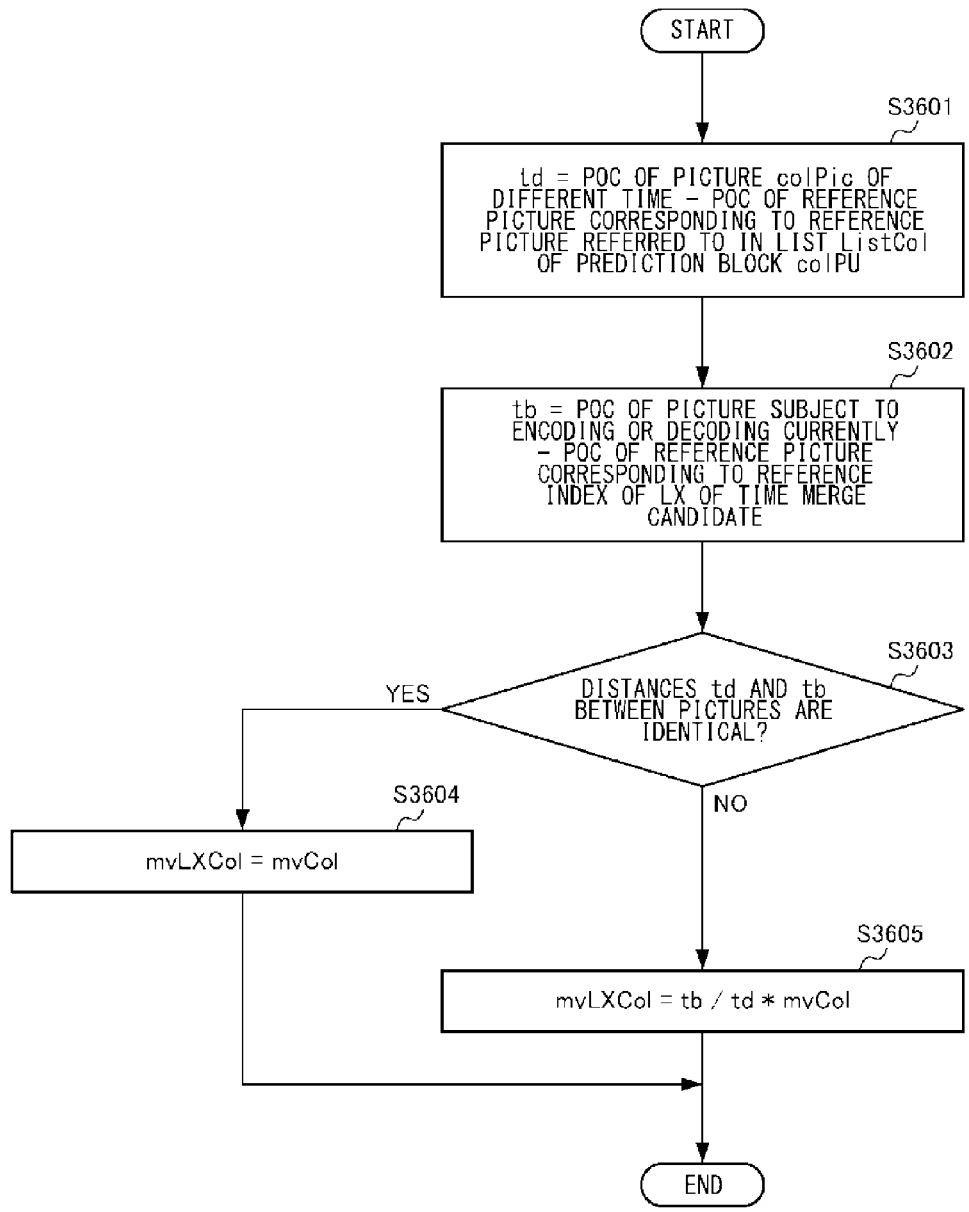
FIG. 39 shows a flowchart illustrating procedure of scaling computation process of a motion vector.
Figure 40:
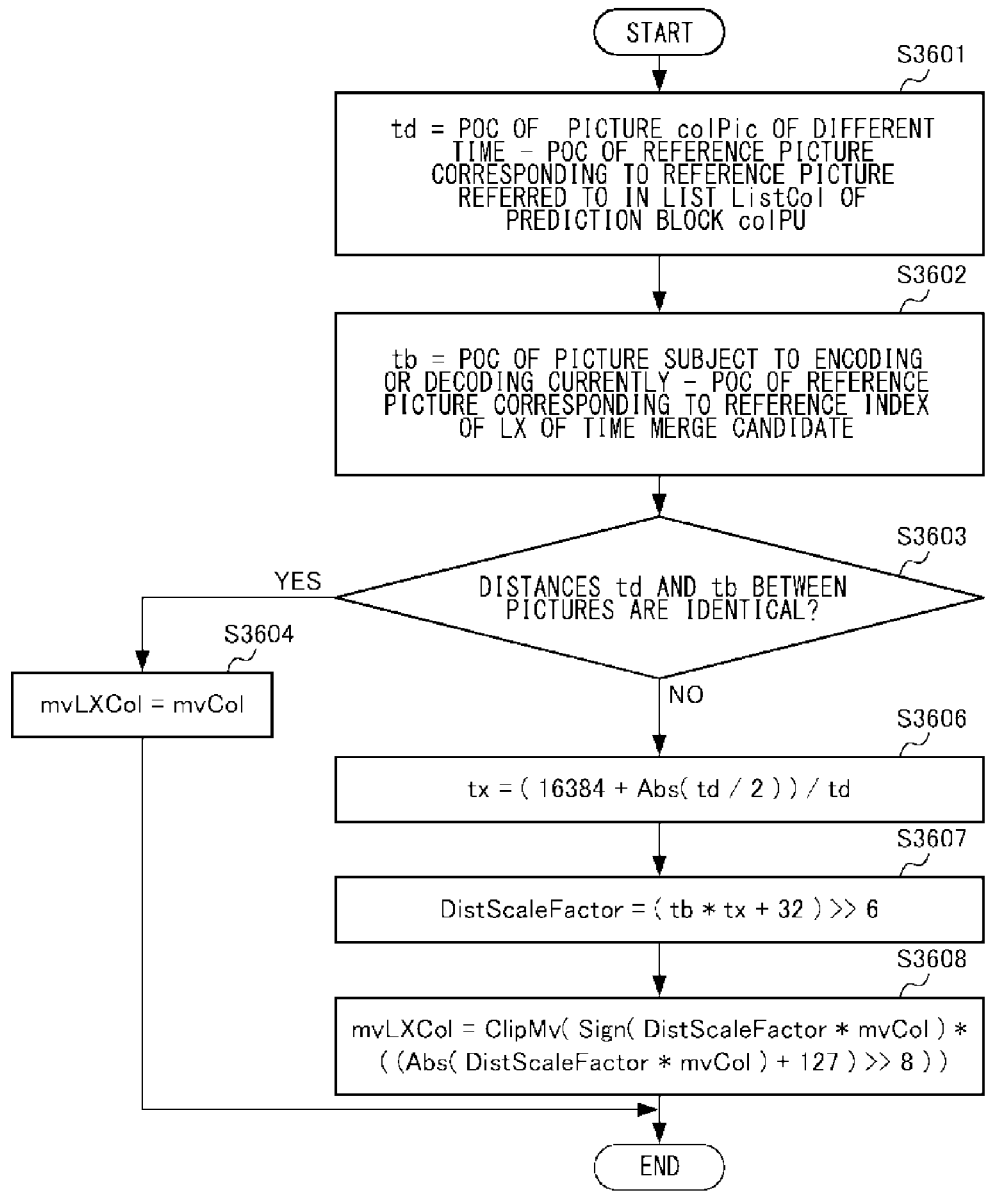
FIG. 40 shows a flowchart illustrating procedure of scaling computation process of a motion vector.

FIG. 39 shows a flowchart indicating procedure of scaling computation process of the motion vector of step S3105 in FIG. 34.

By subtracting POC of a reference picture corresponding to a reference index refIdxCol referred to in a list ListCol of a prediction block colPU from POC of picture colPic of a different time, a distance td between pictures is derived (step S3601). In case that POC of a reference picture referred to in a list ListCol of a prediction block colPU is previous to the picture colPic of a different time in the display order, the distance td between pictures is a positive value, and in case that POC of a reference picture referred to in a list ListCol of a prediction block colPU is subsequent to the picture colPic of a different time in the display order, the distance td between pictures is a negative value.

td=POC of prediction block colPU of a different
time−POC of a reference picture referred to in
a list ListCol of a prediction block colPU.

By subtracting POC of a reference picture corresponding to a reference index of LX of a time merge candidate derived in step S202 in FIG. 18 from POC of a picture subject to encoding or decoding currently, a distance tb between pictures is derived (step S3602). In case that the reference picture referred to in a list LX of a picture subject to encoding or decoding currently is previous to the picture subject to encoding or decoding currently in the display order, the distance tb between pictures is a positive value, and in case the reference picture referred to in a list LX of a picture subject to encoding or decoding currently is subsequent to the other in the display order, the distance tb between pictures is a negative value.

tb=POC of picture subject to encoding or decoding
currently−POC of a reference picture corre-
sponding to a reference index of LX of a time
merge candidate Subsequently, distances td between pictures and tb between pictures are compared (step S3603). In case that the distances td and tb are identical to each other (YES in step S3603), the motion vector mvLXCol of LX of time merge candidate is set to a value identical to that of the motion vector mvCol (step S3604), the scaling computation process is completed.

mvLXCol=mvCol

On the other hand, in case that the distances td and tb are not identical (NO in step S3603), scaling computation process is performed by multiplying mvCol by tb or td in accordance with the following equation (step S3605), and a scaled motion vector mvLXCol of LX of time merge candidate is obtained.

mvLXCol=tb or td*mvCol

FIG. 4 indicates an example in case that the scaling computation of step S3605 is performed with precision of integer. Processes of step S3606-step S3608 in FIG. 40 correspond to the step S3605 of FIG. 40.

First, in a similar manner to that of the flowchart shown in FIG. 39, a distance td between pictures and a distance tb between pictures are derived (step S3601 and step S3602).

Subsequently, distances td between pictures and tb between pictures are compared (step S3603). In case that the distances td and tb are identical (YES in step S3603), the motion vector mvLXCol of LX of time merge candidate is set to a value identical to that of the motion vector mvCol (step S3604) in a similar manner to the flow chart in FIG. 39, the scaling computation process is completed.

mvLXCol=mvCol

On the other hand, in case that the distances td and tb are not identical (NO in step S3603) a parameter tx is derived in accordance with the following equation (step S3606).

tx=(16384+Abs(td or 2)) or td

Next, a scaling factor DistScaleFactor is derived in accordance with the following equation (step S3607).

DistScaleFactor=(tb*tx+32)>>6

Subsequently, a scaled motion vector mvLXCol of LX of time merge candidate is obtained in accordance with the following equation (step S3608).

mvLXCol=ClipMv(Sign(DistScaleFactor*mvCol)*
((Abs (DistScaleFactor*mvCol)+127)>>8))

Figure 41:
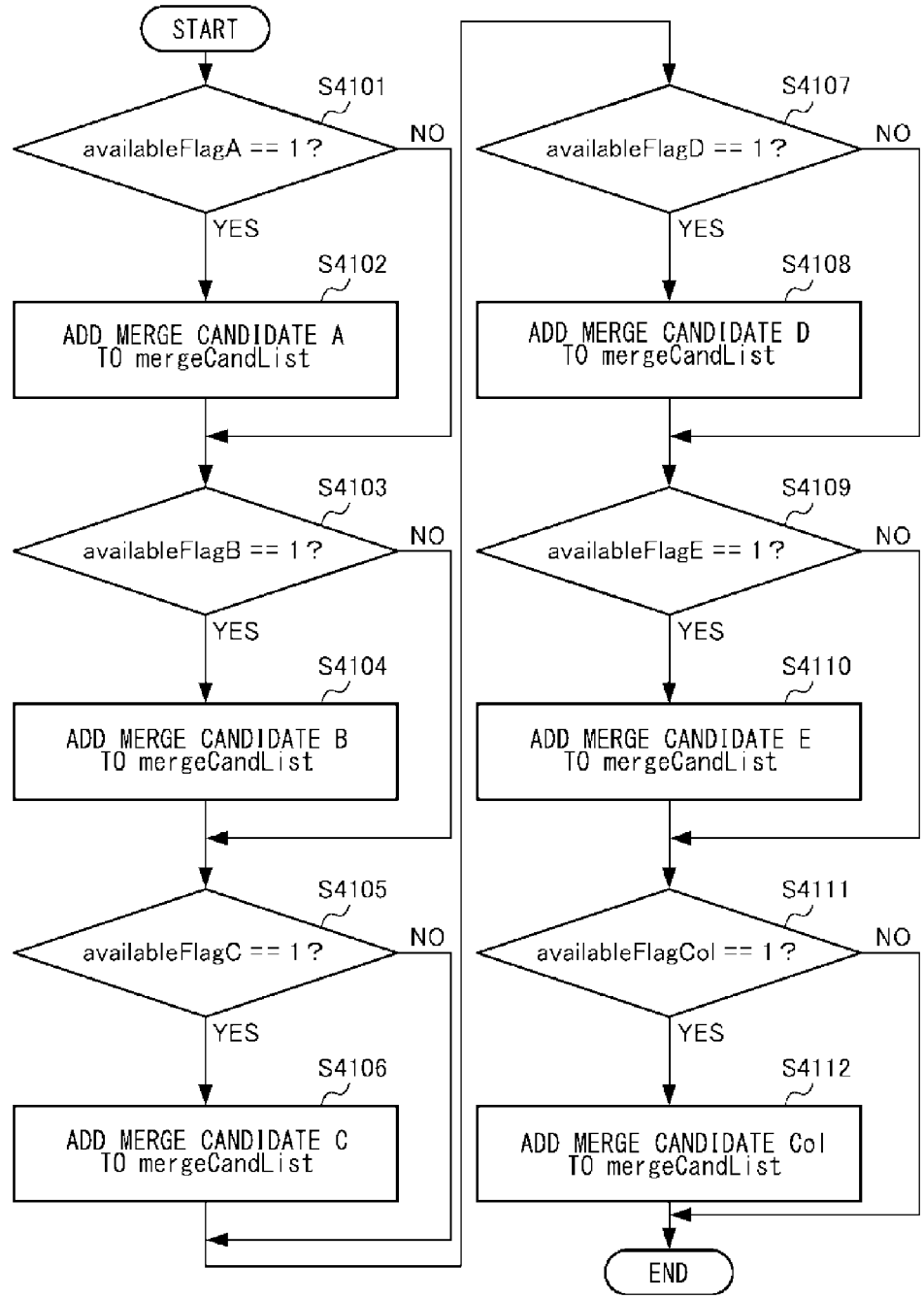
FIG. 41 shows a flowchart illustrating procedure of construction process of a merge candidate list in a merge mode.
Figure 42:
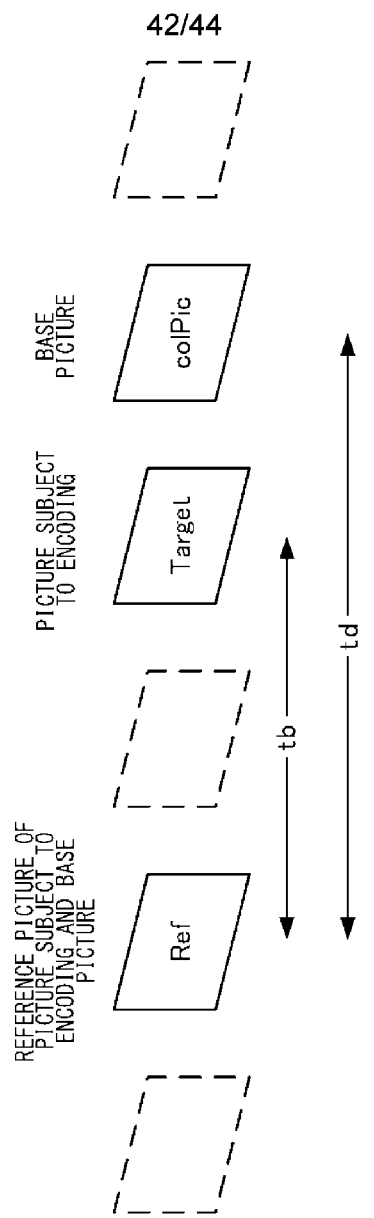
FIG. 42 illustrates a time direct mode according to conventional MPEG-4 AVC/H.264.

Next, a detailed explanation will be given on a method of step S204 in FIG. 18 for registering a merge candidate in a merge candidate list and constructing a merge candidate list. FIG. 41 shows a flowchart indicating a processing procedure for constructing a merge candidate list. According to the method, by setting priorities and registering a merge candidate from the higher priority in a merge candid list mergeCandList, the amount of code of merge index merge_idx[x0][y0] is reduced. By putting an element of higher priority in the upper part of the merge candidate list, the amount of code is reduced. For example, in case that there are five elements in the merge candidate list mergeCandList, an index 0 of the merge candidate list is set to "0", an index 1 thereof is set to "10", an index 2 thereof is set to "110", an index 3 thereof is set to "1110", and an index 4 thereof is set to "11110", by which, the amount of code representing the index 0 becomes 1 bit. By registering elements that is considered to occur in high frequency in index 1, the amount of code is reduced.

The merge candidate list mergeCandList is configured as a list structure, and in which a merge index indicating locations in the merge candidate list, and a storage area that stores a merge candidate corresponding to the index as an element are provided. The number of merge index starts from 0, and a merge candidate is stored in a storage area of the merge candidate list mergeCandList. In the following process, a prediction block that becomes a merge candidate of a mergeindex i registered in the merge candidate list mergeCandList is referred to as mergeCandList[i], which is distinguished from the merge candidate list mergeCandList by array notation.

First, in case that availableFlagA is 1 (YES in step S4101), a merge candidate A is registered at the top of the merge candidate list mergeCandList (step S4102).

Subsequently, in case that availableFlagB is 1 (YES in step S4103), a merge candidate B is registered at the end of the merge candidate list mergeCandList (step S4104).

Subsequently, in case that availableFlagC is 1 (YES in step S4105), a merge candidate C is registered at the end of the merge candidate list mergeCandList (step S4106).

Subsequently, in case that availableFlagD is 1 (YES in step S4107), a merge candidate D is registered at the end of the merge candidate list mergeCandList (step S4108).

Subsequently, in case that availableFlagE is 1 (YES in step S4109), a merge candidate E is registered at the end of the merge candidate list mergeCandList (step S4110).

Subsequently, in case that vailableFlagCol is 1 (YES in step S4109), a merge candidate Col is registered at the end of the merge candidate list mergeCandList (step S4110).

In a merge mode, a prediction block A adjacent to the left and a prediction block B adjacent to the top often with the prediction block subject to encoding or decoding in an integrated manner. In case that the inter prediction information of prediction blocks A and B can be derived, the merge candidates A and B are registered ahead of other merge candidates C, D, E, and Col in the candidate list, preferentially.

In FIG. 13, in the coding information selection unit 136 of the inter prediction information derivation unit 104 of the moving picture encoding device, a merge candidate is selected from merge candidates registered in the merge candidate list, and a merge index and inter prediction information of a merge candidate corresponding to the merge index is provided to the motion compensation prediction unit 105.

When selecting a merge candidate, a method similar to that of the prediction method determining unit 107 can be used. Coding information and coding distortion between an amount of code of coding information and a residual signal, and coding distortion between a prediction picture signal and a picture signal are derived for each merge candidate. A merge candidate that has the least amount of generated code and coding distortion is determined. For each merge candidate, entropy encoding is performed of syntax element merge_idx, which is coding information of a merge mode, is performed, and an amount of code of coding information is calculated. Further, for each merge candidate, an amount of code of an encoded prediction residual signal is calculated with a method similar to that of the motion compensation prediction unit 105. The prediction residual signal is a residual signal between a prediction picture signal, on which motion compensation is performed in accordance with inter prediction information of each merge candidate, and a picture signal, which is subject to encoding and which is provided from the picture memory 101. Total amount of code, to which an amount of code of coding information (i.e., a merge index) and an amount of code of prediction residual signal is added is calculated and set as an evaluation value.

After encoding such prediction residual signal, decoding for evaluating an amount of distortion is performed, and a coding distortion is calculated as a ratio representing an error from an original picture signal, the error arising from encoding. By comparing the total amount of generated code and the coding distortion for each merge candidate, coding information of less amount of generated code and less coding distortion is determined. A merge index corresponding to the determined coding information is encoded as a flag merge_idx represented by a second syntax pattern of a prediction block. The amount of generated code calculated in this process is preferably calculated by simulating coding processes. However, approximations to simplify calculations or a rough estimate can also be applied.

On the other hand, in FIG. 14, in the coding information selection unit 236 of the inter prediction information derivation unit 205 of the moving picture encoding device, a merge candidate corresponding to a provided merge index is selected from merge candidates registered in the merge candidate list, and inter prediction information of the merge candidate is provided to the motion compensation prediction unit 206, and stored in the coding information storing memory 210.

A bitstream of moving pictures outputted from the moving picture encoding device according to the embodiments described above has a specific data format so that the data stream can be decoded in accordance with the coding method used in the embodiments. A moving picture decoding device corresponding to the moving picture encoding device can decode the bitstream in this specific format.

In case that a wired or wireless network is used in order to exchange bitstreams between the moving picture encoding device and the moving picture decoding device, a bitstream may be transformed into a data format appropriate to the manner of transmission on the communication path so as to be transmitted. In this case, a moving picture transmission device and a moving picture receiver device are provided. The moving picture transmission device transforms a bitstream output from the moving picture encoding device into encoded data in a data format appropriate to the manner of transmission via the communication path and transmits the encoded data to the network. The moving picture receiver device receives encoded data from the network, reconstructs a bitstream, and provides the bitstream to the moving picture decoding device.

The moving picture transmission device includes a memory that buffers a bitstream output from the moving picture encoding device, a packet processing unit that packetizes the bitstream, a transmission unit that transmits the packetized bitstream via a network. The moving picture receiver device includes a receiving unit that receives a packetized bitstream via a network, a memory that buffers the received bitstream, and a packet processing unit that processes a packet of the encoded data so as to generate a bitstream, and provides the bitstream to the moving picture decoding device.

It is needless to mention that the processes relating to encoding and decoding described above can be implemented as a transmission device, a storage, and/or a receiver device using hardware. The process can also be implemented by firmware stored in a read only memory (ROM), a flash memory, or the like, or by software of computers or the like. The firmware program or the software program can be stored in a recording medium readable by a computer or the like and provided, can be provided from a server via a wired or wireless network, or can be provided by data broadcasting as terrestrial broadcasting or satellite digital broadcasting.

Given above is an explanation based on the embodiments. The embodiments are intended to be illustrative only and it will be obvious to those skilled in the art that various modifications to constituting elements and processes could be developed and that such modifications are also within the scope of the present invention.

What is claimed is:

1. A moving picture decoding device that decodes a bitstream where a first block, which is obtained by partitioning each picture, is partitioned into one or more second blocks and a moving picture is encoded by inter prediction, comprising:
- a first prediction information derivation unit configured to perform a derivation process of one or more first inter prediction information candidates from inter prediction information of one or more third blocks in a proximity of the second block subject to decoding in a picture subject to decoding;
- a second prediction information derivation unit configured to perform a derivation process of a second inter prediction information candidate from inter prediction information of a fourth block at a position identical to or in a proximity of the second block subject to decoding in a picture different from the picture subject to decoding;
- a decoding unit configured to decode the index indicating inter prediction information to be used for the inter prediction of the second block subject to decoding;
- a candidate list construction unit configured to construct a prediction information candidate list comprising a prediction information candidate to which, in case that the first inter prediction information candidate is derived, the derived first inter prediction information candidate is added, and in case that the second inter prediction information candidate is derived, the derived second inter prediction information candidate is added, respectively; and
- a selection unit configured to select a candidate of inter prediction information to be used for the inter prediction of the second block subject to decoding indicated by the index from the one or more prediction information candidates in the prediction information candidate list, wherein
- in a partition mode where the first block is partitioned into an upper block and a lower block arranged vertically, in the ratio 1:1, 1:3 or 3:1, when the second block subject to decoding is the lower block, the first prediction information derivation unit performs the derivation process of at most four of the first inter prediction information candidates from blocks adjacent to a left edge, an upper right part, a lower left part, or an upper left part of the second block without referring to coding information of a fifth block adjacent to an upper edge of the second block, and wherein
- in a partition mode where the first block is partitioned into an upper block and a lower block arranged vertically, in the ratio 1:1, 1:3 or 3:1, when the second block subject to decoding is the lower block, the second prediction information derivation unit performs the derivation process of the second inter prediction information candidate on the basis of a reference index of the second inter prediction information candidate by setting the value of the reference index to a default value that is 0, without referring to coding information of the fifth block adjacent to the upper edge of the second block.

2. A moving picture decoding method that decodes a bitstream where a first block, which is obtained by partitioning each picture, is partitioned into one or more second blocks and a moving picture is encoded by inter prediction, comprising:
- performing a derivation process of one or more first inter prediction information candidates from inter prediction information of one or more third blocks in a proximity of the second block subject to decoding in a picture subject to decoding;
- performing a derivation process of a second inter prediction information candidate from inter prediction information of a fourth block at a position identical to or in a proximity of the second block subject to decoding in a picture different from the picture subject to decoding;
- decoding the index indicating inter prediction information to be used for the inter prediction of the second block subject to decoding;
- constructing a prediction information candidate list comprising a prediction information candidate to which, in case that the first inter prediction information candidate is derived, the derived first inter prediction information candidate is added, and in case that the second inter prediction information candidate is derived, the derived second inter prediction information candidate is added, respectively; and
- selecting a candidate of inter prediction information to be used for the inter prediction of the second block subject to decoding indicated by the index from the one or more prediction information candidates in the prediction information candidate list, wherein
- in a partition mode where the first block is partitioned into an upper block and a lower block arranged vertically, in the ratio 1:1, 1:3 or 3:1, when the second block subject to decoding is the lower block, the performing a derivation process of one or more first inter prediction information candidates performs the derivation process of at most four of the first inter prediction information candidates from blocks adjacent to a left edge, an upper right part, a lower left part, or an upper left part of the second block without referring to coding information of a fifth block adjacent to an upper edge of the second block, and wherein,
- in a partition mode where the first block is partitioned into an upper block and a lower block arranged vertically, in the ratio 1:1, 1:3 or 3:1, when the second block subject to decoding is the lower block, the performing of the derivation process of the second prediction information performs the derivation process of the second inter prediction information candidate on the basis of a reference index of the second inter prediction information candidate by setting the value of the reference index to a default value that is 0, without referring to coding information of the fifth block adjacent to the upper edge of the second block.

3. A non-transitory computer-readable recording medium having embodied thereon a moving picture decoding program executable by a computer and adapted to decode a bitstream where a first block, which is obtained by partitioning each picture, is partitioned into one or more second blocks and a moving picture is encoded by inter prediction, the program comprising:
- a first prediction information derivation module configured to perform a derivation process of one or more first inter prediction information candidates from inter prediction information of one or more third blocks in a proximity of the second block subject to decoding in a picture subject to decoding;
- a second prediction information derivation module configured to perform a derivation process of a second inter prediction information candidate from inter prediction information of a fourth block at a position identical to or in a proximity of the second block subject to decoding in a picture different from the picture subject to decoding;

a decoding module configured to decode the index indicating inter prediction information to be used for the inter prediction of the second block subject to decoding;
a candidate list construction module configured to construct a prediction information candidate list comprising a prediction information candidate to which, in case that the first inter prediction information candidate is derived, the derived first inter prediction information candidate is added, and in case that the second inter prediction information candidate is derived, the derived second inter prediction information candidate is added, respectively; and
a selection module configured to select a candidate of inter prediction information to be used for the inter prediction of the second block subject to decoding indicated by the index from the one or more prediction information candidates in the prediction information candidate list, wherein
in a partition mode where the first block is partitioned into an upper block and a lower block arranged vertically, in the ratio 1:1, 1:3 or 3:1, when the second block subject to decoding is the lower block, the first prediction information derivation module performs the derivation process of at most four of the first inter prediction information candidates from blocks adjacent to a left edge, an upper right part, a lower left part, or an upper left part of the second block without referring to coding information of a fifth block adjacent to an upper edge of the second block, and wherein,
in a partition mode where the first block is partitioned into an upper block and a lower block arranged vertically, in the ratio 1:1, 1:3 or 3:1, when the second block subject to decoding is the lower block, the second prediction information derivation module performs the derivation process of the second inter prediction information candidate on the basis of a reference index of the second inter prediction information candidate by setting the value of the reference index to a default value that is 0, without referring to coding information of the fifth block adjacent to the upper edge of the second block.

\* \* \* \* \*